(12) United States Patent
Tian

(10) Patent No.: US 11,216,080 B2
(45) Date of Patent: Jan. 4, 2022

(54) METHODS AND DEVICES FOR INFORMATION ACQUISITION, DETECTION, AND APPLICATION OF FOOT GESTURES

(71) Applicant: Xin Tian, Niskayuna, NY (US)

(72) Inventor: Xin Tian, Niskayuna, NY (US)

(73) Assignee: Xin Tian, Niskayuna, NY (US)

(*) Notice: Subject to any disclaimer, the term of this patent is extended or adjusted under 35 U.S.C. 154(b) by 210 days.

(21) Appl. No.: 16/447,683

(22) Filed: Jun. 20, 2019

(65) Prior Publication Data

US 2019/0302901 A1 Oct. 3, 2019

Related U.S. Application Data

(63) Continuation-in-part of application No. 16/332,756, filed as application No. PCT/US2017/051431 on Sep. 13, 2017, which is a continuation-in-part of application No. 15/331,410, filed on Oct. 21, 2016, now abandoned, which is a continuation-in-part of
(Continued)

(51) Int. Cl.
| | | |
|---|---|---|
| *G06F 3/033* | (2013.01) | |
| *G06F 3/0488* | (2013.01) | |
| *G06F 3/0346* | (2013.01) | |
| *G06K 9/00* | (2006.01) | |
| *G06F 3/041* | (2006.01) | |

(52) U.S. Cl.
CPC .......... *G06F 3/0334* (2013.01); *G06F 3/0346* (2013.01); *G06F 3/0416* (2013.01); *G06F 3/04883* (2013.01); *G06K 9/00335* (2013.01)

(58) Field of Classification Search
CPC ........ G06F 1/163; G06F 1/1694; G06F 3/017; G06F 3/0334; G06F 3/0346; G06F 3/0416; G06F 3/04883; G06K 9/00335; G06K 9/209; G06K 9/46; H01H 3/14
See application file for complete search history.

(56) References Cited

U.S. PATENT DOCUMENTS 5,694,152 A * 12/1997 Loop .................... G06F 3/0334
345/157
8,172,722 B2 5/2012 Molyneux et al.
(Continued)

FOREIGN PATENT DOCUMENTS

WO 2016061699 A1 4/2016

OTHER PUBLICATIONS

World Intellectual Property Organization (WIPO) International Search Report and Written Opinion for PCT/US2017/051431 dated Jan. 4, 2018 7 Pages.

*Primary Examiner* — Stacy Khoo
(74) *Attorney, Agent, or Firm* — Anova Law Group, PLLC

(57) ABSTRACT

The present disclosure provides a method, including acquiring information related to foot gesture features, and sending the acquired information related to the foot gesture features to an electronic device for a foot gesture detection. The foot gesture features include foot pointing direction(s), foot touch state(s), foot tilt angle(s), and foot movement levels. A button pad device that can be placed in shoe sole or insole for effective foot touch state detection is also disclosed. The disclosure also provides a method for cursor control using foot touch state, foot pointing angle, foot tilt angle from a foot gesture feature information acquisition device.

12 Claims, 26 Drawing Sheets

Related U.S. Application Data application No. 15/283,764, filed on Oct. 3, 2016, now Pat. No. 10,448,892.

(60) Provisional application No. 62/687,601, filed on Jun. 20, 2018, provisional application No. 62/483,966, filed on Apr. 11, 2017, provisional application No. 62/470,848, filed on Mar. 13, 2017, provisional application No. 62/394,048, filed on Sep. 13, 2016, provisional application No. 62/394,048, filed on Sep. 13, 2016.

(56) References Cited

U.S. PATENT DOCUMENTS

| | | |
|---|---|---|
| 8,827,815 B2 | 9/2014 | Burroughs et al. |
| 8,935,119 B2 | 1/2015 | Yuen |
| 9,002,680 B2 | 4/2015 | Nurse et al. |
| 9,232,911 B2 | 1/2016 | Wilson et al. |
| 9,591,993 B2 | 3/2017 | Morris et al. |
| 9,743,861 B2 | 8/2017 | Giedwoyn et al. |
| 9,763,489 B2 | 9/2017 | Amos et al. |
| 9,993,181 B2 | 6/2018 | Ross |
| 10,034,622 B1 | 7/2018 | Mahmoud et al. |
| 10,070,680 B2 | 9/2018 | Molyneux et al. |
| 10,188,170 B2 | 1/2019 | Bramani et al. |
| 2010/0035688 A1 | 2/2010 | Picunko et al. |
| 2011/0087445 A1 | 4/2011 | Sobolewski |
| 2012/0206356 A1* | 8/2012 | Campbell ............ G06F 3/0334 345/163 |
| 2017/0055880 A1* | 3/2017 | Agrawal ................ G16H 40/63 |

* cited by examiner

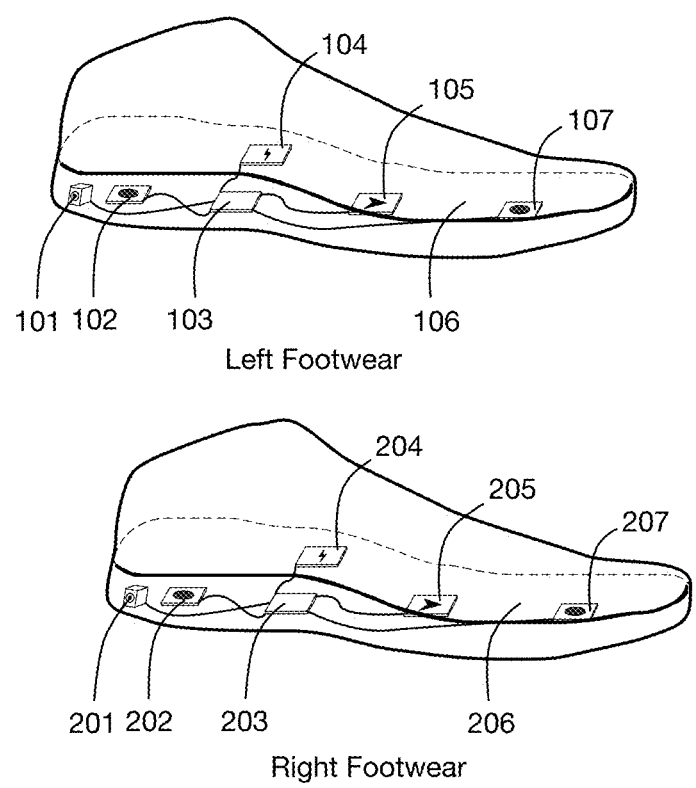
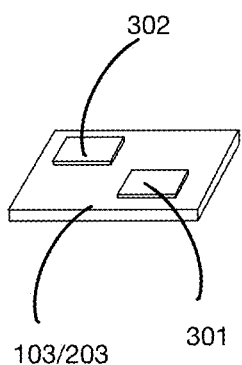
FIG. 1
FIG. 2

METHODS AND DEVICES FOR INFORMATION ACQUISITION, DETECTION, AND APPLICATION OF FOOT GESTURES

CROSS-REFERENCES TO RELATED APPLICATIONS

This application claims the priority of U.S. Provisional Patent Application No. 62/687,601, filed on Jun. 20, 2018, and claims the priority of U.S. patent application Ser. No. 16/332,756 filed on Mar. 12, 2019, which is a national phase entry under 35 U.S.C § 371 of International Application No. PCT/US17/51431, filed on Sep. 13, 2017, which claims the priority of: U.S. Provisional Patent Application Nos. 62/483,966, filed on Apr. 11, 2017, and 62/470,848, filed on Mar. 13, 2017; and U.S. patent application Ser. No. 15/331,410, filed on Oct. 21, 2016, and Ser. No. 15/283,764, filed on Oct. 3, 2016, both of which claim priority to U.S. Provisional Patent Application No. 62/394,048, filed on Sep. 13, 2016. The above enumerated patent applications are incorporated herein by reference.

FIELD OF THE DISCLOSURE

The present disclosure generally relates to the field of information technology and electronic systems, more particularly, relates to methods and devices for information acquisition, detection and application of foot gestures.

BACKGROUND

Information collected from a user's foot or both feet by various sensing devices is mostly used to measure physical activities of the user in various health applications, e.g., health applications on smart phones. However, the functions of detecting user foot gestures and using user foot gestures for device control and user-device/user-application interactions are not adequately developed. Currently, the control of various electronic devices, e.g., computers, smart phones, game consoles, and user-device/application interactions supported by the devices are predominantly hand-based. Common examples of input devices and device components supporting handed-based controls of various electronic devices include keyboard, mouse, joy stick, touch screen/pad, multi-touch screen/pad, etc. In particular, input devices/device components supporting multi-touch detections, e.g., multi-touch screen and multi-touch pad, are able to obtain user touch point coordinate information and touch point movement information. The information then is used to support hand gesture based device/application control and user-device/application interactions. Corresponding to multi-touch input devices and hand gesture detection technologies, this invention describes a complete set of solutions for the detection of various user foot gestures and foot gesture based device/application control and device/application interactions. The set of solutions further include i) user foot gesture feature information acquisition device and corresponding methods, and ii) the method for the detection of user foot gestures using foot gesture feature information, and devices using the methods to achieve foot gesture detection and foot gesture based user-device/application interactions. Corresponding to coordinates of a user's hand touch points which are the key information supporting hand gesture detections, foot gesture features supporting foot gesture detection include foot pointing direction(s) of a user's one foot or both feet, and foot touch states determined by the touch state of multiple touch areas of a user's sole to the ground or any support surface. Additional foot gesture features also include foot tilt angle(s) from a user's one foot or both feet and various foot moving trajectory state related features, and foot movement levels. Corresponding to multi-touch screen or multi-touch pad which is an input device supporting user hand gesture detections, the foot gesture feature information acquisition device is configured to providing information related to various foot gesture features from a user's foot or both feet. An embodiment of the foot gesture feature information acquisition device is a compass embedded footwear system disclosed in the present invention.

BRIEF SUMMARY OF THE DISCLOSURE

One aspect of present disclosure provides a method, including acquiring information related to foot gesture features, and sending the acquired information related to the foot gesture features to an electronic device for a foot gesture detection. The foot gesture features includes one or more of a foot pointing direction of each of a user's one foot or both feet, a foot touch state of a of user's one foot, and a foot touch state of a user's both feet. The foot touch state is determined based on whether one or multiple parts of a user's foot sole touch or press a supporting platform, the supporting platform including the ground.

Another aspect of present disclosure provides an information acquisition device. The information acquisition device includes an information acquisition member and a communication member. The information acquisition member is configured to acquire information related to foot gesture features, the foot gesture features including one or more of a foot pointing direction of each of a user's one foot or both feet, a foot touch state of a of user's one foot, and a foot touch state of a user's both feet, foot tilt angle(s) and foot movement levels. The foot touch state is determined based on whether one or multiple parts of a user's foot sole touch or press a supporting platform, the supporting platform including the ground. The communication member is configured to send the acquired information related to the foot gesture features to an electronic device for a foot gesture detection.

Another aspect of present disclosure provides a button pad device, which can be placed in shoe sole or insole for effective foot touch state detection.

Another aspect of present disclosure provides a method for cursor control using foot touch state, foot pointing angle, foot tilt angle from a foot gesture feature information acquisition device.

A non-transitory computer readable storage medium, storing computer-executable instructions for, when being executed, one or more processors to perform the disclosed methods.

BRIEF DESCRIPTION OF THE DRAWINGS

The following drawings are merely examples for illustrative purposes according to various disclosed embodiments and are not intended to limit the scope of the present disclosure.

FIG. 1 illustrates an exemplary compass embedded footwear system according to various embodiments of the present disclosure, which is an embodiment of the foot gesture feature information acquisition device;

FIG. 2 illustrates an exemplary control-communication unit used in the compass-sensor embedded footwear system in FIG. 1 according to various embodiments of the present disclosure;

DETAILED DESCRIPTION

Figure 3:
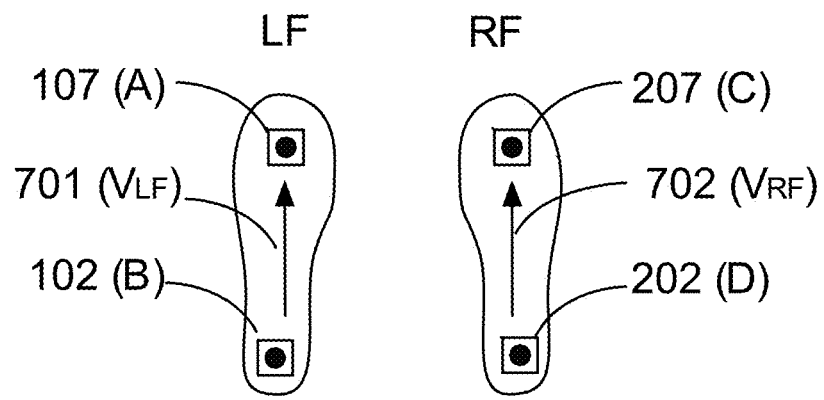
FIG. 3 illustrates an exemplary arrangement of pressure sensors at designed sole areas according to various embodiments of the present disclosure.

This invention describes a complete set of methods and devices for i) the acquisition of various user foot gesture feature information, ii) the detection of various user foot gestures using a range of foot gesture features, and iii) supporting foot gesture based user device/application control/interactions in electronic devices. Corresponding to coordinates of a user's hand touch points being key inputs supporting hand gesture detections, information on a range of foot gesture features are used to support the detection of various foot gestures. These foot gesture features include two basic/fundamental types of foot gesture features which are the pointing direction(s) of a user's one foot or both feet, and foot touch states determined by the touch state of multiple touch areas of a user's sole(s) to the ground or any support surface. Additional foot gesture features also include foot tilt angle(s) from a user's one foot or both feet and various foot moving trajectory state related features. Corresponding to multi-touch screen or multi-touch pad as the key input device supporting user hand gesture detections, a foot gesture feature information acquisition device is used for obtaining information related to various user foot gesture features including user foot pointing directions, user foot touch states and additional foot gesture features including user foot tilt angles, user foot moving trajectory state related features, user foot movement levels, etc.

Methods and devices disclosed in this invention support the detection of various user foot gestures and foot gesture based device/application control and interaction in various electronic devices including computers, smart phones, game consoles, virtual reality devices, etc.

As one embodiment of the foot gesture feature information acquisition device, a compass-sensor embedded footwear system is disclosed. Various foot gestures, foot gesture features and other concepts mentioned above related to foot gesture detections are defined and explained in details along with the compass-sensor embedded footwear system.

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present disclosure. Based on the disclosed embodiment, persons of ordinary skill in the art may derive other embodiments consistent with the present disclosure, all of which are within the scope of the present disclosure.

As an embodiment of the foot gesture feature information acquisition device, the present disclosure provides a compass-sensor embedded footwear system and operation method thereof to achieve its functions as a foot gesture feature information acquisition device. An exemplary compass-sensor embedded footwear system may include a footwear and/or a pair of footwear corresponding to a pair of human feet including, e.g., a left footwear and a right footwear. Each footwear includes a compass sensor, (i.e., a sensor that is able to provide direction/direction angle measurements of the North direction in its own reference 2D coordinate system) to provide foot directional information; two pressure sensors to obtain pressure measurements at designed sole areas of the footwear to obtain user foot touch state, and/or a control-communication unit and a power module supporting the system operation and distribution of obtained information related to foot gesture features to other electronic devices.

In some embodiments, the footwear used in the compass-sensor embedded footwear system may include a footwear sole and footwear body. In other embodiments, the footwear used in the compass-sensor embedded footwear system may be only a footwear sole such as a footwear insole. For example, the footwear may be a shoe having a shoe sole (footwear sole) and a shoe body (footwear body). In another example, the footwear may be a footwear sole such as a shoe insole, which is a separate layer that can be placed in any shoes.

By using the disclosed compass-sensor embedded footwear system, information related to various gesture features (including foot gesture feature information and information used to derive foot gesture features) can be obtained, and distributed to an electronic device, such as computer, smart phone, game console, etc. Using information from the compass-sensor embedded footwear system, foot gesture features include foot pointing directions, foot touch, and other foot gesture features including foot tilt angle, foot moving trajectory state related features, of a person wearing the footwear, may be obtained with or without further processing at an electronic device.

According to the present disclosure, in one embodiment, foot and/or user directional information and a range of foot gesture information from a user's feet may be effectively provided to a device/devices such as smart phones, tablets, game consoles, computers, to achieve natural hand-free user experiences for navigation in simulated virtual world, for example, in gaming applications and other types of applications. In one embodiment, products based on the present disclosure may be a new type of foot-wearing input device for computers, smart phones, tablet, game console, etc.

As used herein, the term "foot directional information" refers to direction(s) that foot/feet in operation point at. The term "foot directional information" and "foot pointing information" may be interchangeably used in the present disclosure.

As used herein, the term "foot gestures" may include simple gestures, such as taps by foot/feet, and complex gesture behaviors, such as walking, jumping, running, etc.

FIG. 1 illustrates components of an exemplary compass-sensor embedded footwear system in accordance with various embodiments of the present disclosure. The compass-sensor embedded footwear system illustrated in FIG. 1 may include a left footwear and/or a right footwear, which may include a shoe including a shoe body and a shoe sole. Although not shown in FIG. 1, all components in this exemplary system may be configured in a shoe insole.

In various embodiments, two pressure sensors 102 and 107 may be embedded in the left footwear sole 106 at locations corresponding to a bottom of a human left foot. For example, pressure sensor 107 may be positioned at a location corresponding to a center of a fore part (or a center of ball of foot) of a human left foot sole denoted as sole area A, pressure sensor 102 may be positioned at a location corresponding to a center of a heel part of a human left foot sole denoted as sole area B.

In various embodiments, two pressure sensors 202 and 207 may be embedded in the right footwear sole 206 at locations corresponding to a bottom of a human right foot. For example, pressure sensor 207 may be positioned at a location corresponding to a center of a fore part (or a center of ball of foot) of a human right foot sole denoted as sole area C, pressure sensor 202 may be positioned at a location corresponding to a center of a heel part (or a center of heel) of a human right foot sole denoted as sole area D.

In various embodiments, a compass sensor 105/205 maybe embedded in the left/right footwear sole 106/206 or installed on the outer surface of the left/right footwear, at a fixed location and with a fixed orientation with respect to the left/right footwear sole 106/206. The compass sensor 105/205 is placed such that when the left/right footwear sole 106/206 is substantially leveled in a horizontal position, the compass sensor 105/205 is in normal operation.

The compass sensor 105/205 may be a 2-Axis digital compass. Alternatively, the compass sensor 105/205 may be a 3-Axis digital compass, especially when the compass sensor is tilted and not in a horizontally leveled position.

In various embodiments, a control-communication unit 103/203 and a battery module 104/204 may be placed inside or on the outer surface of the left/right footwear 106/206 to support operation of the left/right footwear and its communication with e.g., external devices, such as smart phones, computers, game consoles, etc.

The control-communication unit 103/203, battery module 104/204, compass sensor 105/205 and pressure sensors 102,107/202,207 are connected with wires inside the left/right footwear for power, control and communication.

FIG. 2 further illustrates components of a control-communication unit 103/203, which has a processor module 301 and a wireless communication module 302, e.g., a blue tooth communication module.

For the compass-sensor embedded footwear system, various different configurations, placements, and/or arrangements of the battery module 104/204, control-communication unit 103/203, and compass sensor 105/205 may be included. This may in turn provide different tradeoffs among system performance, footwear appearance, and wearing comfort level.

In a first exemplary type of component arrangement configuration, or exemplary component arrangement configuration 1, the battery module 104/204, control-communication unit 103/203, and compass sensor 105/205, are all embedded in the footwear, for example in the footwear sole 106/206. In this configuration, a charging inlet 101/201 may also be provided on each footwear, either on a footwear sole or a footwear body. In some embodiments, the battery module may be wirelessly charged. In this case, the charging inlet 101/201 is optionally, and may or may not be configured.

The exemplary component arrangement configuration 1 in FIG. 1 has a minimum impact on appearance of the footwear. However, hiding all components inside the footwear bodies may negatively affect system performance in terms of operation hours per charge, and footwear wearing comfort level. See patent WO2018/053055 EN 2018 Mar. 22 for other component arrangement configurations.

With the compass sensors, user's foot pointing directions, alternatively referred to as foot directional information, may be obtained in the user's local North-East coordinate system. The pressure sensors are able to provide pressure measurements at designed user sole areas. The foot directional information, used in conjunction with pressure measurements, may provide (user) directional information on a user's intended movements, and support complex foot gesture detections. The foot and/or user directional information and foot gesture detection results from the compass-sensor embedded footwear system may support various gaming applications and other types of applications for controls and, especially, hand-free navigation in simulated virtual world, to provide unique and improved user experiences.

For example, FIG. 3 illustrates arrangement of pressure sensors at four designed sole areas with respect to the contours of both human feet, and the corresponding left foot direction vector and right foot direction vector.

As shown in FIG. 3, the locations of the pressure sensors, e.g., on the designed sole areas A, B, C and D, may be with respect to contours of left and right soles. Sole area A corresponds to a center of a fore part (or a center of ball of foot) of a human left foot. Sole area B corresponds to a center of a heel part (or a center of heel) of a human left foot. Sole area C corresponds to a center of a fore (or a center of ball of foot) of a human right foot. Sole area D corresponds to a center of a heel part (or a center of heel) of a human right foot. At a certain data sampling time pressure level measurements from pressure sensors 102, 107, 202 and 207 may be denoted as $P_A$, $P_B$, $P_C$ and $P_D$, respectively.

FIG. 3 also illustrates foot direction vectors $V_{LF}$ (701) for a human left foot and $V_{RF}$ (702) for a human right foot, which are aligned with the directions to which the corresponding foot is pointing at when a user is wearing the footwear.

Figure 4:
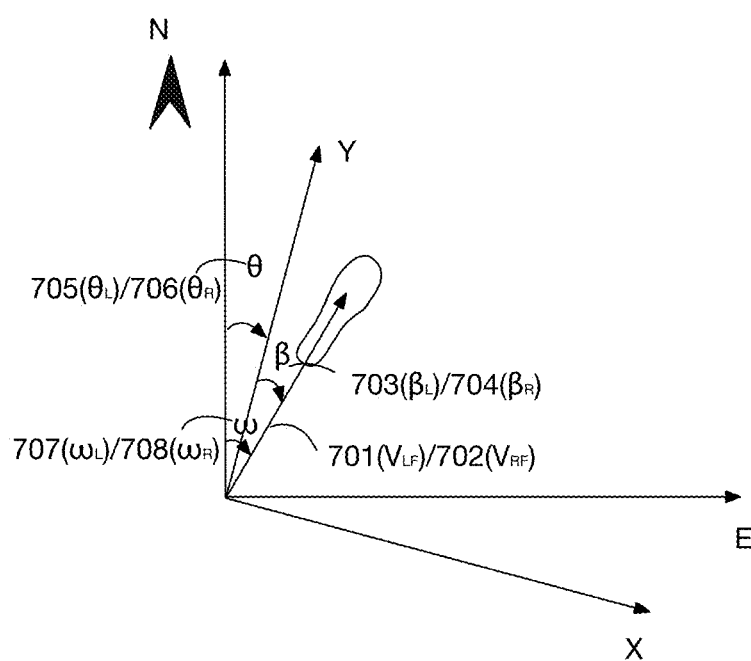
FIG. 4 illustrates an exemplary relationship between a user's local North-East (N-E) coordinate system, a compass sensor's own reference X-Y 2 dimensional (2D) coordinate system, and a foot pointing direction vector according to various embodiments of the present disclosure.

FIG. 4 illustrates an exemplary relationship between the user's local North-East (N-E) coordinate system, a compass sensor's own reference X-Y 2D coordinate system, and a foot direction vector. In FIG. 4 the N axis corresponds to the user's local North direction, and the E axis corresponds to the user's local East direction. The Y axis corresponds to a compass sensor's reference 2D coordinate Y. The X axis corresponds to a compass sensor's reference 2D coordinate X. Angle $\theta_L/\theta_R$ (705/706) is the angle from the North N axis to the Y axis, which can be obtained from compass sensor measurements.

Vector $V_{LF}$ or $V_{RF}$ corresponds to the foot direction vector 701/702 for left/right foot. Angle $\beta_L/\beta_R$ (703/704) is the angle from the Y axis of a compass's reference coordinate system to a left/right foot direction vector 701/702. Once a compass sensor 105/205 is installed to the left/right footwear with a fixed orientation with respect to the left/right footwear sole 106/206, $\beta_L/\beta_R$ (703/704) is fixed and can be easily measured/obtained. Angle ω is the sum of θ and β, which is a foot (footwear) pointing direction angle in the user's local North-Each (N-E) coordinate system, i.e., the angle from the local North (N) axis to the foot direction vector. For left foot, the foot pointing direction angle ω is denoted as $\omega_L$ (707), and for right foot, the foot pointing direction angle ω is denoted as $\omega_R$ (708). For each foot, the local processor 301 is able to obtain θ (705/706) from the compass sensor and then evaluate the foot pointing direction angle ω (707/708) in the local North-East 2D coordinate system with the pre-obtained β (703/704) of the corresponding left/right footwear.

Figure 5:
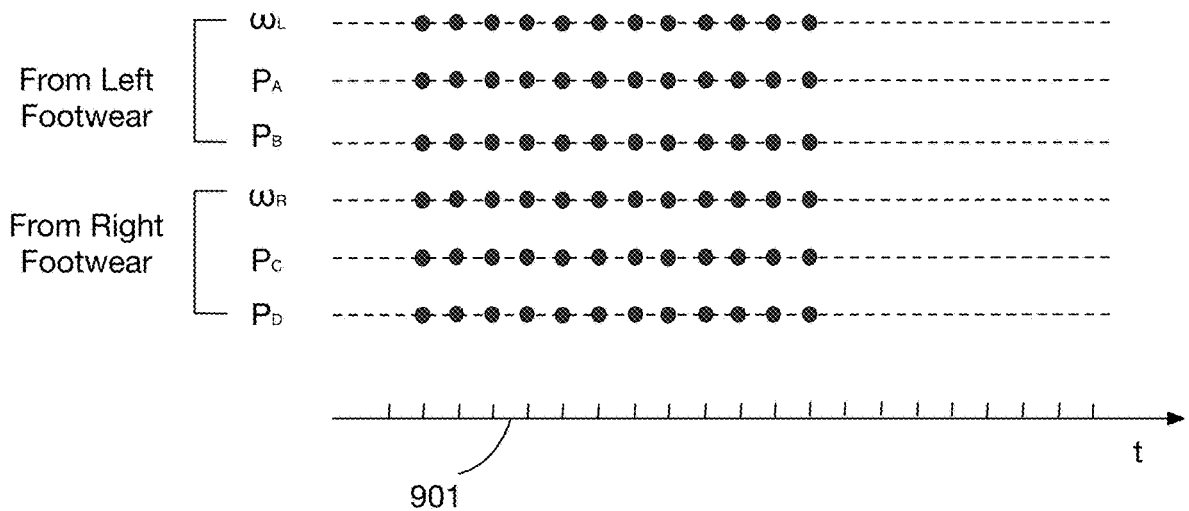
FIG. 5 illustrates exemplary left and right footwear measurement-information sets to obtain foot touch state and foot pointing direction in a compass-sensor embedded footwear system at data sampling times according to various embodiments of the present disclosure.

FIG. 5 summarizes the flows of measurements/derived measurements in the compass-sensor embedded footwear system over time in order to obtain foot pointing direction and foot touch states as two fundamental foot gesture features. The sampling time interval is denoted as 901, which need not to be uniform. The uniform sampling time interval illustrated in FIG. 5 is only for illustration purpose. At each data sampling time, the compass sensor unit (105/205) of the left/right footwear provides a $\theta_L/\theta_R$ measurement (705/706), which is used to obtain $\omega_L/\omega_R$ (707/708) in the local N-E coordinate system with the pre-obtained $\beta_L/\beta_R$ (703/704). The pressure sensors (107 and 102) of the left footwear provide pressure measurements $P_A$ and $P_B$ at the corresponding sole areas. The pressure sensors (207 and 202) of the right footwear provide pressure measurements $P_C$ and $P_D$ at the corresponding sole areas. At each sampling time, the obtained $\omega_L$ 707/$\omega_R$ 708, and pressure measurements ($P_A$, $P_B$)/($P_C$, $P_D$) form a left/right footwear measurement-information set.

Figure 6:
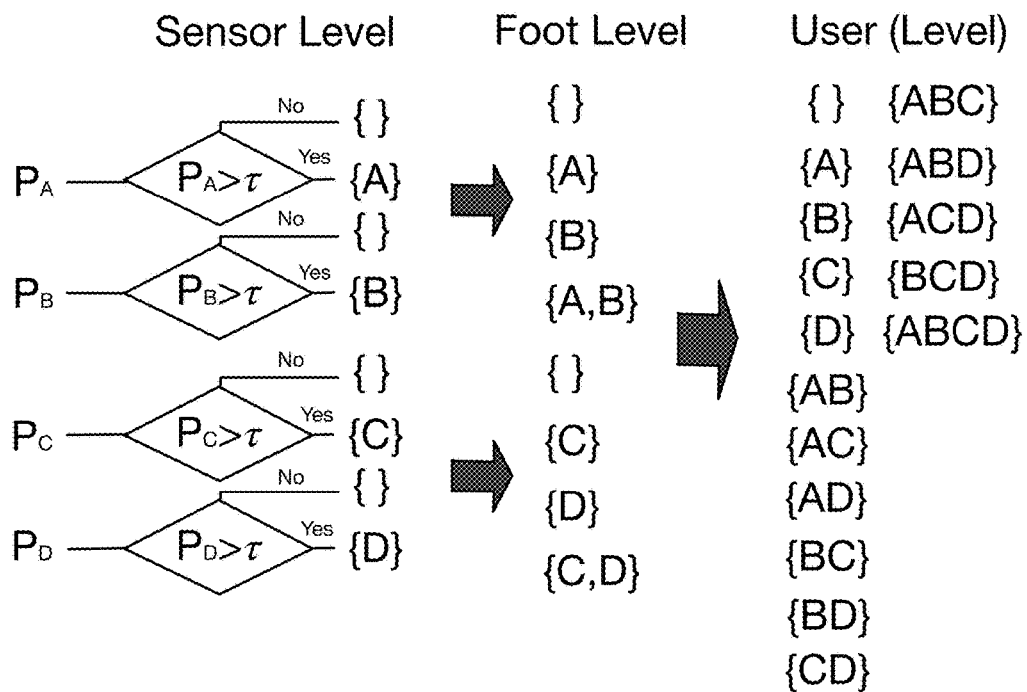
FIG. 6 illustrates processing of pressure sensor measurements to obtain sole area touch detection results, foot touch detection results, i.e., single foot touch states, and a user touch detection outcome, i.e., Bi-foot foot touch state, at a data sampling time.

At a data sampling time, pressure measurements $P_A$, $P_B$, $P_C$ and $P_D$ may be used together to obtain a user (foot) touch detection outcome, i.e., the user foot touch state. One example of deriving user foot touch state based on pressure measurements $P_A$, $P_B$, $P_C$ and $P_D$ is illustrated in FIG. 6. Other methods can also be used to derive user foot touch state from pressure sensor measurements. As illustrated in FIG. 6, the pressure measurement from each sensor is first compared to a pre-set threshold level τ, above which a touch of the corresponding sole area touch is detected. The sensor-level sole area touch detection results that correspond to the left or right foot may be combined to produce foot-level touch detection results. As illustrated in FIG. 6, for each foot, a foot-level touch detection result, i.e., a single foot touch state, may fall in a set of four possible outcomes, denoted as { }, {A}, {B} and {A B} for left foot, and { }, {C}, {D}, {C D} for right foot. Combining the foot-level touch detection results for both feet, a user foot touch detection outcome, i.e., a Bi-foot touch state, at a data sampling time may be obtained which has 16 possible outcomes, corresponding to 16 Bi-foot touch states, as the example listed in FIG. 6 ranging from { } (no-touch) to {A B C D} (full-touch). A user's single foot and Bi-foot touch state are basic/fundamental foot gesture features supporting the detection of various user foot gestures. In some embodiment of the disclosure, a user's foot touch state is determined by whether a fore part of a user's foot sole and a heel part of a user's foot sole touch/press a supporting surface/platform including the ground.

Accordingly, a foot gesture feature information acquisition device obtains information related to foot gesture feature(s) and send the information to an electronic device. Information related to foot gesture feature(s) may be foot gesture features, i.e., information directly related to foot gesture features, or information needed to derive foot gesture feature information, i.e., information indirectly related to foot gesture features.

The present disclosure is able to obtain rich action and gesture feature information from human feet that are not available from existing hand operation based systems. Outputs from the present disclosure can be used for device control, video game applications, interactive 3D programs and virtual reality applications to support hand-free navigation in simulated virtual worlds.

Motion sensors including gyroscope (angle rate) sensors, accelerometers and combined gyroscope-accelerometers, may be added to the compass embedded footwear system to provide information such as foot acceleration information and angular velocity information. The motion sensor used herein may refer to individual sensors, such as gyroscope and/or accelerometer, as well as any combination of multiple types of sensors used for motion detection. The motion sensors may be place inside or outside of the footwear and properly connected through wires for power, control and communication. Like the compass sensor, the motion sensor(s) are normally arranged to have a fixed orientation with respect to the foot sole. As a result, the motion sensor(s) have a fixed orientation with respect to the compass sensor. Information from the motion sensor, such as gyroscope sensors and/or accelerometers, is able to detect and characterize the user's foot movement, and can be used as new foot gesture features or used to derive other foot gesture feature information to support new types of foot gesture detections along with the foot directional information from the compass sensor. For example, for foot gesture detections, information from motion sensors, such as gyroscope sensors and accelerometers, can be jointly used with the foot directional information from the compass sensor to support the detection of fast and/or slow kicking movements in various directions. As another example, accelerometers are often used to support 3-axis compass sensors, where foot roll and pitch angle measurements from an accelerometer can be jointly used with measurements from a 3-axis compass sensor for tilt compensation. A tilt compensated compass sensor is able to give more accurate readings when the compass operates in a titled position.

In fact, accelerometer and gyro sensors are important to the compass-sensor embedded footwear to provide stable and accurate foot pointing direction information, as well as the accurate detection of sudden changes in foot pointing direction. This is because positions of the compass sensor unit 105/205 will not remain at a position that is level to the ground due to user's foot position changes and various foot movements. In a titled (unleveled) position, a 2-axis or 3-axis compass sensor alone cannot give accurate direction information because the magnetic field projects differently on the sensor's axes in a tilted position. Information for a 3-axis accelerometer need to be used for tilt compensation to recover the compass sensor measurements that would have been obtained by the compass sensor in a position leveled to the ground.

On the other hand, tilt compensation with 3-axis accelerometer measurements is only effective when the sensors are relatively stationary such that accelerometer measurements in x, y and z axes can be used to derive tilt information (roll and pitch angles) of the sensor platform accurately. For the derivation of foot pointing direction angle in presence of significant user foot movement, such as foot wiggle movement, measurements from a 3-axis gyro sensor may be effectively used. The gyro sensor provides angle rate information of the sensor platform in 3 axes. Depending on the sensor position relative to user's foot, angle rate measurements in one of the x, y and z axes or a certain combination of the gyro measurements in all 3 axes may be effectively used as turn rate of the user foot pointing direction. With the foot pointing direction turn rate, changes in foot pointing direction can be effectively derived by integration of the turn rate over time; and the foot pointing directions can also be derived based on the derived direction changes.

In summary when a user's foot has no significant movement a 3-axis compass sensor and a 3-axis accelerometer are used together as a tilt compensated compass to provide accurate foot pointing direction information in different foot positions; when a user's foot has significant movement, angle rate measurements from a 3-axis are used to derive changes in the foot pointing direction; the detection of significant user foot movement can be easily achieved using measurements from the 3-axis accelerometer and/or the 3-axis gyro sensor. As a result, for desired system performance in deriving accurate foot pointing direction information in various practical conditions, in embodiments of the invention the compass sensor unit 105/205 is a 9-axis sensor unit including a 3-axis compass, a 3-axis accelerometer and a 3-axis gyro sensor.

Note that with tilt compensation, the compass sensor unit 105/205 can in principle operates in any orientations. As a result, the compass sensor unit 105/205 does not need to be installed in a leveled position, which offers more freedom in sensor placement. However, the orientation of the compass sensor unit 105/205 still need to have a fixed orientation w.r.t the user's foot.

Besides foot pointing direction information, and foot touch state, when the compass sensor unit 105/205 is a 9-axis sensor unit, including a 3-axis compass sensor, a 3-axis accelerometer, and a 3-axis angle rate (gyro) sensor, information on additional foot gesture features can be obtained by the compass-sensor embedded system. These foot gesture features include foot tilt angle(s), foot roll angle(s) and various foot moving trajectory state related foot gesture features, which will be detailed as follows.

In the compassed embedded footwear system, foot tilt angles can be derived using measurements from the 3-axis accelerometer in the compass sensor unit 105/205 when a user foot is not in significant movement. When a user foot is in significant movement changes in foot tilt angle can be effectively tracked using measurements from a 3-axis gyro sensor in the 9-axis compass sensor unit.

Figure 7:
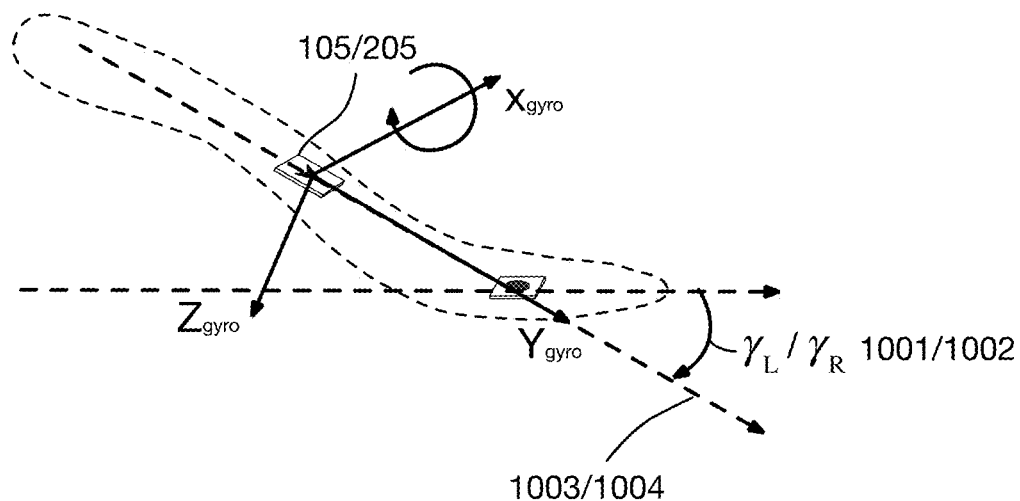
FIG. 7 illustrates the relationship between the variation/change in foot tilt angle $\gamma_L/\gamma_R$ (1001/1002) and the rotation angle around the gyro sensor's x-axis in an assumed sensor placement configuration.

For example, assume, without loss of generality, the compass sensor unit 105/205 is installed in a position such that the plane formed by the x-axis and y-axis of the gyro sensor is parallel to the user foot sole surface, and the y-axis is the same as the left/right 3D foot pointing direction $V_{LF3D}/V_{RF3D}$ (1003/1004). Assuming the foot roll angle $\lambda_L/\lambda_R$ (1005/1006) is small and negligible. As illustrated in FIG. 7, the variation/change in foot tilt angle $\gamma_L/\gamma_R$ (1001/1002) corresponds to the rotation around the gyro sensor's x-axis, i.e. Xgyro, which can be derived by integrating the x-axis angle rate measurements from the gyro sensor over time. In other sensor placement configuration, variation/change in foot tilt angle $\gamma_L/\gamma_R$ (1001/1002) can also be similarly derived using gyro sensor measurements.

As described earlier, to offer desired foot pointing direction measure performance, the compass sensor unit 105/205 is a 9-axis sensor unit including a 3-axis compass, a 3-axis accelerometer and a 3-axis gyro sensor. In such a configuration, measurements from the accelerometer can be used to derive the foot tilt angle information.

Figure 8:
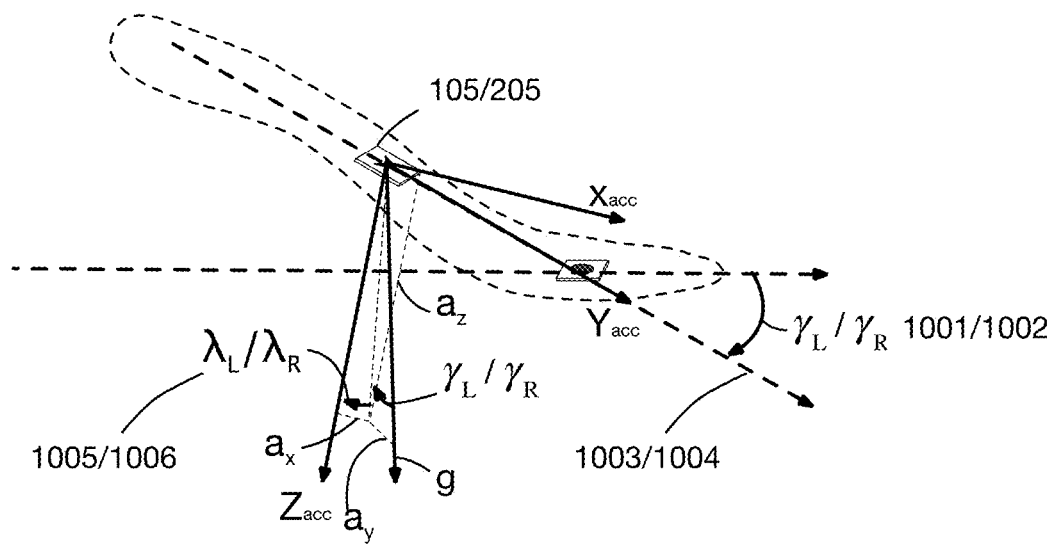
FIG. 8 illustrates the evaluation of foot tilt angle using measurements from a 3-axis accelerometer in the compass sensor unit 105/205.

For example, assume, without loss of generality, the compass sensor unit 105/205 is installed in a position such that the plane formed by the x-axis and y-axis of the accelerometer is parallel to the user foot sole surface, and the y-axis is the same as the middle line of the left/right foot sole (1003/1004) (as a result the foot pointing direction) as shown in FIG. 8. In such a sensor place configuration, the foot tilt angle $\gamma_L/\gamma_R$ of the left/right foot, i.e., $\gamma_L/\gamma_R$ ((1001/1002) can be obtained as $$\gamma = a\tan\frac{a_y}{\sqrt{a_x^2 + a_z^2}},$$

where $a_x$, $a_y$ and $a_z$ are measurements in x, y, and z axes (denoted as $x_{acc}$, $y_{acc}$, and $z_{acc}$ in FIG. 8) of the accelerometer in 105/205. As illustrated in FIG. 8 measures $a_x$, $a_y$ and $a_z$ are projections of the gravitational vector g to the accelerometer's x, y and z coordinates. In other sensor placement configurations, the foot tilt angle can be derived from the 3-axis accelerometer measurements with proper linear coordinate conversions.

As shown in FIG. 8, another angle in the x-y plane of the accelerometer's coordinate system $\lambda_L/\Delta_R$ (1005/1006) corresponds to the roll angle of a user's left/right foot. This angle can also be derived using measurements from the accelerometer in the compass sensor unit (105/205) and be used as additional foot gesture parameters when needed.

Figure 9:
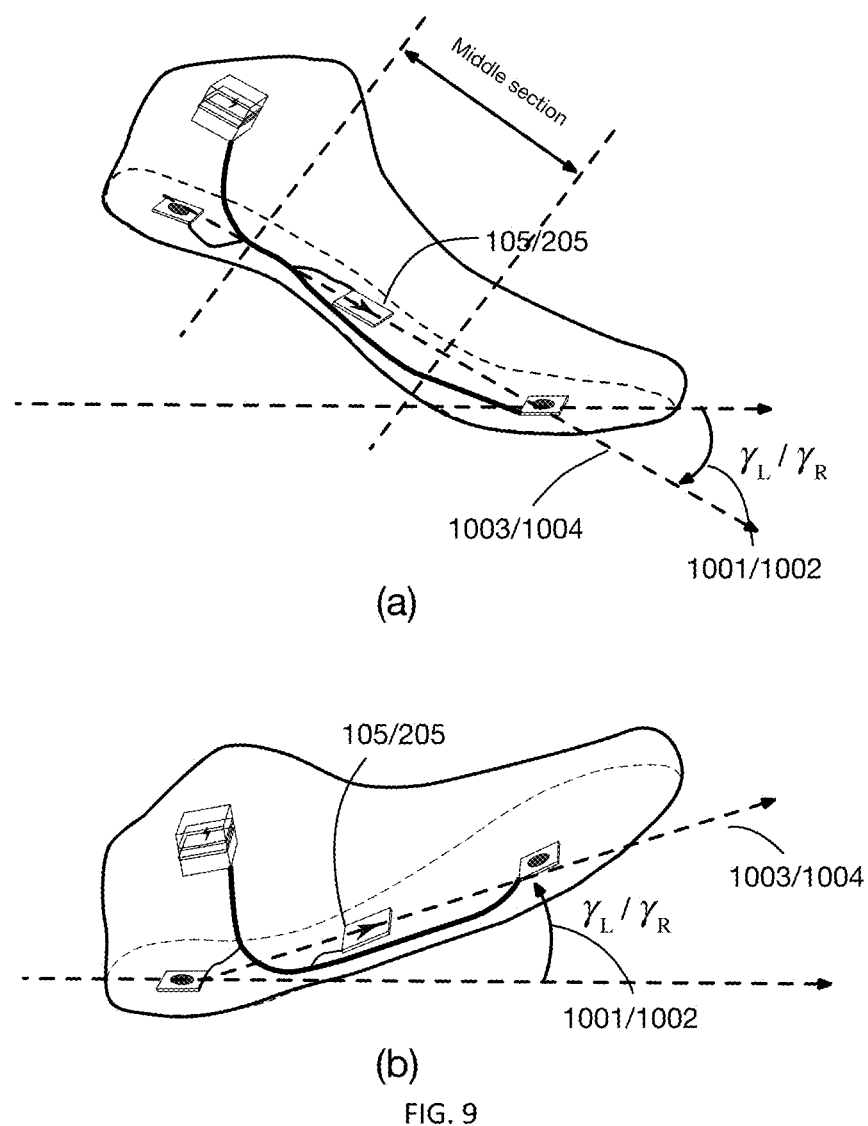
FIG. 9 illustrates the concept of foot tilt angles

Note that to obtain desired foot tilt angle measurements for both cases with fore part of a user's foot sole touching (pressing) the ground (as in FIG. 9*a*) and with heel part of a user's foot sole touching (pressing) the ground (as in FIG. 9*b*), the compass sensor unit 105/205 should be placed close to the middle section (in length direction) of the user foot or foot sole as illustrated in FIG. 9.

Also note that the use of 3-axis accelerometer measurements to obtain foot tilt angles requires that the user's foot is not having significant movements.

For the derivation (estimation) of foot tilt angle $\gamma_L/\gamma_R$ (1001/1002) when a user's foot is moving or stationary the processing flow.

Similarly, the derivation of user foot pointing direction

For the derivation (estimation) of foot pointing direction,

See patent WO2018/053055 EN 2018 Mar. 22 for the estimation of foot moving trajectory.

The compass embedded footwear system is an expandable system that supports functions including foot directional information extraction, foot gesture detections, and/or any other additional functions on top of it.

A systematic framework for user foot gesture detection based on user foot gesture features including user foot pointing direction(s) and foot touch state is described as follows.

In general, a system support user foot gesture detection and foot gesture based user-device control/interactions consists of i) a foot gesture feature information acquisition device, e.g., a compass-sensor embedded footwear system, used to obtain information related to foot gesture features and to distribute the information to an electronic device, and ii) an electronic device that receives information from the foot gesture feature information acquisition device, performing user foot gesture detections using the received information, and generate controls, including signals, message, etc. and perform operations based on foot gesture detection results.

Before the presenting the method for foot gesture detection, the definition of foot gestures is first presented. Predefined foot gestures may be stored in the storage media of the electronic device as data or as parts of executable codes to support the detection of the foot gestures.

In general, a (user) foot gesture is a sequence of foot gesture states. The length of the sequence can be any number from 1 to infinity.

Each foot gesture state corresponds to a set of requirements on foot gesture features. Different foot gesture states may have different requirements on the same set or different sets of foot gesture features. Foot gesture features includes (user) foot pointing direction related features, e.g., 701/702, (user) foot touch state, and others.

Note that the sequence of foot gesture states (or foot gesture state sequence) defining a foot gesture specifies i) a set of foot gesture states allowed by the foot gesture, and ii) a transition sequence formed by the (allowed) foot gesture states.

As an illustrative example, consider a first foot gesture given by a first abstract sequence of foot gesture state: S1->S2->S3. The foot gesture has three (allowed) foot gesture state, i.e., S1, S2 and S3, and requires the foot gesture state sequence to start from S1 then transit/switch to S2 then switch to S3. Here the -> mark is a sequential mark, which is used to connect two consecutive foot gesture states in the foot gesture state sequence.

A second foot gesture state sequence S2->S1->S3 has the same set of foot gesture states as S1, S2, S3. However, the transition sequence of the foot gestures states is different from that of the first foot gesture. As a result, the second foot gesture state sequence corresponds to a different foot gesture than the first foot gesture.

A foot gesture state sequence specifies a transition sequence formed by the (allowed) foot gesture states, which also infers that two consecutive foot gesture states cannot be the same, since there is no foot gesture state transition. For example, S1->S2->S2->S1 is not a valid foot gesture state sequence for a foot gesture, while S1->S2->S1 is a valid foot gesture state sequence.

Several examples of foot gesture definitions are given as follows.

Starting from the basics, various user foot gestures can be defined/detected based solely on the two basic types of foot gesture features, i.e., user foot pointing direction (s) and user foot touch state.

Figure 10:
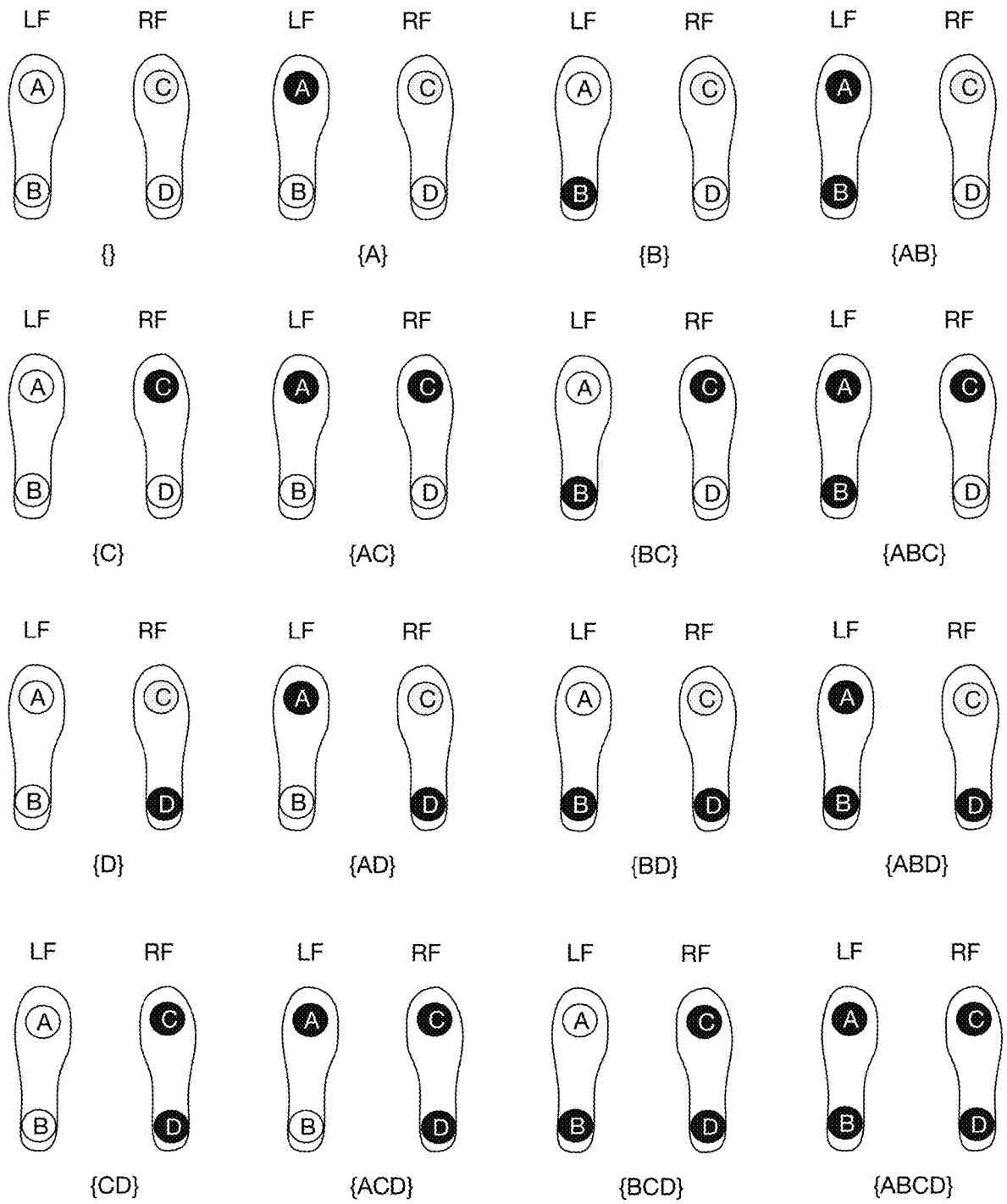
FIG. 10 illustrate Bi-foot touch states corresponding to different touch areas touching (pressing) the ground

As earlier discussed, by processing information from the foot gesture feature information acquisition device, such as the compass-sensor embedded footwear system, foot touch state can be obtained. There are in total 16 Bi-foot touch states, which are shown in FIG. 10 with black circles indicating the corresponding foot areas are in touch with (or pressing) the ground. When only one Left or Right foot is involved, there are four single-foot touch states corresponding to left/right foot.

Conveniently the foot touch states are denoted as { }, {A}, {AB}, {ACD}, {ABCD}, etc., where A, B, C, and D in the bracket indicate foot sole areas touching the ground. Without loss of generality and following the definitions in FIG. 3, area A corresponds to a fore part of a user's left foot sole, area B corresponds to left foot heel, area C corresponds to a fore part of a user's right foot sole, and area D corresponds to right foot heel.

Foot gestures can be defined for single foot (single foot gestures) or both feet (Bi-foot gestures), which can be further categorized as touch based gestures, foot pointing direction based gestures, and combined gestures based on foot gesture features used for foot gesture detection.

Single Foot Gestures:

Single foot gestures are foot gestures based on actions of one foot. They are used when user foot pointing direction information and foot touch status is only available from one (either left of right) foot, e.g., when user only wears footwear on one foot. Single foot gestures can also be used for composing Bi-foot gestures.

Single Foot Touch Only Gestures:

Touch Based Single Foot Gestures can be defined and detected based on single (left/right) foot touch state.

Basic foot gestures may have a foot gesture state sequence with only one foot gesture state.

None in-touch foot gesture has a foot gesture state sequence of: { }.

The foot gesture state sequence has only one foot gesture state, i.e., { }, requiring left/right foot touch state to be { }.

Left foot full touch foot gesture has a foot gesture state sequence with only one foot gesture state, i.e., {AB}, requiring left foot touch state to be {AB}.

Right foot full touch foot gesture has a foot gesture state sequence with only one foot gesture state, i.e., {CD}, which requires right foot touch state to be {CD}

Left foot front only touch foot gesture has a foot gesture state sequence with only one foot gesture state, i.e., {A}, which requires left foot touch state to be {A}

Similarly defined, Right foot front only touch foot gesture has only one foot gesture state {C};

Left foot heel only touch foot gesture has only one foot gesture state {B}; and

Right foot heel only touch foot gesture has only one foot gesture state {D}.

A Left foot touch ground foot gesture has only one foot gesture state {A, B, AB}. Foot gesture state {A, B, AB} requires that left foot touch state to be {A} or {B} or {AB}, i.e., belonging to the set of left foot touch state {A, B, AB}. Here, notation {ele1, ele2, ele3} is used to denote the set of allowed foot touch states of the foot gesture state, where ele1, ele2, ele3, stands for foot touch state.

When the number of foot gesture states in the foot gesture state sequence is more than one, -> mark is used to connect two consecutive foot gesture states.

Type I Tap:

Description: foot heel part stays in touch with ground; fore part of a user's foot sole taps ground.

Left Foot Type I Tap gesture, denoted as LFTapI has the following foot gesture state sequence: {AB}->{B}->{AB}->{B}->{AB} . . . .

The foot gesture has two (allowed) foot gesture states {B} and {AB}. Foot gesture state {B} requires that left foot touch state to be {B}. Foot gesture state {AB} requires that user right foot touch state to be {AB}.

Note that the foot gesture state sequence of LFTapI has an indefinite length and has a repetitive pattern.

Right Foot Type I Tap gesture, denoted as RFTapI, has the following foot gesture state sequence: {CD}->{D}->{CD}->{D} . . . .

The foot gesture has two allowed foot gestures states {C} and {CD}. Foot gesture state {C} requires that user right foot touch state to be {C}. Foot gesture state {CD} requires that user right foot touch state to be {CD}

The foot gesture state sequence has an indefinite length and a repetitive pattern.

A count parameter may be associated with a foot gesture that is repetitive in nature. For example, a foot gesture corresponds to the following foot gesture state sequence {AB}->{B}->{AB}->{B}->{AB}->{B}->{AB} which is a truncated version of foot gesture LFTapI. Such a foot gesture is denoted as LFTapI_3, where a count parameter 3 (connected to the notation of the corresponding un-truncated foot gesture, i.e., LFTapI, by a _ mark) indicating the number of repetitions of the foot gesture state pattern required by the foot gesture.

More generally LFTapI_n, (n=1, 2, 3, 4 . . . ) denotes a similar repetitive foot gesture (truncated) from foot gesture LFTapI, i.e., a finite length left foot type I Tap foot gesture. The count parameter n corresponds to the number of left foot Type I Taps required by the foot gesture.

For more examples of single foot and Bi-foot gestures see patent WO2018/053055 EN 2018 Mar. 22.

Besides foot pointing direction related foot gesture features and foot touch state, user foot tilt angle $\gamma_L/\gamma_R$ (1001/1002) can also be used as a foot gesture feature for foot gesture definition and detection. For TapDown or directed TapDown foot gestures, foot tilt angle can be used as additional parameters. FIG. 9 also illustrates the foot tilt angles associated with Tapdown or directed Tapdown foot gestures.

As illustrated in FIG. 9, in a Tapdown or directed Tapdown foot gesture, the user's foot sole is not level to the ground. To characterize the tilted foot position, a user foot tilt $\gamma L/\gamma_R$ (1001/1002) for left/right foot can be used, which is the angle from the middle line of the foot sole along the sole surface (1003) to a leveled ground surface.

As an additional type of foot gesture feature, foot tilt angles can be incorporated to single foot directed Tapdown foot gestures, including $V_{LF}+\{A\}$, $V_{LF}+\{B\}$, $V_{RF}+\{C\}$ and $V_{RF}+\{D\}$ in many applications to offer desired user experiences.

Such foot gestures with foot tilt angle each have one foot gesture state, e.g., $V_{LF}+\gamma_L+\{A\}$, $V_{LF}+\gamma_L+\{B\}$, $V_{RF}+\gamma_R+\{C\}$ and $V_{RF}+\gamma_R+\{D\}$ Foot gesture state $V_{LF}+\gamma_L+\{A\}$, which is also a foot gesture since the foot gesture has only one foot gesture state, requires the user's left foot touch state to be {A} and requires the that $V_{LF}$ and $\gamma_L$ are provided with the foot gesture.

For example, such directed Tapdown gestures with title angles can be used for movement control in a direction. The tilt angle of the corresponding foot $\gamma_L/\gamma_R$ can be used as a control parameter (representing "strength" of the control) to indicate the speed of the movement in the intended direction (e.g., larger tilt angle for higher moving speed). Without the additional tilt angle, the directed Tapdown foot gestures can only be used to give instructions on whether a movement should be made in a direction.

Figure 11:
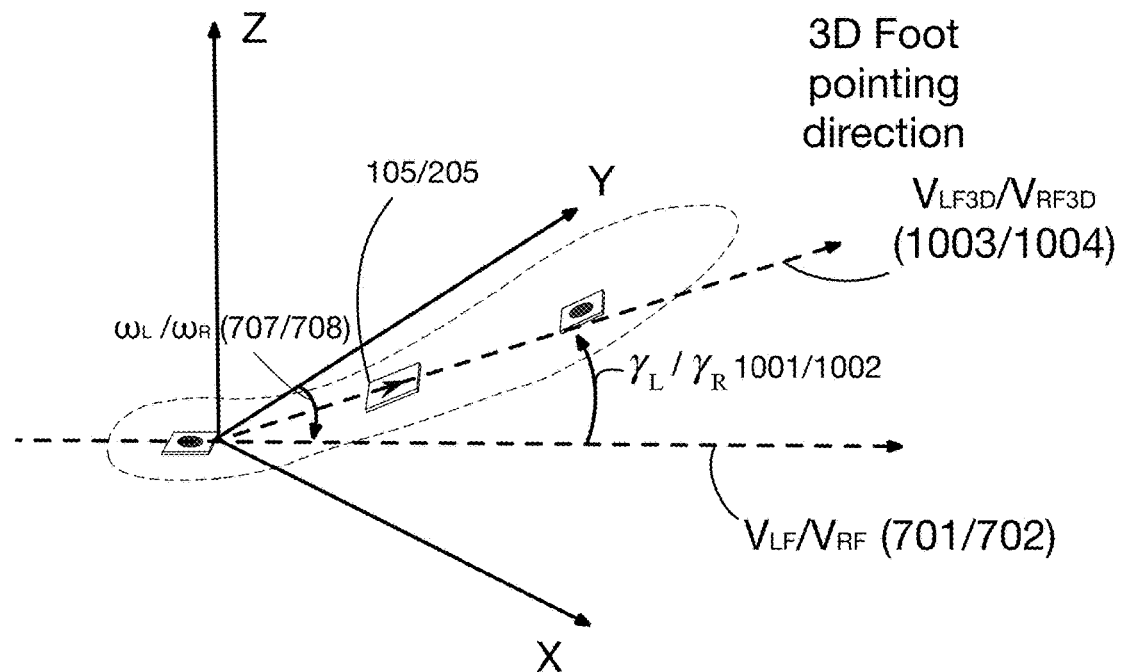
FIG. 11 illustrates the relationships between foot tilt angle $\gamma_L/\gamma_R$ (1001/1002), the original 2D foot pointing direction vector $V_{LF}/V_{RF}$ (701/702) and a 3D foot pointing direction $V_{LF3D}/V_{RF3D}$ (1003/1004) in a local stationary (fixed/non-rotating) 3D coordinate system

The introduction of foot tilt angles in fact generalizes the user foot pointing direction to a 3D space. FIG. 11 illustrates the relationships between foot tilt angle $\gamma_L/\gamma_R$ (1001/1002), the original 2D foot pointing direction vector $V_{LF}/V_{RF}$ (701/702) and a 3D foot pointing direction $V_{LF3D}/V_{RF3D}$ (1003/1004) in a local stationary (fixed/non-rotating) 3D coordinate system that does not rotate with user movement. The X-Y plane of the local 3D coordinate system is assumed to be level (or parallel to a leveled ground surface), the Z axis of the coordinate system is perpendicular to the X-Y plane. The 2D foot pointing direction is defined in the X-Y plane and can be specified by a foot pointing direction vector $V_{LF}/V_{RF}$ (701/702). The 3D foot pointing direction vector $V_{LF3D}/V_{RF3D}$ is the same as vector 1003/1004 in FIG. 9. It can be seen that $V_{LF}/V_{RF}$ (701/702) is the projected direction vector of $V_{LF3D}/V_{RF3D}$ (1003/1004) in the X-Y plane. While $\gamma_L/\gamma_R$ (1001/1002) is defined in the plane formed by $V_{LF3D}/V_{RF3D}$ (1003/1004) and the local Z axis, which is the elevation of the 3D foot pointing direction with respect to the X-Y plane.

In particular foot tilt angle can be used to define various Tap foot gestures. See patent WO2018/053055 EN 2018 Mar. 22 for more tilt related foot gestures.

From a 3D foot moving trajectory (1008/1009), as introduced earlier in the disclosure, many foot moving trajectory state related features can be extracted and used as foot gesture features. See patent WO2018/053055 EN 2018 Mar. 22.

Key concepts for foot gesture detection, such as foot gesture, foot gesture state and foot gesture features, have been introduced. It is shown that various types of foot gestures, foot gesture states can be defined based on various foot gesture features including (2D) foot pointing direction, foot touch state, foot tilt angle, foot moving trajectory state related features, etc.

To summarize, a user foot gesture is a sequence of foot gesture states. Each foot gesture state corresponds to a set of requirements on a set of foot gesture features. The most important foot gesture features are user foot touch state and user 2D foot pointing direction(s) (which may be given in different various such as, foot pointing direction vector $V_{LF}/V_{RF}$ (701/702) or foot pointing (direction) angle $\omega_L/\omega_R$ (707/708)). Additional foot gesture features including foot tilt angle(s), foot roll angle(s), foot moving trajectory state related foot gesture features, etc.

Table 1 lists key terminologies used in the present disclosure to clarify their meanings.

The foot gesture feature information acquisition device and its methods are summarized as follows.

A foot gesture feature information acquisition device, such as the compass-sensor embedded footwear system, is able to communicate with an electronic device. The foot gesture feature information acquisition device is able to acquire, at a data sampling or information acquisition time, information related to various foot gesture features including 2D foot pointing directions, (in a certain form, e.g., foot direction vector $V_{LF}/V_{RF}$ (701/702) or foot pointing direction angle $\omega_L/\omega_R$ (707/708)), fused user (forward) directional vector $V_{FWD}$ 709, and foot touch state such as single foot touch states and/or Bi-foot touch states.

The foot gesture feature information acquisition device may also obtain information related to additional foot gesture feature including foot tilt angle(s)$\gamma_L/\gamma_R$ (1001/1002) from a user's one foot or both feet.

The foot gesture feature information acquisition device may also obtain information related to additional foot gesture features including various foot moving trajectory state related features.

The acquired information related to foot gesture features at the sampling time is then sent to an electronic device through a communication link for foot gesture detections, which makes the foot gesture feature information acquisition device an input device. Note that the communication link may be an internal communication link when the electronic device is also a foot gesture feature information acquisition device. In some embodiments, such as in the compass-sensor embedded footwear system, multiple physically separated devices may work together as a foot gesture feature information acquisition device.

TABLE 1

A list of Key terminologies related to foot gestures

| Terminologies | Description | Examples |
|---|---|---|
| Foot gesture | Various types of user foot gestures, actions. Each foot gesture corresponds to a sequence of foot gesture states | Walk, Run, Tap, tapdown, directed walk, directed tapdown, etc. |
| Foot gesture features | Various measurable (obtainable) features that can be used for the detection of foot gesture(s) | Foot pointing direction(s): $V_{LF}/V_{RF}$ (701/702) or $\omega L/\omega R$ (707/708) Foot touch state Foot tilt angle(s): $\gamma_L/\gamma_R$ (1001/1002) Foot moving trajectory state related features |
| Information related to foot gesture features | Information that can be used to derive/obtain foot gesture features, or obtained foot gesture features | Pressure measurements at different sole areas, Measurements from compass sensor, accelerometer, angle rate sensor. Various foot gesture features |
| Foot gesture feature information acquisition device | A device used for obtaining and distributing information related to foot gesture feature(s). The acquisition device normally consists of sensing components, local processing components, and communication components. It can be one device or multiple devices work jointly for the monitoring of various foot gesture features. | Compass-sensor embedded footwear system |

An important set of foot gesture features (newly introduced in this disclosure) are movement levels that characterize the degrees and directions of user foot forward/backward movements, user foot sideway movements, and user foot up/down movements. Foot gesture feature information acquisition devices, such as the compass embedded footwear disclosed in patent WO2018/053055 EN 2018 Mar. 22 may provide data supporting the evaluations of user foot movement levels. From the beginning of a user foot movement to the end of the user's foot movement, the movement levels can be evaluated and updated using data from the foot gesture feature information acquisition device.

Figure 12:
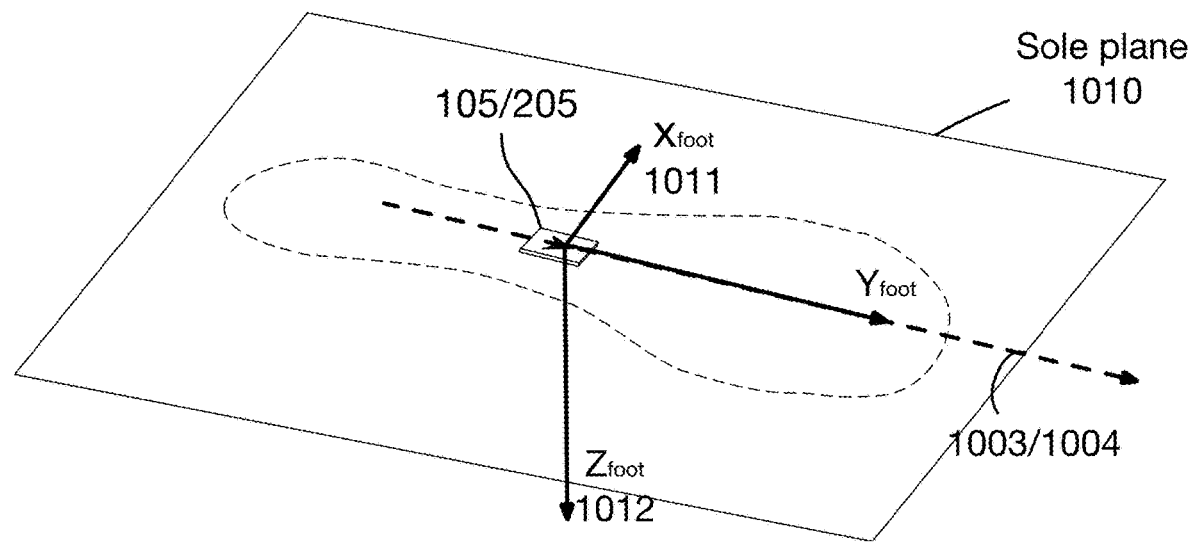
FIG. 12 illustrates 3 exemplar axes with respect to a user's left or right foot sole plane for foot movement level evaluations.

The foot movement level evaluations can be done in 3 axes with respect to a user's left or right foot (sole plane). As shown in FIG. 12 the sole plane 1010 is an imaginary plane that a user's foot sole (including sole heel and front ball of the sole) is in touch. The first axis, denoted as $Y_{foot}$, corresponds to (is aligned with) the user's foot pointing direction 1003/1004 (see FIG. 12 and FIG. 8), which is in the sole plane. Movements along the first axis corresponds to user foot forward/backward movements. Movement level in $Y_{foot}$ axis, denoted as $MI_Y$ characterizes the intensity/degree of user foot movement in $Y_{foot}$. The second axis 1011, denoted as $X_{foot}$, is an axis that is also in the sole plane and is perpendicular to the first axis. Movements along the second axis corresponds to user foot sideway movements. Movement level in $X_{foot}$ axis, denoted as $MI_X$ characterizes the intensity/degree of user foot movement in $X_{foot}$. The third axis 1012, denoted as $Z_{foot}$, is perpendicular to the sole plane. Movements along the third axis correspond to vertical foot movements. Movement level in $Z_{foot}$ axis, denoted as $MI_Z$ characterizes the intensity/degree of user foot movement in $Z_{foot}$. Note that the three axes $X_{foot}$, $Y_{foot}$ and $Z_{foot}$ are defined with respect to a user's foot sole plane, which moves as the user's foot moves/turns. The use of 3 axes in other coordinates systems, e.g., local North-East-Up coordinates, for movement level evaluation is also possible, but may be much harder to implement.

In general the evaluation of user foot movement level in an axis, e.g., $MI_X$, $MI_Y$, $MI_Z$, involves the evaluation of foot movement intensity in the axis at each sampling time. The foot movement intensity can evaluated by, for example, as the motion acceleration in the axis at a sampling time. Here, the motion acceleration in each axis accounts for acceleration caused only by user foot motion. Acceleration components from gravitational acceleration needs to be taken out from the evaluation. The evaluation of (foot) motion acceleration in an axis involves i) evaluating the projection of gravitational acceleration on the corresponding axis at the data sampling time; and ii) evaluating the motion acceleration in the corresponding axis by subtracting the projection of gravitational acceleration on the corresponding axis from acceleration measurements projected on the corresponding axis.

Then evaluate user foot movement level in an axis based on the movement intensity, e.g., motion acceleration in the axis, evaluation at the sampling time. Note that other methods, such as using speed evaluation at the sampling time as motion intensity, can also be used for movement intensity evaluation.

In general, the evaluation of user foot movement level in an axis involves the following steps. First detect the start of a foot movement. The detection can be made when it is determined that the user's foot start to move using data from the foot gesture feature information acquisition device, e.g., the switch form a stationary state to a moving state with significant movement, or the change of foot touch state from foot pressing the ground {A}, {AB} to a non-touching state { }. When it is determined that a user's foot starts moving (or have significant movement), movement level in an axis can be evaluated by accumulating, movement intensity evaluation, e.g., motion acceleration, in the axis. Note that, in practice, small movement intensity evaluation, e.g., motion accelerations, in an axis may be caused by inaccuracy in data or the evaluation process or unintended user foot movements. The movement level evaluation by accumulating movement intensity, e.g., motion acceleration, may use (accumulate) only significant movement intensity evaluations that have (absolute) levels/values being above a threshold. In addition, a sign of movement level indicating the direction of the foot movement along the axis can be determined. The sign characterizes the foot movement as in the same direction as the axis or in the opposite direction of the axis. The sign of movement level can be determined using the signs of movement intensity evaluations, e.g., motion acceleration, at the beginning stage of the foot movement. For example, when a user's foot is determined to start moving, the sign of movement level in an axis can be determined by the signs of the first N, e.g., N=10, significant motion acceleration evaluations. For example, if majority of the N motion accelerations have positive signs, the movement level will be determined to have a positive sign. Then the foot movement is determined to be in the positive direction of the axis. The following movement level evaluations will update only absolute value of the movement level without changing its sign.

As an example for evaluating $MI_X$, $MI_Y$ and $MI_Z$, in the compass embedded footwear system, assume that the 3-axis accelerometer is placed such that the sensor's X, Y, and Z axes are aligned with $X_{foot}$, $Y_{foot}$, and $Z_{foot}$. Measurements from the accelerometer can be used to evaluate degree/level of movement in $X_{foot}$, $Y_{foot}$, and $Z_{foot}$ directions, i.e., $MI_X$, $MI_Y$ and $MI_Z$. Note that the evaluation needs to remove the effects of gravitational acceleration on readings of the accelerometer's three axes. With estimates of foot tilt angle(s) $\gamma_L/\gamma_R$ (1001/1002), and foot roll angle $\lambda_L/\lambda_R$ (1005/1006) as discussed earlier, accelerometer readings in the sensor x axis, y axis and z axis can be compensated (by subtracting gravitational acceleration's projection on the corresponding axis) to obtain accelerations corresponding to foot motion acceleration (acceleration measures due to user's foot movement instead of gravitational acceleration), denoted as AccX, AccY, AccZ, in the three axes. Then foot motion level $MI_X$, $MI_Y$ and $MI_Z$ can be evaluated using AccX, AccY, AccZ.

When a user's foot is not moving, movement level evaluation in $X_{foot}$, $Y_{foot}$ and $Z_{foot}$ axes (directions), i.e., $MI_X$, $MI_Y$ and $MI_Z$ will be close zero. When a user's foot move/kick forward/backward, movement level in)(root axis, i.e., $MI_Y$, will be high, which is caused by high motion acceleration measurements in, e.g., accelerometer's Y axis. When a user's foot move/kick sideways, movement level in $X_{foot}$ axis, i.e., $MI_X$, will be high, which can be evaluated by motion acceleration measurements in e.g., accelerometer's X axis. Note that the movement level evaluation in an axis is derived not using one (motion intensity) sample at a current sampling time but on a series of foot motion acceleration results from the start of a foot movement.

Figure 13:
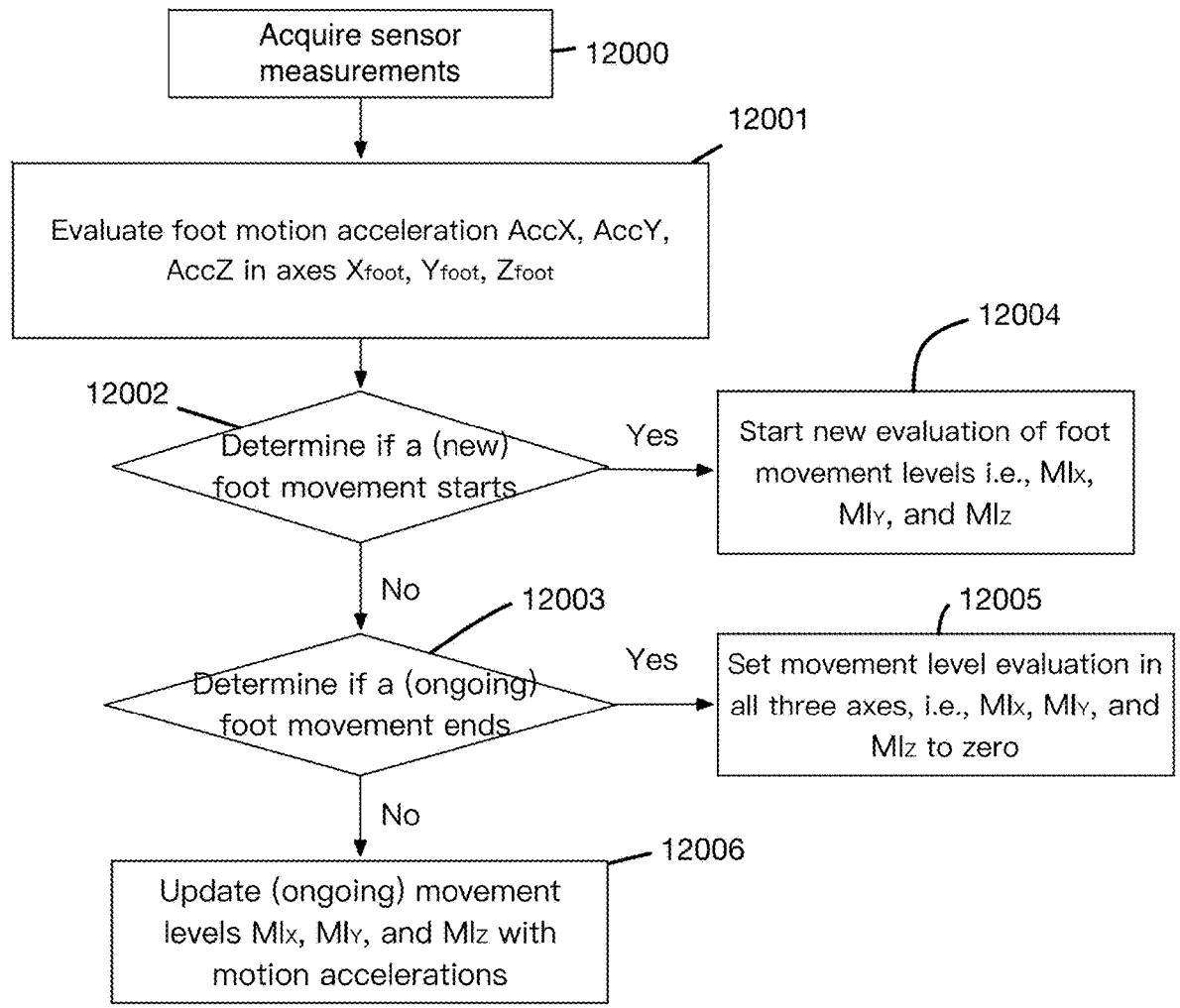
FIG. 13 shows the flow chart of evaluating movement levels $MI_X$, $MI_Y$ and $MI_Z$ at a data sampling time.

FIG. 13 shows the flow chart of evaluating movement levels $MI_X$, $MI_Y$ and $MI_Z$ at a data sampling time. In step 12000, sensor measurements and footwear data are acquired at the current time. In step 12001, motion accelerations AccX, AccY and AccZ (as motion intensity at the sampling time) are evaluated by subtracting gravitational projections on accelerometer's x, y and z axes from current sensor measurements, which requires the estimates of foot tilt angle(s) $\gamma_L/\gamma_R$ (1001/1002), and foot roll angle $\lambda_L/\lambda_R$ (1005/1006). These angle estimates are available in the compass embedded footwear system. In the compass embedded footwear system, required sensor measurements for the movement level evaluation include measurements from 3-axis accelerometer and 3-axis gyro. Step 12002 determines if a (new) foot movement starts at the processing/data sampling time. This can be done by determining, using footwear data, whether the user's foot starts to have significant movement. It can also be done by detecting the change of foot touch state e.g., from a touching state, to a non-touching state { }. If a start of foot movement is detected in step 12002, step 12004 starts a new movement level evaluations of $MI_X$, $MI_Y$ and $MI_Z$ for the detected foot movement, by initializing $MI_X$, $MI_Y$ and $MI_Z$ with the current motion acceleration AccX, AccY, and AccZ. If no start of foot movement is detected in step 12002, step 12003 determines if a foot movement ends by determining if the foot/footwear stops moving. If 12003 determines the foot movement has ended, step 12005 sets movement levels $MI_X$, $MI_Y$ and $MI_Z$ to zero, indicating the foot movement's end. If step 12003 determines the foot movement is still ongoing, step 12006 updates existing movement levels $MI_X$, $MI_Y$ and $MI_Z$ using AccX, AccY, AccZ respectively.

Various methods can be used in step 12004 for the initialization and in step 12006 for the update of movement level using motion acceleration. One example method is $$MI_X = MI_X + |AccX|, MI_y = MI_y + |AccY|, \text{ and } MI_Z = MI_Z + |AccZ|$$

Another example method may be $$MI_X = MI_X + AccX*AccX, MI_y = MI_y + AccY*AccY, \text{ and } MI_z = MI_z + AccZ*AccZ$$

Note that, in practice, small motion accelerations evaluated in an axis may be caused by inaccuracy in data or the evaluation process or unintended user foot movements. The movement level evaluation by accumulating motion acceleration may use (accumulate) only significant motion accelerations. With this in consideration, when the absolute values of the motion accelerations of AccX, AccY or AccZ are below a threshold, the motion accelerations can be set as zero. As a results, these insignificant motion accelerations will not affect the movement level updates. Also note that the above evaluations of foot movement level yield only non-negative values.

In addition, a (positive/negative) sign can be determined for movement level evaluations to differentiate foot motion in the same or opposite direction of an axis, e.g., $X_{foot}$, $Y_{foot}$, $Z_{foot}$. The sign of movement level in an axis may be determined based on the signs of first Ns samples of the corresponding motion acceleration AccX, AccY, AccZ from the beginning/start of a foot movement. For example, after a foot movement start was detected, the sign of majority of the first Ns=20 samples of AccX (samples) since the start of the foot movement can be used as the sign for $MI_X$ of the foot movement.

Movement level evaluations in 3 axes, e.g., $MI_X$, $MI_Y$, $MI_Z$, which characterize levels of forward/backward foot move, sideway foot move and up/down foot move respectively, form a very useful set of foot gesture features that can be provided by an foot gesture feature information acquisition device, e.g., the compass embedded footwear system, for foot gesture detection and control purposes. For foot gestures such as step, walk, run, etc., movement levels can be used as parameters to determine the speed/intensity, and directions of step, walk, run foot gestures. A foot gesture feature information acquisition device, e.g., the compass embedded footwear can acquire foot movement levels along with other foot gesture features including foot touch state, 2D foot pointing direction and foot tilt angle, and send these foot gesture features to other devices for foot gesture detections and control purposes.

Button Pad Design for Foot Touch State Detection

In order to obtain user's foot touch state, one needs to detect if the fore part of a user's sole and the heel part of the user's sole are pressing the ground/supporting platform. In general, pressure sensors can be used for the detection. For cases, only pressing and non-pressing detections are needed, a button, which is a pressure sensor with only two states, i.e., on and off, can be used for the detection. However, buttons designed for finger pressing do not suit for the detection of foot pressing. There are two main issues. The first one is that the pressing area of a regular button is too small for foot pressing. The second issue is that, compared to finger pressing, with body weight, foot pressing may cause too much pressure that can damage a button, especially when small or tiny buttons are used.

In order to use (small) buttons for the detection of foot touch states in a footwear system, a button pad device is designed to address the two issues. The button pad consists of a button/button structure and a button enclosure that offers extended pressing area, and protection against high pressure from a user's foot. With the use of small size button/buttons, the button pad can be thin and suitable to be placed in a shoe sole or insole for foot touch state detection.

Figure 14:
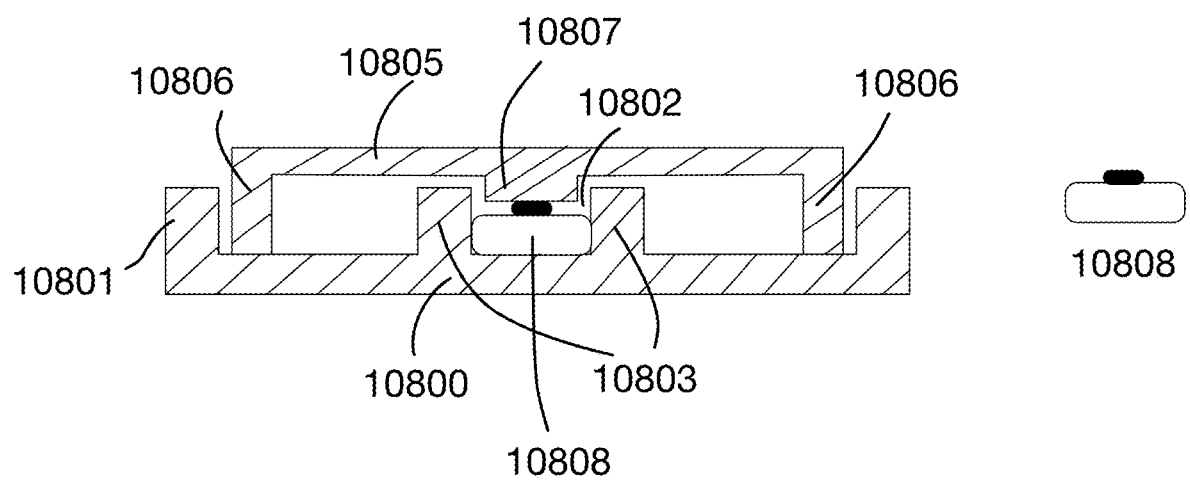
FIG. 14 shows the design of a button pad for foot touch state detection from a cross section view.

FIG. 14 shows the design of the button pad from a cross section view. The button pad has two parts. One part is a supporting base 10800. A button or button structure 10808 (marked in FIG. 15) is installed on the supporting base 10800 for press detection.

As shown in FIG. 14, the second part is an enclosure cap 10805. The cap provides an enlarged pressing surface. It has a protrusion 10807 used to press button 10808. After the button pad is assembled, the protrusion 10807 is directly above the button/button structure.

Figure 15:
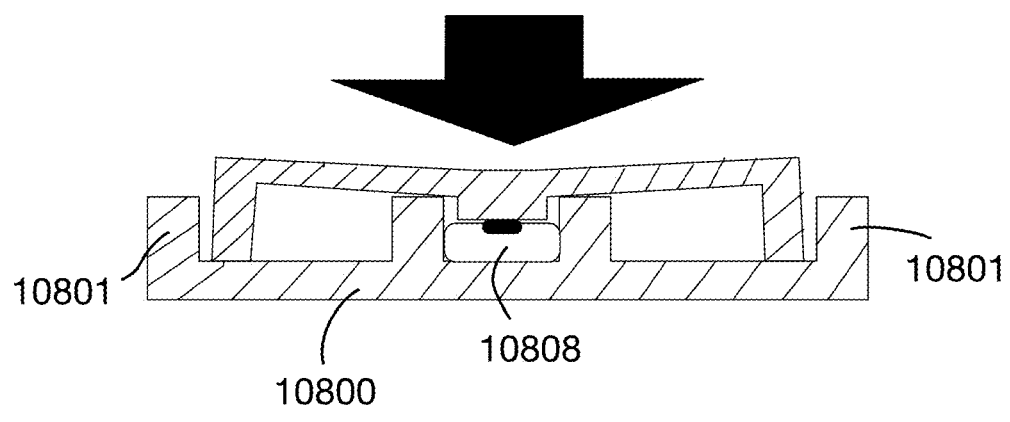
FIG. 15 illustrated a pressed state of the button pad for foot touch state detection.

There are supporting wall structures 10803 around the button or button structure 10808, which, as illustrated in FIG. 15, are used to stop the enclosure cap and the protrusion from excessive move (further moving down as illustrated in FIG. 15) under pressure and causing button structure damage. As shown in FIG. 14 and FIG. 15, the supporting wall structures 10803 can be part of the supporting base 10800, and form a socket 10802 and holds the button/button structure 10808 in place. Alternatively, the supporting wall structures can also be part of the enclosure cap 10805, around the protrusion.

As shown in FIG. 14 and FIG. 15, the enclosure cap further consists of edge supports (rims or legs) 10806, which make the enclosure cap a flexible structure such that, as shown in FIG. 15, when pressure is applied to the enclosure cap, the protrusion 10807 will move (down) and press the button 10808. When there is no pressure applied, the edge supports keep the enclosure cap 10805 and protrusion 10807 in a non-pressing position as shown in FIG. 14.

As shown in FIG. 14, the supporting base 10800 may have an outer rim/wall structure 10801 that, together with 10806, holds/keeps enclosure cap 10805 in place.

FIG. 15 shows a pressed state of the button pad for foot touch state detection, when pressure is applied to the top of the enclosure cap. Under the pressure, the protrusion 10807 is lowered to press the button 10808. While the protrusion

10807 stops moving further down when the enclosure cap's bottom surface meets the top of the wall structure 10803. In such a design, wall structure 10803 prevent(s) large pressure (from user's foot) being applied on the button 10808 and potential button damage.

The supporting base 10800, and enclosure cap 10805, cap support (rim or legs) 10806 may be made of bendable/flexible materials with suitable flexibility such that they respond to pressure the way described above and the button pad may bend with a shoe sole's bottom. Enclosure cap support 10806 may also be made of flexible materials such as spring.

Note that in the button pad design, position of the protrusion 10807 and button/button structure 10808 can be switched without affecting function of the button pad. In such cases, button/button structure 10808 is installed on enclosure cap; protrusion 10807 is on the supporting base 10800. In some embodiments of the button pads, the wall structure 10803 can also be with the enclosure cap 10805 instead of supporting base 10801.

In some embodiments of the button pad, there may be multiple buttons 10808, multiple wall structures 10803 and button sockets 10802, and multiple protrusions 10807. The pressing of any button/button structure 10808 by a protrusion 10807 will lead to a pressing detection of the button pad. With more buttons at different places of a button pad, the button pad may provide improved foot pressing/touch state detection performance.

Figure 16:
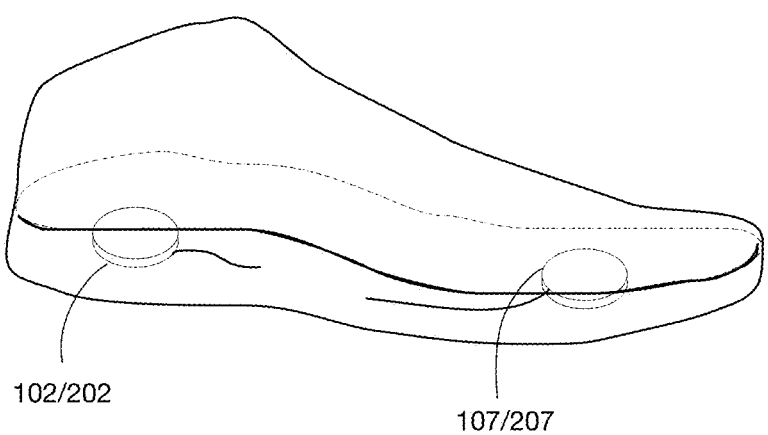
FIG. 16 illustrates the use of the button pad as sensors 102/202 and 107/207 in a footwear for foot touch state detection

FIG. 16 illustrates the use of the button pad as sensors 102/202 and 107/207 in a footwear, such as the disclosed compass embedded footwear system, for foot touch state detection. One button pad is installed at the heel part of a shoe sole and another button pad is installed in the fore part of a shoe sole. Wires coming out from the button pad are connected to the button at one end, and the other end of the wires are connected to the controller (not shown in the FIG. 16) for the detection of foot pressing/touch states.

Compass Embedded Footwear System Shoe Sole Design

Figure 17:
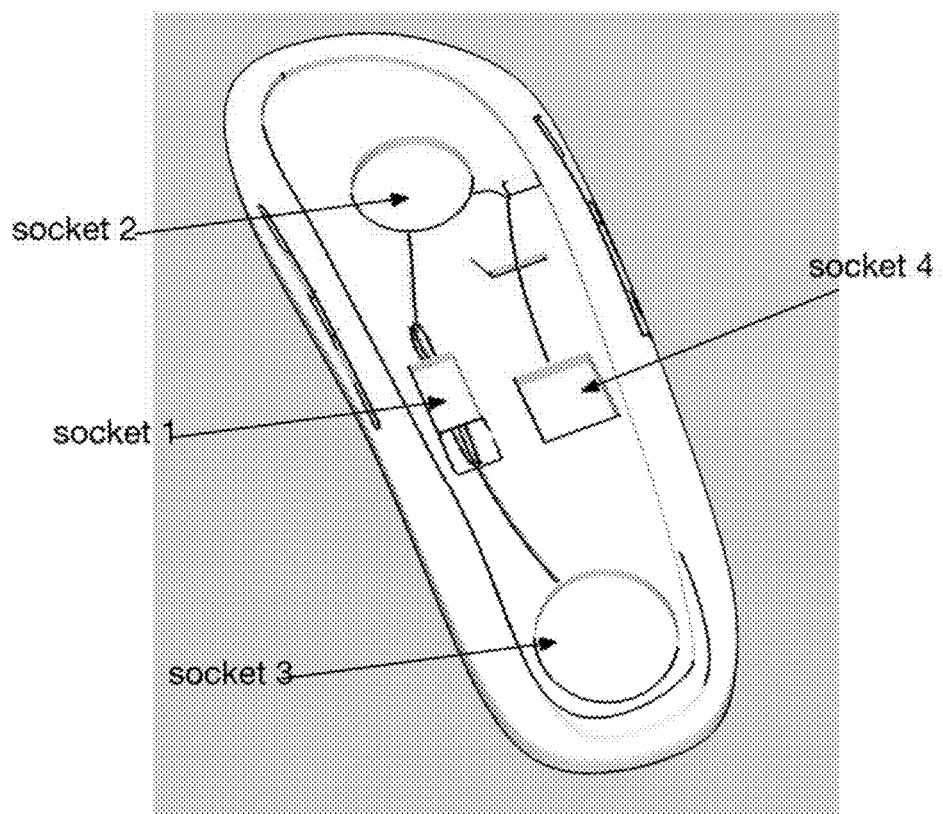
FIG. 17 shows the design of a shoe sole that can be used for the compass embedded footwear system.

FIG. 17 shows the inside of a shoe sole design that can be used for the proposed compass embedded footwear system. There are sockets designed at multiple positions for various device components. As illustrated in FIG. 17, socket 1 is at a position inside the shoe sole that corresponds to a user's foot arch (under a user's arch area). Socket 1 is designed to hold sensor components such as compass (magnetometer), accelerometer and gyro sensors. In the design, the socket is also at the middle section of the shoe sole (in length direction), such that foot tilt angles can be effectively measured. With socket 1 at the arch area (beneath a user's foot arch), sensors placed at socket 1 have little pressure from a user's foot, such that the sensors can perform well.

Socket 2 is at a position inside the shoe sole that corresponds to fore part (or a center of ball of foot) of a user's sole. It is designed for holding a pressure/touch detector, such as the proposed button pad, for foot touch state detection. When a user's foot presses the ground or a supporting platform with the fore part of his/her sole, the pressing will be effectively detected by the sensor.

Socket 3 is at a position inside the shoe sole that corresponds to a user's heel. It is designed for holding a pressure/touch sensor, such as the proposed button pad. When a user's foot presses the ground or a supporting platform with his/her heel, the pressing will be effectively detected.

Sensors at socket 2 and socket 3 may be used to jointly detect user foot touch state.

Other sockets may also be available in the sole design, such as socket 4 as shown in FIG. 17, which can be used to hold other components such as device controller and/or battery, etc The shoe sole design may also include other thin sockets inside for holding wires between the component sockets, e.g., socket 1, socket 2, socket 3, etc.

The proposed shoe sole design with multiple component sockets inside can be used for various types of shoes such as sandal, sneakers, etc. for compass embedded footwear system.

A foot gesture feature information acquisition as an input device can be used as a foot-operated controller to support foot gesture based device/application control and user-device/user-application interactions.

Methods for GUI Operations Using Foot Gestures or Foot Gesture Feature Information Graphical user interface (GUI) allows a user to interact with electronic devices through GUI including graphical icons, menus and visual indicator, instead of text-based user interfaces. In general, a GUI is displayed on a screen of an electronic device, which consists of various GUI items including graphical icons, menu items, visual indicators, etc. A user interacts with the electronic device or software programs running on the electronic device (such as the device's operating system (OS) and programs/applications) through a GUI by selecting GUI items, and instructing the OS/program/application to perform corresponding actions/operations. In this disclosure, GUI methods are presented to use foot gestures for various GUI operations.

The most important aspect of GUI operation is GUI item selection. The method for a user to select a GUI item has a great impact on user experience. One commonly seen type of methods is cursor based GUI item selection, where a cursor is displayed on the GUI screen, a user uses an input device such as a mouse to move the cursor over a GUI item and uses click or double click to select the GUI item.

Another type of GUI item selection methods is touch based methods. With a touch screen as the input device, a user may directly touch/press a GUI item displayed on a touch sensitive screen to perform a GUI item selection. Such a method is commonly seen with smart phones, tablet computers, etc.

The cursor based and touch based methods for GUI item selection does not require any order among GUI items shown on a GUI display, since a user can use a cursor or finger to directly point at the GUI item that he/she wants to select.

A third type of methods for GUI item selection is referred to as neighbor relationship based method. Each GUI item may have zero, one or multiple neighbor GUI item(s) in different directions. In some cases, each GUI item may have at most two neighbor GUI items, for example, denoted as a Previous GUI item and a Next GUI item. In other cases, a GUI item may have more than two neighbor GUI items (in different directions), for example, Left GUI item, Right GUI item, Up GUI item and Down GUI item.

The neighbor relationship based GUI selection methods starts from a currently selected GUI item. With the neighbor relationships among the GUI items determined, to change the selected GUI item, a user will give a signal to the software program or operating system using an input device, such as pressing a key in a keyboard, to move the selection in a direction, to select the Previous/Next/Left/Right/Up/Down neighbor GUI item of the currently selected GUI Item. Then the operation system or program changes selected GUI item based on the signal to select the corresponding neighbor GUI item.

Note that, normally, the GUI item that is selected will be distinguished from the unselected GUI items in the screen display, for example, with a highlighted/enlarged icon, color highlight, etc., such that a user knows that which GUI item is currently selected. Since this type of GUI item selection method use pre-determined neighbor relationships among GUI items, this type of GUI item selection method is referred to as neighbor relationship based GUI item selection method.

Figure 18:
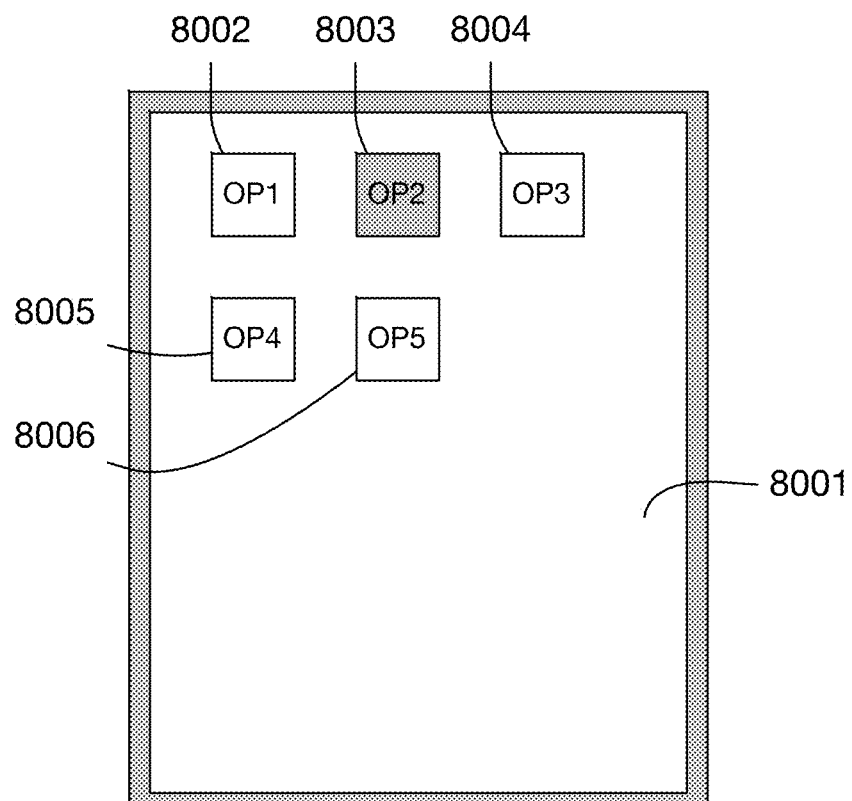
FIG. 18 shows an example of Graphical User Interface (GUI) with multiple GUI items (icons).

FIG. 18 shows an example of GUI with multiple GUI items (icons), i.e., 8002-8006, displayed on a screen 8001. For example, a pre-determined order among the GUI items could be 8002, 8003, 8004, 8005, 8006. In general, any pre-defined order of the GUI items can be used. Based on the GUI item order, each GUI item has at most two neighbors (one before and one after it). As shown in FIG. 18, the (currently) selected GUI item, 8003, is highlighted by gray color.

As another example, each GUI item as shown in FIG. 18 may have at most four neighbor GUI items in Left, Right, Up and Down directions.

Figure 19:
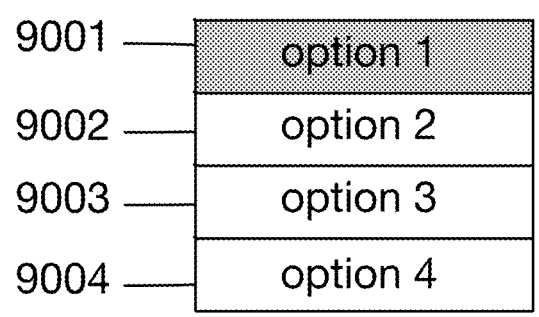
FIG. 19 shows a menu list displayed on a screen with menu items as GUI items

FIG. 19 shows a menu list displayed on a screen with GUI items 9001, 9002, 9003, 9004 as the menu items. Naturally, a pre-defined order among the GUI items is 9001, 9002, 9003, 9004, while in general, any pre-defined order of the GUI items can be used. Similarly based on the order, each GUI item has at most two neighbor GUI items (one before and one after it, which can be denoted as its Previous GUI item and its Next GUI item). The (currently) selected GUI (menu) item is indicated in this example by gray color.

Figure 20:
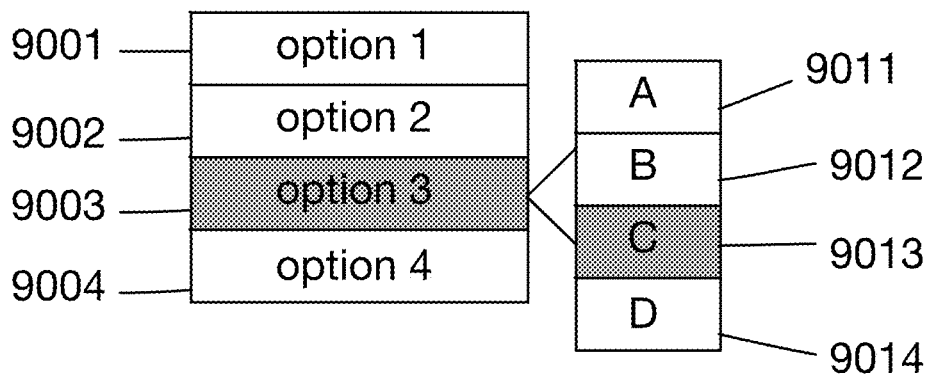
FIG. 20 shows a sub-menu of a menu item in FIG. 19

FIG. 20 shows a sub-menu of a menu item 9003 with GUI items 9011, 9012, 9013, 9014. Naturally, a pre-defined order among the GUI items of the sub-menu is 9011, 9012, 9013, 9014; while, in general, any pre-defined order of the GUI items can be used. Similarly based on the order, each GUI item belonging to the sub-menu has at most two neighbor GUI items (one before and one after it).

Figure 21:
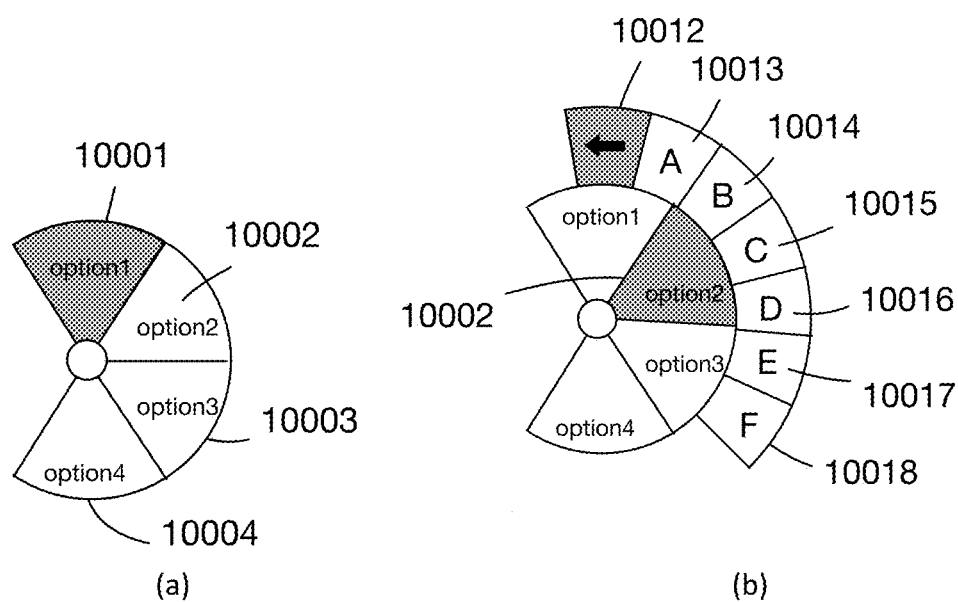
FIG. 21 shows a menu list, and a sub-menu list with a different design, where each menu/sub-menu item corresponds to a sector.

FIG. 21 shows a menu list, and a sub-menu list with a different design, where each menu/sub-menu item corresponds to a sector. The menu/sub-menu functions and methods are essentially the same as the menu list in FIG. 19 and FIG. 20. Such a design is more intuitive with control using user foot pointing direction.

With various input devices, such as computer mouse, keyboard, touch screen, touchpad, game controller, etc., all three types of GUI item selection methods, i.e., cursor based, touch based, and neighbor relationship based methods, are commonly seen with various operating systems and software programs/applications that run on electronic devices.

Besides GUI item selection, another key element of the GUI operation is to allow a user to instruct the operation system/software program to execute the program process/routine corresponding to a selected GUI item, which is referred to as "Action confirmation" operation in this disclosure. With cursor based GUI item selection methods, action confirmation is often achieved by a click or double-click of a mouse button. With touch based GUI item selection methods, the GUI item selection and action confirmation are often achieved at the same time, i.e., when a user touches a GUI item, the GUI item is selected and at the same time actions corresponding to the selected GUI item is performed. For neighbor relationship based GUI item selection methods, GUI item selection and action confirmation are separate. A user need to send a command signal through an input device, e.g., by pressing a "OK" key or button, to the operating system or program to perform the action corresponding to a selected GUI item.

In addition to, "GUI item selection", "Action confirmation", GUI methods also include "GUI invocation" methods, which allow a user to instruct the operating system/program to enter a GUI mode by displaying a GUI and allow the user to perform GUI item selection and action confirmation. An example of GUI invocation is using a mouse right click to access a menu list in Windows system, where mouse right click is used for GUI invocation to display the menu. Another example of GUI invocation is pressing the "ESC" button of a keyboard in a computer game to pause the game and access a game configuration panel GUI. Another example of GUI invocation is performing a body gesture by a user in an Xbox Kinect game to pause the game and enter a game setting GUI mode. In this case, a body gesture is used for GUI invocation.

A last type of GUI methods to be addressed in this disclosure is referred to as GUI Exit method. "GUI Exit" methods allow a user to instruct an operating system or program to exit a GUI mode and resume the operation/mode before the GUI mode was invoked by a GUI invocation method. For example, when using a computer keyboard, pressing the "ESC" key can also be used as a GUI Exit method, to resume to a computer game. While, in many cases, there is no need for a GUI Exit method. In such cases, after action confirmation of a selected GUI item the GUI mode automatically exits.

In this disclosure, GUI Methods using user foot gestures and foot gesture features (including foot pointing direction(s), foot touch state and foot tilt angle(s)) are presented for GUI item selection, action confirmation, GUI invocation and GUI Exit.

First, neighbor relationship based GUI item selection methods using foot gestures or foot gesture feature information are presented.

Figure 22:
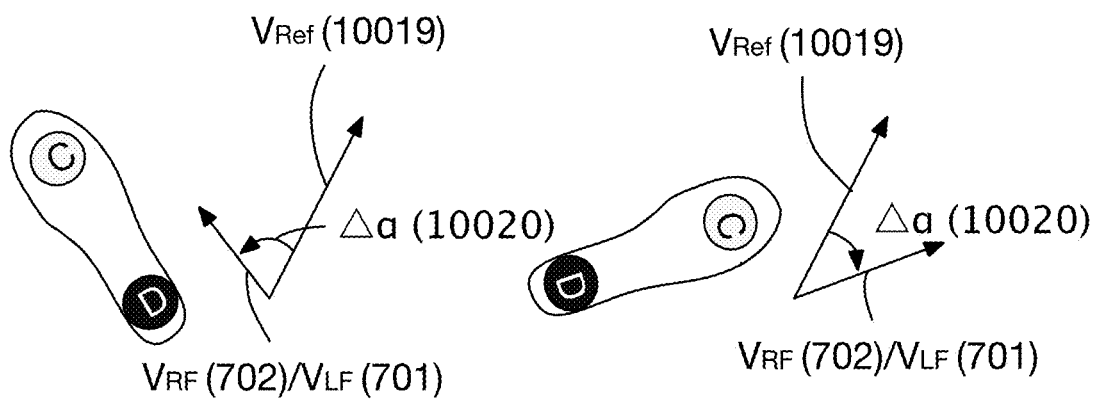
FIG. 22 shows the use of left/right foot pointing direction information such as $V_{LF}/V_{RF}$ (701/702) (or equivalently $\omega_L/\omega_R$ (707/708)) to obtain an angle $\Delta\alpha$ (10020) between the foot pointing direction to a reference direction $V_{Ref}$ (10019)

The first method uses left/right foot pointing direction information such as $V_{LF}/V_{RF}$ (701/702) (or equivalently $\omega_L/\omega_R$) to obtain an angle $\Delta\alpha$ (10020) between the foot pointing direction to a reference direction $V_{Ref}$ (10019) as illustrated in FIG. 22. The reference direction vector $V_{Ref}$ (10019) could be a determined with various methods. For example, $V_{Ref}$ (10019) can be a pre-defined fixed direction in the same local 2D coordinate system as $V_{LF}/V_{RF}$ (701/702). As another example, $V_{Ref}$ (10019) can be the same as the $V_{LF}/V_{RF}$ (701/702) at the time when the GUI mode is invoked by a GUI invocation method. As another example, when one foot pointing direction $V_{LF}/V_{RF}$ (701/702) is used the other foot pointing direction $V_{RF}/V_{LF}$ (702/701) can be used as $V_{Ref}$ (10019).

Figure 23:
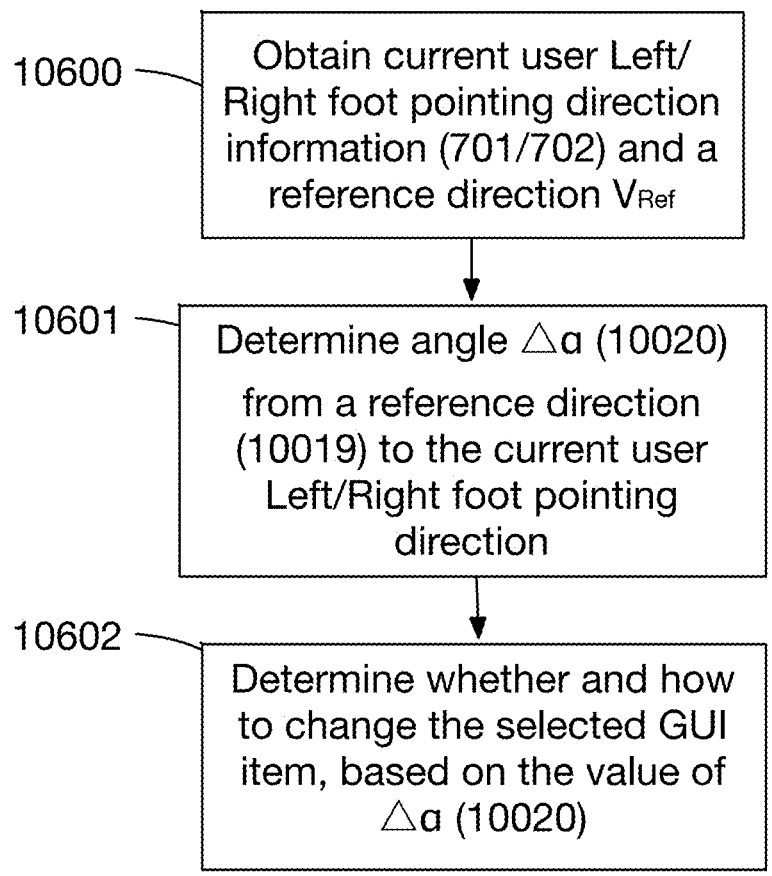
FIG. 23 shows the processing flow of a GUI item selection method when new foot gesture feature information, including foot pointing direction information and/or foot touch states, etc., is obtained.

In the first GUI item selection method, for GUIs with each GUI item having at most two neighbor GUI items, the value of $\Delta\alpha$ (10020) is used to determine whether to change the selected GUI item and how to change the selected GUI item. FIG. 23 shows the processing flow of the GUI item selection method at a processing round when new foot gesture feature information, including foot pointing direction information and/or foot touch states, etc., is obtained.

Step 10600 and 10601 obtains the updated $\Delta\alpha$ (10020) value according to the updated foot gesture feature information. Step 10602, determines based on the currently obtained $\Delta\alpha$ whether the selected GUI item should be changed and how to change the selected GUI item. When $\Delta\alpha$ falls in different ranges, the selected GUI item should remain the same (no change), or move to the first neighbor GUI item (e.g., Previous GUI item of the currently selected GUI item), or move to the second neighbor GUI item (e.g., the Next GUI item of the current selected GUI item).

Figure 24:
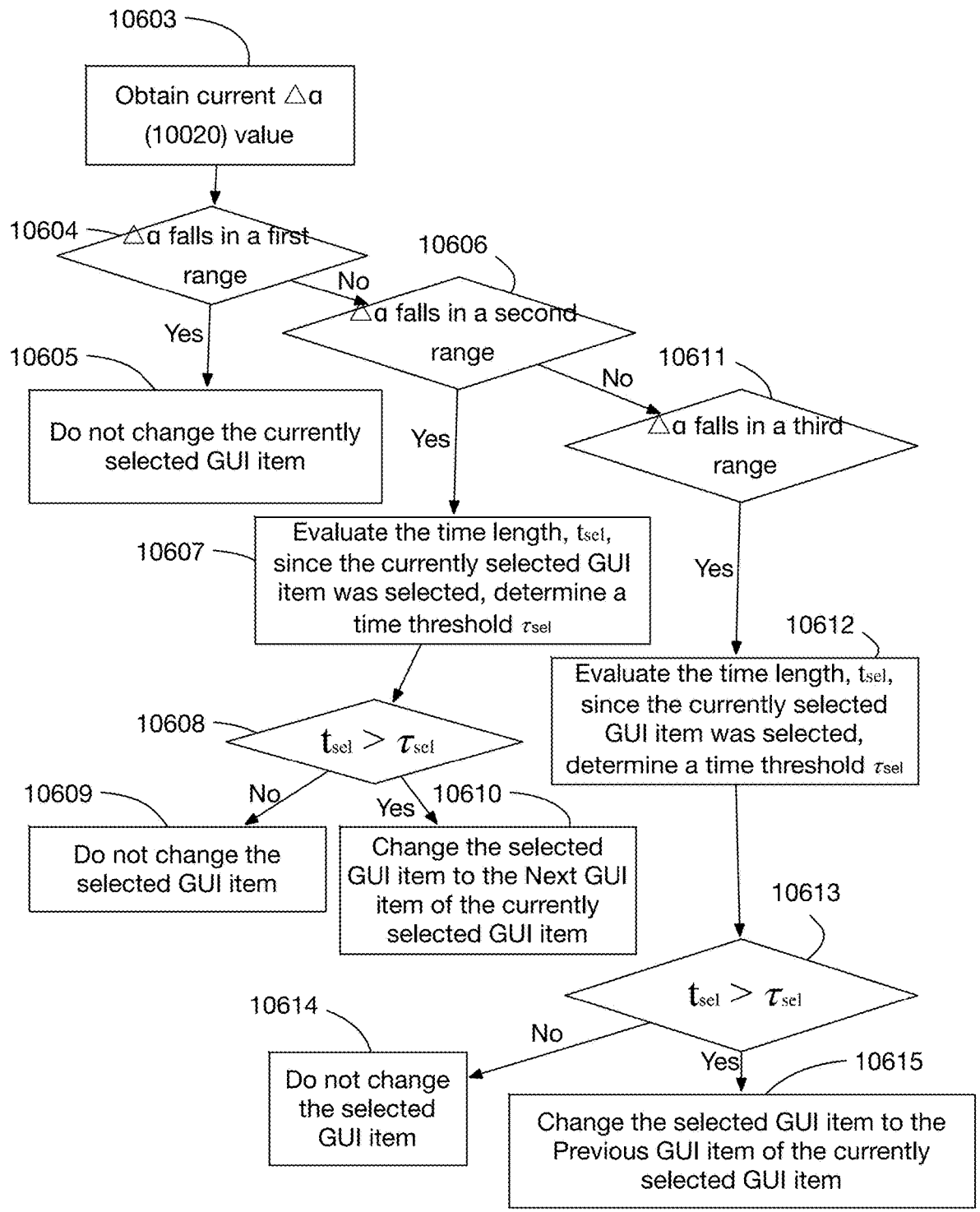
FIG. 24 shows an example processing flow chart that further illustrates step 10602 in FIG. 23 for the selection of GUI item based on $\Delta\alpha$.

FIG. 24 shows an example processing flow chart that further illustrates step 10602 in FIG. 23. It starts from step 10603 where updated $\Delta\alpha$ is obtained. Then step 10604 determines whether $\Delta\alpha$ (10020) falls in a first range, for example between −5 degree and 5 degree. If Yes, the processing flow goes to step 10605 and the selected GUI item remains the same. If step 10604 finds that $\Delta\alpha$ does not belong to the first range, step 10606 checks if $\Delta\alpha$ belongs to a second range, for example, greater than 5 degree. If the check in step 10606 is passed, step 10607 evaluates the time duration of the currently selected GUI item (time length since it was selected) as tsel. A time threshold $\tau$sel is also evaluated/obtained in step 10607, which determines the minimum amount of time the current selected GUI item should remain selected. Then, in step 10608, a comparison is made between tsel and $\tau$sel. If the check on the time requirement in step 10608 is passed, change the selected GUI item to the Next GUI item (the second neighbor) of the currently selected GUI item as in step 10610. If the check in step 10608 is not passed, the selected GUI item remains the same as in step 10609.

Note that a check, as in step 10608 with the $\tau$sel requirement, controls the switching speed of the selected GUI item from one GUI item to another. In some embodiments, $\tau$sel may set as a fixed value, e.g., 0.5 second. In other embodiments, $\tau$sel may be a function of $\Delta\alpha$. For example, a larger absolute value of $\Delta\alpha$ may correspond to a smaller $\tau$sel, such that the selected GUI item moves quicker from the current selected GUI item to its Next/Previous GUI item when the user's left/right foot pointing direction $V_{LF}/V_{RF}$ (701/702) moves further away from the reference direction $V_{Ref}$ (10019).

In other embodiments $\tau$sel may be determined by user's foot tilt angle(s) $\gamma_L/\gamma_R$ (1001/1002) instead of $\Delta\alpha$. For example, $\gamma_L/\gamma_R$ with a larger absolute value may give a smaller $\tau$sel, so that the selected GUI item switches faster with a user tilt his/her foot further.

Back to step 10606, if the check is not passed, step 10611 check if $\Delta\alpha$ belongs to the third range, e.g., smaller than −5 degree. If the check in 10611 passes, step 10612 evaluates tsel and $\tau$sel as in step 10607; then step 10613 do the same check as in 10608 to determine if the time requirement on the currently selected GUI item $\tau$sel has been met. If the check in step 10613 is passed, step 10615 changes the selected GUI item to the Previous (the first neighbor) GUI item of the currently selected GUI item.

Note that, in general, the first range for $\Delta\alpha$ (10020) in step 10604, the second range in step 10606, and the third range in step 10611 do not overlap. In addition, each range for $\Delta\alpha$ (10020) in step 10604, 10606 and 10611 may be replaced by a set of multiple ranges. Also note that additional check on user foot touch state may be added to determine if the selected GUI item should be changed. For example, for left foot, the touch state may be required to belong to a set of {A,B,AB}; or for right foot, the touch state may be required to belong to a set of {C,D,CD} such that, to change the selected GUI item, the user's left/right foot should stay in touch to the supporting ground/platform. Such an additional requirement can be conveniently added to steps 10604, 10606, and 10611 of the flowchart in FIG. 24.

The neighbor relationship based GUI item selection method using foot gesture feature information described above (and illustrated in FIG. 23 and FIG. 24) assumes each GUI item has at most two neighbor GUI items (denoted as a Previous GUI item, and a Next GUI item).

The second neighbor relationship based GUI selection method using foot gesture feature information allows each GUI item to have more than two neighbors. The method uses both user foot pointing direction information and user foot touch state to determine whether the selected GUI item should change, and which neighbor GUI item should be selected. It allows the selection of GUI items that is the neighbor of a currently selected GUI item in different directions. In such cases, a GUI item can have more than two neighbor GUI items in directions such as Left, Right, Up, Down, or Right-Up, Right-Down etc.

In the second GUI item selection method, a pre-determined mapping between a combination of range of $\Delta\alpha$ and user left/right foot touch state to an neighboring GUI item in a certain direction is used.

The Table 5 shows examples of mapping from $\Delta\alpha$ and left/right foot touch state combinations to different neighbor GUI items (in different directions).

TABLE 5

Mapping between $\Delta\alpha$ range and foot touch state combination to neighboring GUI items

| $\Delta\alpha$ and left/right foot touch state combination | Example | Corresponding neighbor | Example GUI neighbor |
|---|---|---|---|
| $\Delta\alpha$ belongs to a first range, and left/right foot touch state is {A}/{C} | $\Delta\alpha$ belongs to [−5 deg 5 deg], and left foot touch state is {A} | A first neighbor GUI item | GUI Neighbor in Up direction |
| $\Delta\alpha$ belongs to a first range, and left/right foot touch state is {B}/{D} | $\Delta\alpha$ belongs to [−5 deg 5 deg], and left foot touch state is {B} | A second neighbor GUI item | GUI Neighbor in Down direction |
| $\Delta\alpha$ belongs to a second range, and left/right foot touch state is {A}/{C} | $\Delta\alpha$ belongs to [45 deg 90 deg], and left foot touch state is {A} | A third neighbor GUI item | GUI Neighbor in Right Direction |
| $\Delta\alpha$ belongs to a second range, and left/right foot touch state is {B}/{D} | $\Delta\alpha$ belongs to [45 deg 90 deg], and left foot touch state is {B} | A fourth neighbor GUI item | GUI Neighbor in Left Direction |
| $\Delta\alpha$ belongs to a third range, and left/right foot touch state is {A}/{C} | $\Delta\alpha$ belongs to [−90 deg −45 deg], and left foot touch state is {A} | A neighbor GUI item | GUI Neighbor in Left Direction |

TABLE 5-continued

Mapping between Δα range and foot touch state combination to neighboring GUI items

| Δα and left/right foot touch state combination | Example | Corresponding neighbor | Example GUI neighbor |
|---|---|---|---|
| Δα belongs to a second range, and left/right foot touch state is {B}/{D} | Δα belongs to [−45 deg −45 deg], and left foot touch state is {B} | A Neighbor GUI item | GUI Neighbor in Right Direction |
| Others | Others | Current GUI item | |

If none of the mapping condition from a Δα and foot touch state combination to a neighbor GUI item is satisfied, no neighboring GUI item shall be selected, and the current GUI item remains selected, which corresponds to the "Others" case in the table. Also note that, in general, an arbitrary number of neighbors can be mapped to different Δα range and foot touch state combinations.

Figure 25:
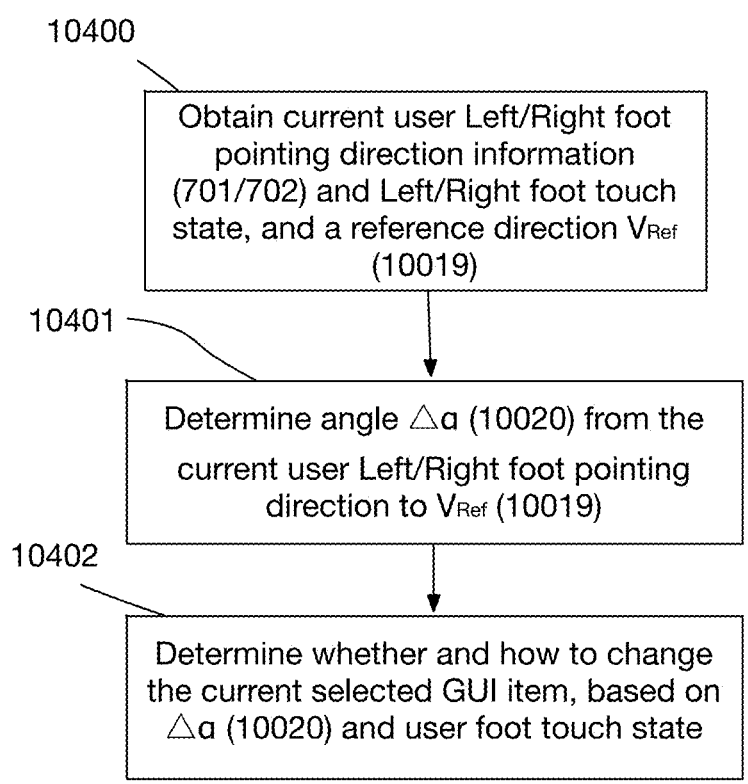
FIG. 25 shows a processing flowchart of the proposed second GUI item selection method, i.e., the neighbor relationship based GUI item selection method using the combination of foot pointing direction and foot touch state.

FIG. 25 shows a processing flowchart of the proposed second GUI item selection method, i.e., the neighbor relationship based GUI item selection method using the combination of foot pointing direction and foot touch state. When a new update of foot gesture feature information is received, first, in step 10400 updated user left/right foot pointing direction $V_{LF}/V_{RF}$ (701/702) and a reference direction $V_{ref}$ (10019) are obtained. Similarly, as in the previously discussed step 10600, the reference direction vector $V_{Ref}$ (10019) could be a determined using various methods.

Step 10401 determines Δα (10020) based on the foot pointing direction $V_{LF}/V_{RF}$ (701/702) and $V_{ref}$ (10019). Step 10402 determines based on Δα (10020) and the foot touch state if the selected GUI item should be changed and, if Yes, how to change the selected GUI item.

Figure 26:
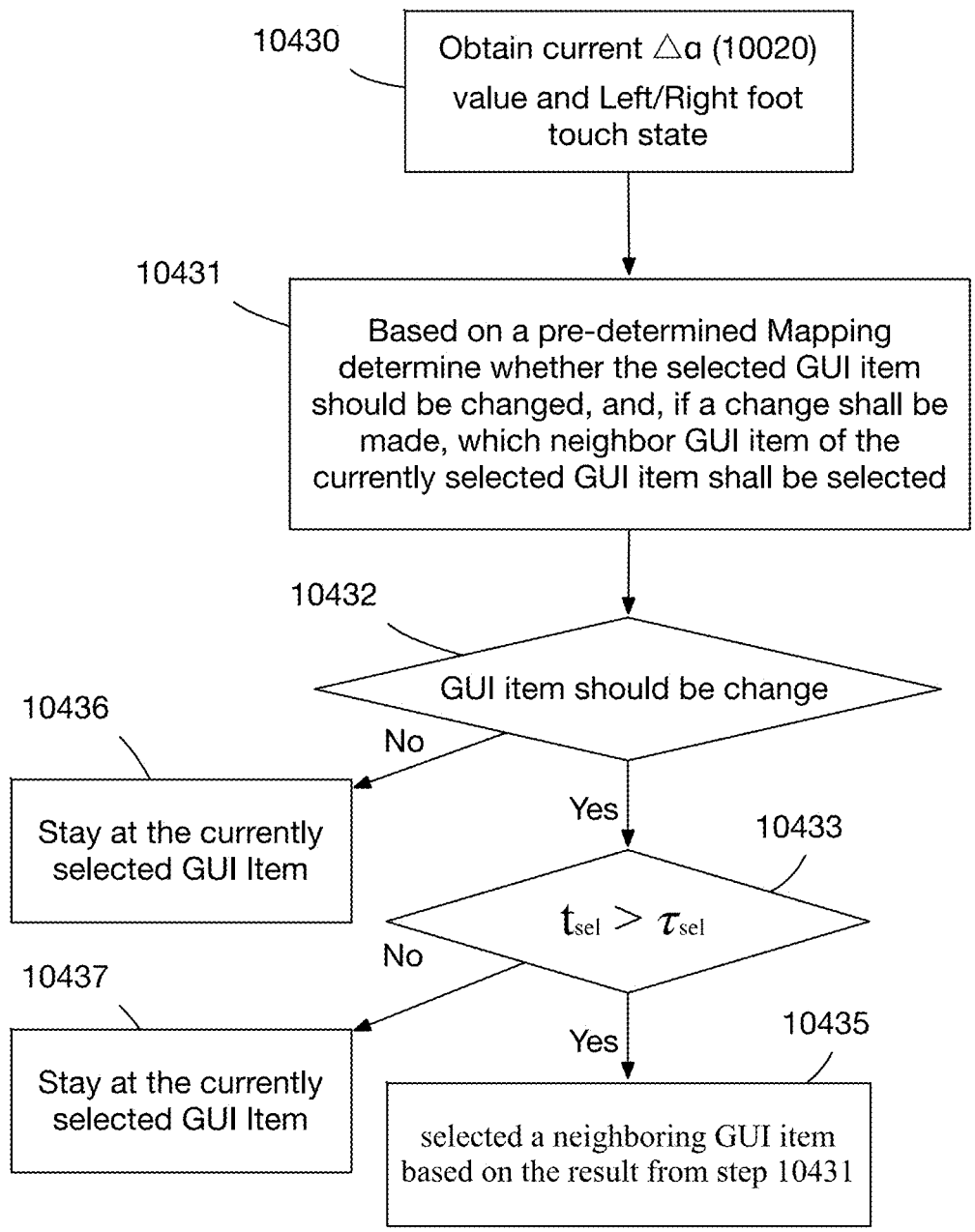
FIG. 26 further illustrates step 10402 in FIG. 25 at a processing time when updated $\Delta\alpha$ (10020) and foot touch state are obtained.

FIG. 26 further illustrates step 10402 in FIG. 25 at a processing time when updated Δα (10020) and foot touch state are obtained. Step 10430 obtains current Δα and foot touch state. Then step 10431 determines if a neighbor GUI item of the current selected GUI item should be selected. The decision is made based on a pre-determined mapping from a Δα range and foot touch state combination to one of the neighbor GUI items. An example mapping is shown in Table 5.

Step 10432 determines based on the result from step 10431 if the selected GUI item should be changed. If Yes, step 10433 evaluates tsel and time threshold τsel as in step 10607 and 10608 in FIG. 24, and check if the time since the currently selected GUI item was selected, i.e., tsel, is larger than the obtained time threshold τsel. As in step 10608, τsel can be a fixed value or as a function of other parameters such as left/right foot tilt angle tilt angle(s) $\gamma_L/\gamma_R$ (1001/1002). In some embodiments, τsel is set as infinite when absolute value of the foot tilt angle $\gamma_L/\gamma_R$ is smaller than a value, such that the selected GUI item will not change with slight foot tilt angles. As a result, a user need to tilt his/her foot enough to perform a GUI item selection change.

Figure 27:
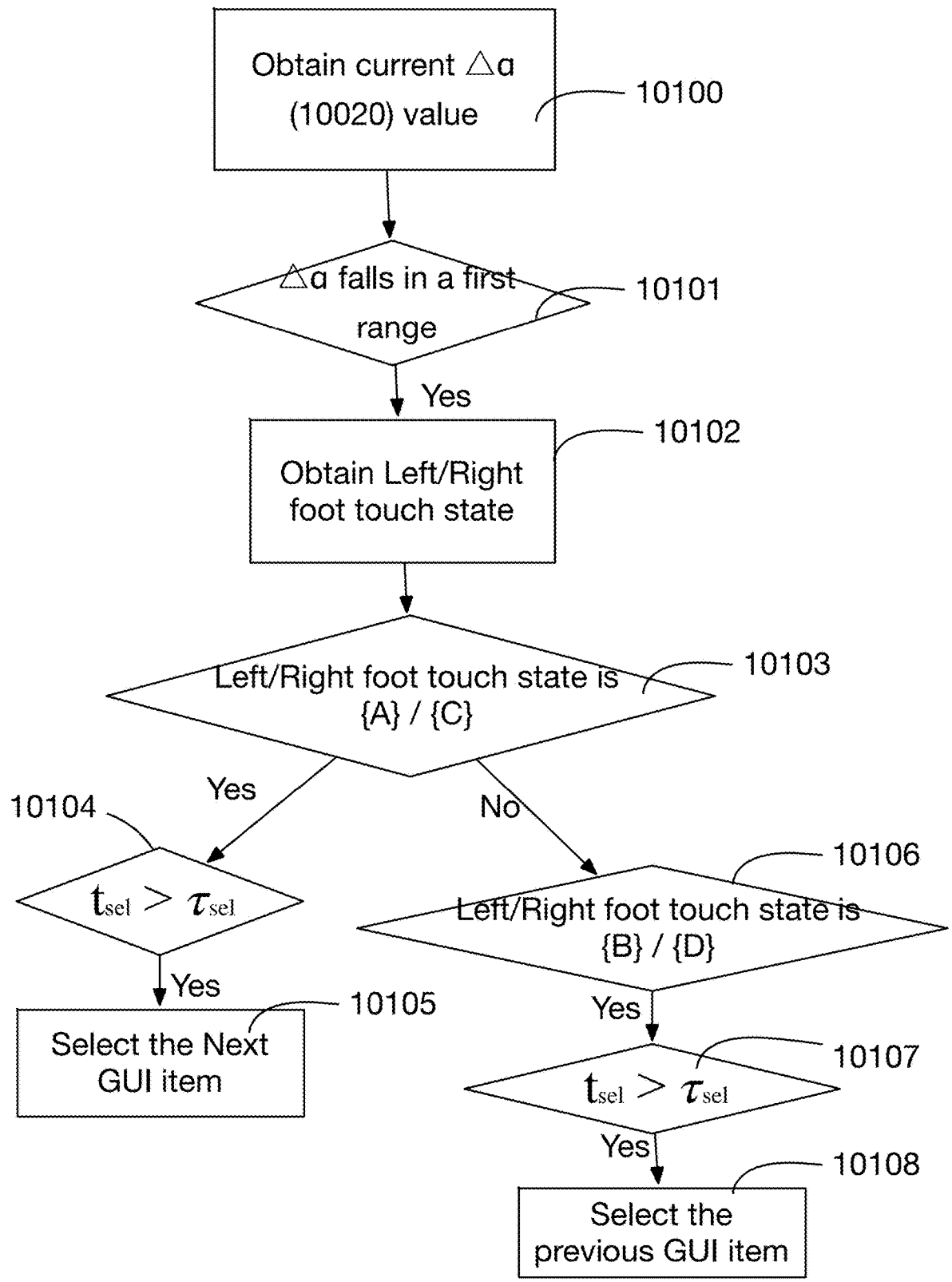
FIG. 27 shows an example implementation of the procedures in FIG. 26 when a GUI item has at most two neighbor GUI items

FIG. 27 shows an example implementation of the procedures in FIG. 26 when a GUI item has at most two neighbor GUI items, denoted as a Previous GUI item and a Next GUI item. Steps 10101, 10102, 10103 and 10106 together correspond to step 10431 in FIG. 26. The time requirement checks in step 10104 and step 10106 corresponds to the check in step 10433 in FIG. 26. Note that, in general, a first range for Δα (10020) in step 10101 can be a set of pre-determined ranges for Δα (10020).

Figure 28:
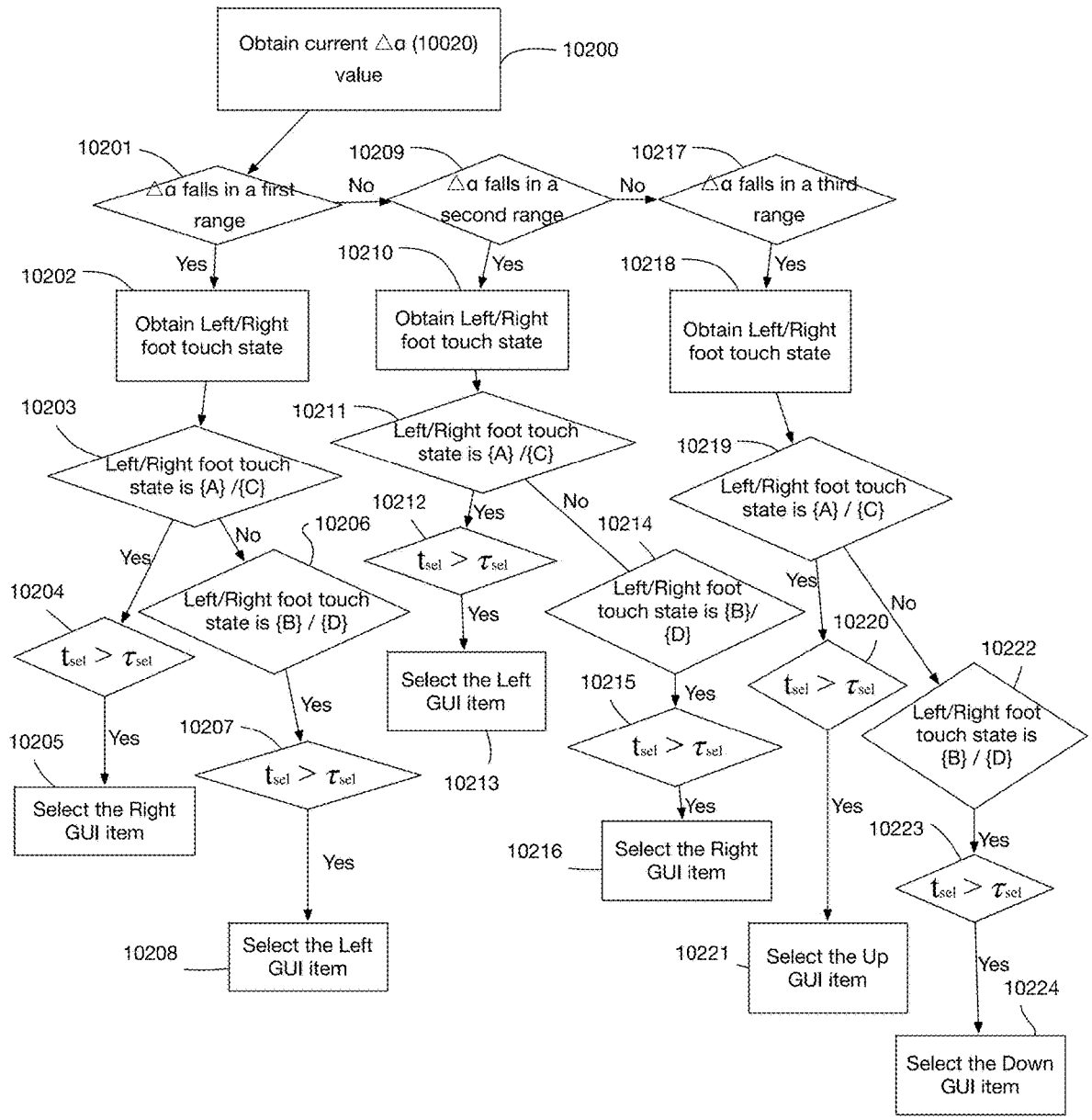
FIG. 28 shows another example implementation of the procedures in FIG. 26 when a GUI item may have up to four neighbor GUI items

FIG. 28 shows another example implementation of the procedures in FIG. 26 when a GUI item may have up to four neighbor GUI items in Left, Right, Up and Down directions, denoted as a Left GUI item, a Right GUI item, an Up GUI item and a Down GUI item respectively.

Steps 10201, 10202, 10203, 10206, 10209, 10210, 10211, 10214, 10217, 10218, 10219, 10222 together corresponds to step 10431 in FIG. 26. Similar to step 10101 in FIG. 27, a first/second/third range for Δα (10020) in steps 10201, 10209, 10217 can be a set of pre-determined ranges for Δα (10020).

Figure 29:
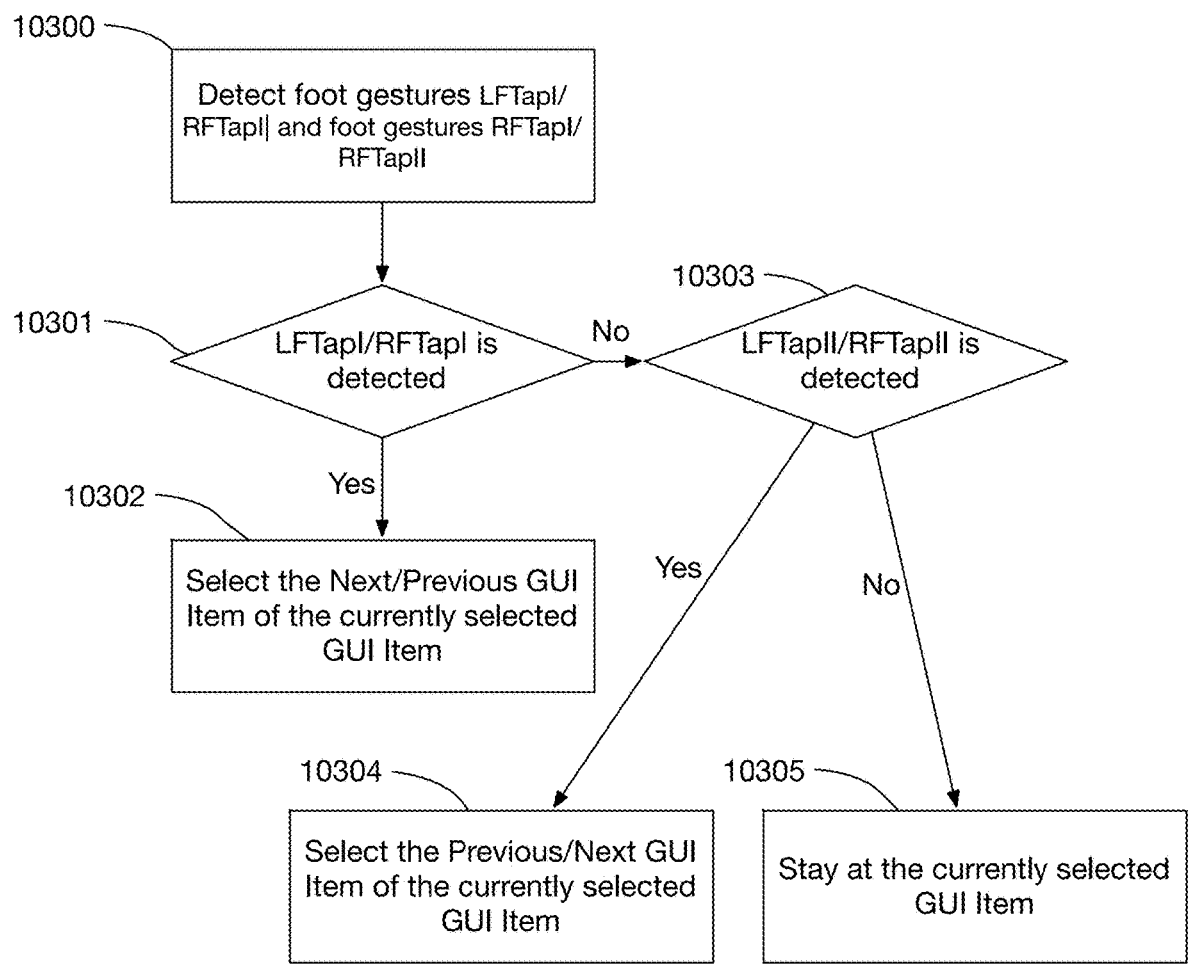
FIG. 29 shows an example processing flow for GUI item selection using Tap foot gestures.

Foot gestures such as Type I and Type II taps can also be used for neighbor relationship based GUI item selection method. FIG. 29 shows an example processing flow for GUI item selection using Tap foot gestures for cases where each GUI item has at most two neighbor GUI items, e.g., one as a Previous GUI item (of the currently selected GUI item) and the other as a Next GUI item (of the currently selected GUI item).

When updated foot gesture feature information is received, e.g., from a foot gesture feature information acquisition device such as a compass embedded footwear system, step 10300 perform foot gesture detection process to detect the foot gesture of interest, i.e., LFTapI/RFTapI and LFTapII/RFTapII. See patent WO2018/053055 EN 2018 Mar. 22 for methods for Foot gesture detections.

Then based on the foot gesture detection results, steps 10301 and 10303 leads to corresponding actions of selecting the Next/Previous GUI item (step 10302), selecting the Previous/Next GUI item (step 10304) and Staying at the currently selected GUI item (step 10305).

It can be seen that a pre-determined Mapping from Type I Tap and Type II Tap to the selection of Previous GUI item and Next GUI item of the currently selected GUI item is used.

One example of such a mapping is that, when a Left/Right foot Type I Tap foot gesture, i.e., LFTapI/RFTapI is detected, select the Next GUI item of the currently selected GUI item, and when a Left/Right foot Type II Tap, i.e., LFTapII/RFTapII foot gesture is detected, change the GUI item selection to the Previous GUI item of the currently selected GUI item.

Note that LFTapI/RFTapI foot gesture corresponds to a user's foot heel part stays in touch with ground or a supporting platform, and the fore part of a user's foot sole taps ground. Foot gesture LFTapIwT/RFTapIwT (which uses also foot tilt angle information to detect the same type of Tap foot gesture) can also be used for the GUI item selection method illustrated in FIG. 29 as the type I Tap in step 10300 and 10301.

Type II Tap foot gesture corresponds to the fore part of a user's foot sole stays in touch with the ground or a supporting platform, and the heel part of the user's foot taps ground. Similarly, foot gesture LFTapIIwT/RFTapIIwT can be used as the type II Tap foot gesture in step 10300 and 10303 for the GUI item selection method illustrated in FIG. 29.

So far, neighbor relationship based GUI item selection methods using foot gestures or foot gesture features (including foot pointing direction(s), foot touch state, and foot tilt angle(s)) have been presented. Foot gestures with foot pointing direction information and foot touch state can also be used for cursor movement control and support cursor based GUI item selection.

Such foot gestures include various Directed TapDown foot gestures, Bi-foot Directed TapDown foot gestures, and 3D directed TapDown, etc.

Figure 30:
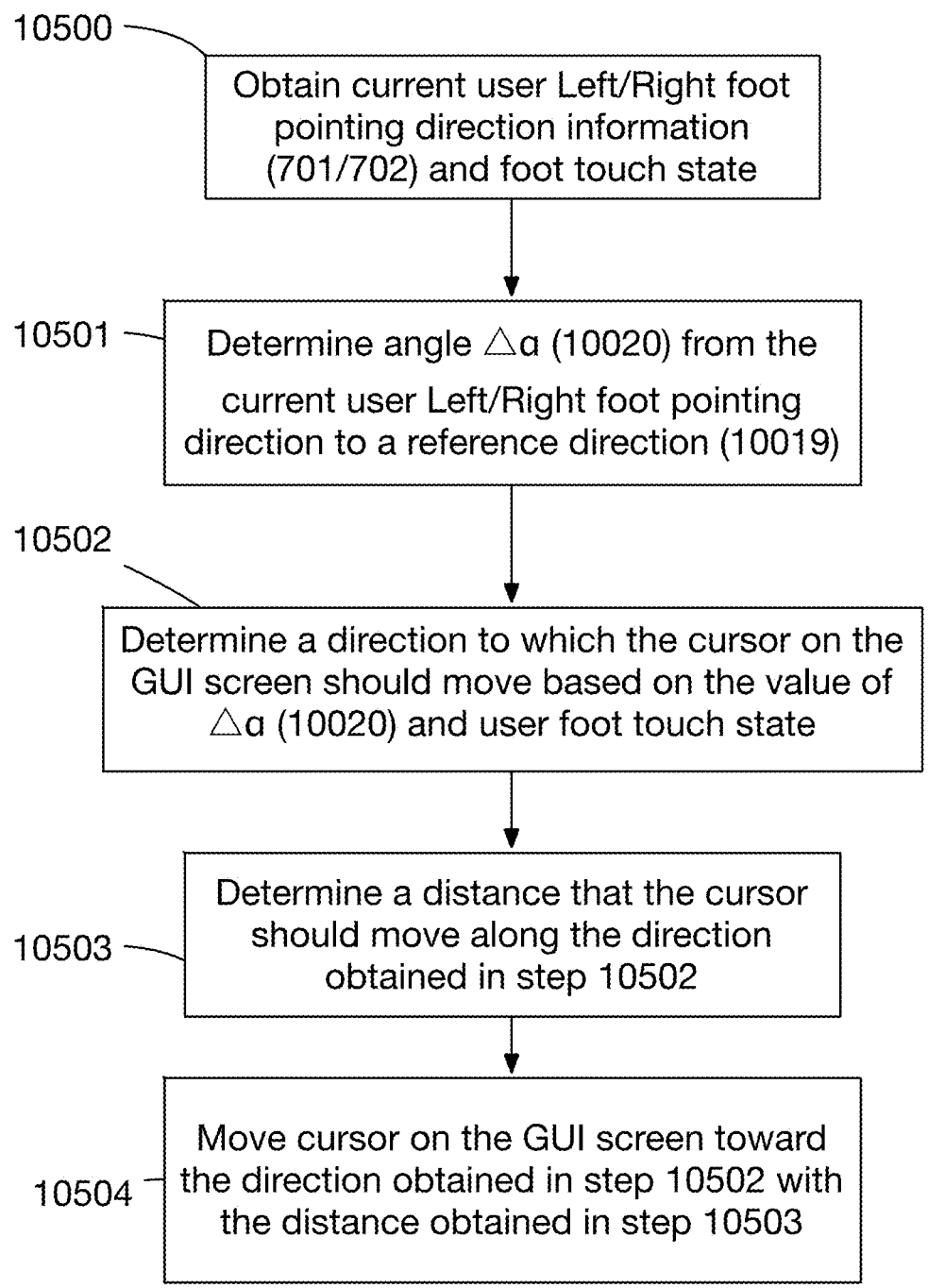
FIG. 30 shows the flowchart of using left/right foot pointing direction and foot touch state to control cursor movement.

FIG. 30 shows the flowchart of using left/right foot pointing direction and foot touch state to control cursor movement. The processing flow is executed when updated user foot gesture features, including foot pointing direction(s), e.g., $V_{LF}/V_{RF}$ (701/702) and foot touch state, are obtained.

Similar to step 10401 in FIG. 25, step 10501 obtain a updated $\Delta\alpha$ (10020) from a reference direction $V_{Ref}$ (10019) to the foot pointing direction to as illustrated in FIG. 22. As previously described, the reference direction vector $V_{Ref}$ (10019) could be determined using various methods.

Then step 10502 Determines a direction to which the cursor on the GUI screen should move based on the value of $\Delta\alpha$ (10020) and user foot touch state. A pre-determined mapping between cursor movement directions (up/down/left/right) and ranges of $\Delta\alpha$ (10020) can be used. With the mapping, the angle $\Delta\alpha$ (10019) is able to determine a direction in a 2D plane. The user's foot touch state can be used to determine whether the cursor should move in the direction corresponding to $\Delta\alpha$, or the cursor should move in the opposite direction corresponding to $\Delta\alpha$. For example when user's Left/Right foot touch state is {A}/{C}, cursor should move in the $\Delta\alpha$ direction, and when user's Left/Right foot touch state is {B}/{D}, cursor should move in the opposite direction corresponding to $\Delta\alpha$.

Then step 10503 further determines a distance that the cursor should move along the cursor moving direction obtained in step 10502. Various ways can be used to determine the moving distance. In some embodiments, the moving distance can be a fixed value. In some other embodiments, the moving distance can be a function of the time duration from the previous processing time to the current time. User Left/Right foot tilt angle $\gamma_L/\gamma_R$ (1001/1002) can also be used to determine the moving distance. For example, a larger absolute value of $\gamma_L/\gamma_R$ (1001/1002) may give a larger moving distance, so that the cursor moves faster in the moving direction as a user further tilts his/her Left/Right foot.

Step 10504 updates the cursor's position on the GUI screen by moving it toward the moving direction obtained in step 10502 with the distance obtained in step 10503.

Besides foot gesture based GUI item selection methods discussed above, foot gestures can be effectively used for GUI mode invocation, GUI action confirmation, and GUI mode Exit.

For GUI mode invocation, various foot gesture can be used. Here some examples are discussed.

Using foot gesture feature information including user left/right foot pointing direction, user left/right foot tilt angle, and user foot touch state, the following example foot gesture can be used for GUI invocation.

The foot gesture used for GUI invocation is defined by a single foot gesture state {40 deg<$\Delta\alpha$<50 deg}+{$\gamma_R$<−30 deg}+{C} which has three requirements on right foot pointing direction, on right foot tilt angle, and on right foot touch state respectively. The first requirement {40 deg<$\Delta\alpha$<50 deg} requires that the angle $\Delta\alpha$ (10019) from a reference direction to the right foot pointing direction $V_{RF}$ is between 40 degree and 50 degree. The second requirement of the foot gesture state {$\gamma_R$<−30 deg} requires right foot tilt angle to be smaller than −30 degree. The third requirement of the foot gesture state {C} requires the user's right foot touch state to be {C}.

GUI invocation often requires a user to perform a required foot gesture such as {40 deg<$\Delta\alpha$<50 deg}+{$\gamma_R$<−30 deg}+{C} for at least a certain amount of time tgs as a confirmation for GUI (mode) invocation. Accordingly, time duration of the foot gesture state, denoted as tgs shall also be included. With the additional foot gesture state duration information the example foot gesture state {40 deg<$\Delta\alpha$<50 deg}+{$\gamma_R$<−30 deg}+{C} becomes {40 deg<$\Delta\alpha$<50 deg}+{$\gamma_R$<−30 deg}+{C}+tgs Further the requirement on duration of the foot gesture state tgs>τgs, can be added using a landmark sub foot gesture state {40 deg<$\Delta\alpha$<50 deg}+{$\gamma_R$<−30 deg}+{C}+{tgs>τgs}, which gives the following foot gesture state for GUI invocation {{40 deg<$\Delta\alpha$<50 deg}+{$\gamma_R$<−30 deg}+{C}+
 tgs}*{{40 deg<$\Delta\alpha$<50 deg}+{$\gamma_R$<−30 deg}+
 {C}+{tgs>τgs}}

The foot gesture for GUI invocation has a single foot gesture state that requires the user's right foot is posed such that requirements {40 deg<$\Delta\alpha$<50 deg}+{$\gamma_R$<−30 deg}+{C} are satisfied for a time period greater than τgs.

During the time period 0<tgs<τgs, a prompt can be displayed on the screen to inform the user that the program is about to switch/enter to a GUI mode. The user can decide to continue the foot gesture {{40 deg<$\Delta\alpha$<50 deg}+{$\gamma_R$<−30 deg}+{C}+tgs} until tgs>τgs to enter the GUI mode, or the user can break the foot gesture state requirements to cancel the GUI mode invocation.

The above is an example foot gesture used for GUI invocation. The generalization of the method is summarized as follows.

First, a pre-determined foot gesture state is selected for GUI invocation. The pre-determined foot gesture state may have a requirement on user's left and/or right foot touch state, for example, requiring the left and/or right foot touch state to be in a pre-determined set, e.g., {A}, {B}, {A, B}, {A}+{CD}, etc. The pre-determined foot gesture state may also have a requirement on user's left and/or right foot pointing direction(s), for example, requiring the angle $\Delta\alpha$ (10020) from a reference direction $V_{ref}$ (10019) to the left/right foot pointing direction $V_{LF}/V_{RF}$ (701/702) to be in a pre-determined range. The pre-determined foot gesture state may also have a requirement on user's left and/or right foot tilt angle(s), for example, requiring the absolute value of left/right foot tilt angle $\gamma_L/\gamma_R$ (1001/1002) to be larger than a pre-determined threshold.

Figure 31:
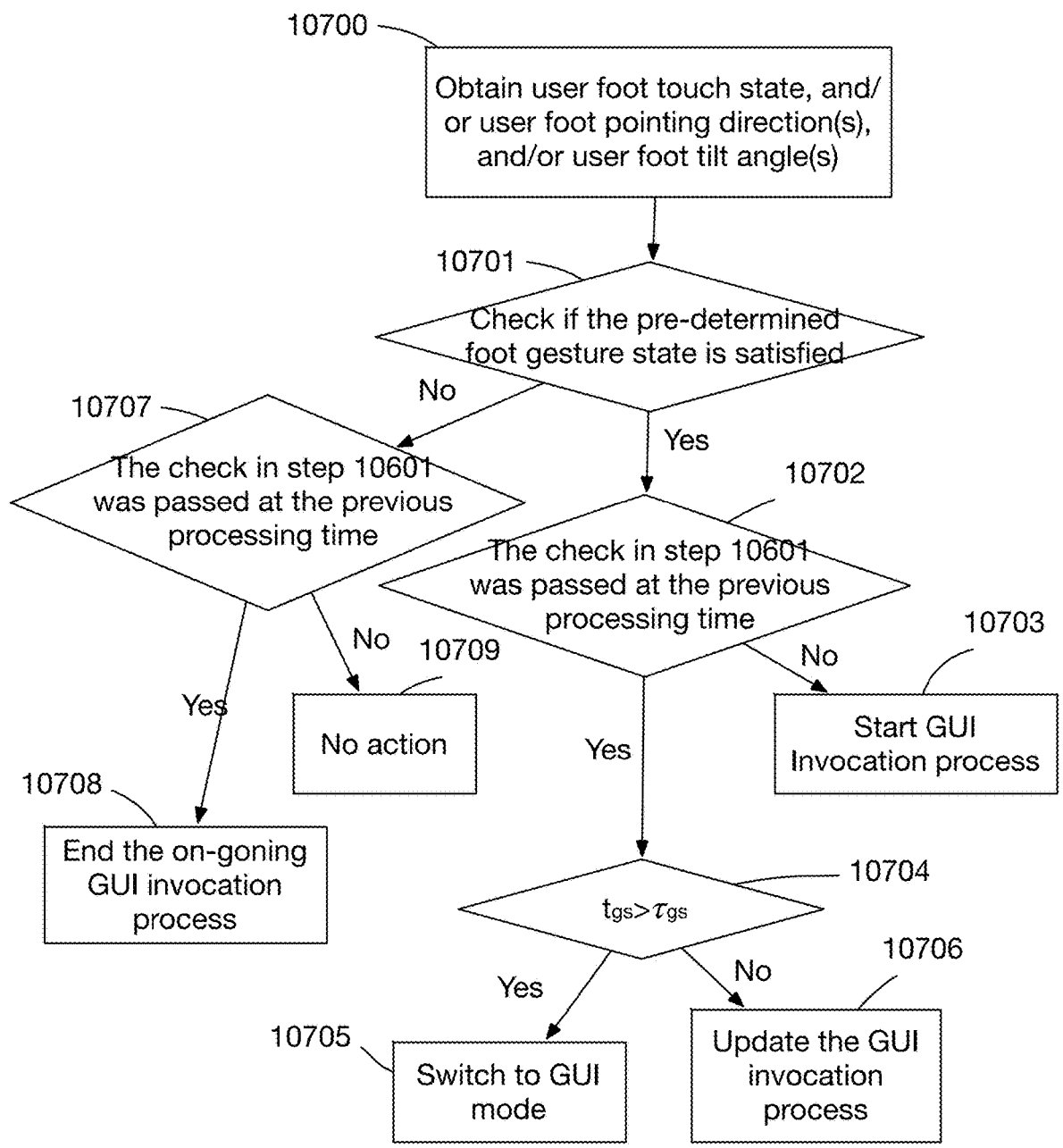
FIG. 31 shows flowchart for GUI invocation when new/updated foot gesture feature data is received.

With the pre-determined foot gesture state, the processing flowchart for GUI invocation when new/updated foot gesture feature data is received is shown in FIG. 31. In step 10700, for the detection of the pre-determined foot gesture state, obtain updated (current) user left and/or foot touch state(s) and/or user left/right foot pointing direction (s) $V_{LF}/V_{RF}$ (701/702) (or equivalently $\omega_L/\omega_R$), and/or user left/right foot tilt angles (s) $\gamma_L/\gamma_R$ (1001/1002). Then step 10701 check if the current user foot touch state, foot pointing direction(s) and foot tilt angle(s) satisfy the requirements of the pre-determined foot gesture state. If the predetermined foot gesture state is detected (all its requirements are satisfied), step 10702 further checks if the pre-determined foot gesture state was detected at the previous processing time. If step 10702 decides No, step 10703 start a GUI invocation process. Such a GUI invocation process corresponds to the time period when 0<tgs<τgs, where tgs is the time duration of the detected pre-determined foot gesture state, and τgs is a time threshold that may be pre-determined or dynamically evaluated as τsel in FIG. 24. As previously presented, the invocation process may display a prompt for user on the screen to inform the user that the program is about to switch to the GUI mode.

If step 10702 decides Yes, step 10704 compares the time duration of the detected pre-determined foot gesture state tgs with the time threshold τgs. If step 10604 determines that the requirement on tgs has been satisfied, step 10705 is executed, which ends the invocation process and switches the program to the GUI mode. If step 10704 determines the requirement on tgs is not yet satisfied, step 10706 is performed to update the invocation process, for example, updating the display to notify the user the remaining time to the GUI mode switch. Note that the invocation process is in place to enhance user experience, which is optional and in practice do nothing in some implementations.

Back to step 10701, if it is determined that the predetermined foot gesture state is not satisfied at the current processing time, then, step 10707 check if the pre-determined foot gesture state was satisfied at the previous processing time. If step 10707 decides Yes, step 10708 ends the invocation process that was started from an earlier processing time, which cancels the GUI invocation. If step 10607 decides No, then no further action should be performed by the program at the current processing round.

By now, methods for "GUI item selection", "GUI (mode) invocation" using foot gestures or foot gesture features (foot pointing direction(s), foot touch state and foot tilt angle(s)) have been presented. For "Action confirmation" various foot gesture can be used including various Tap foot gestures, and Swipe foot gestures. The choice of a foot gesture for "Action confirmation" is often related to the selected method for "GUI item selection". For example, when used for "Action confirmation", Tap foot gestures work better with GUI item selection methods that use foot pointing direction(s), e.g., methods given in FIG. 23, FIG. 25, and FIG. 30; while Swipe foot gestures work better with Tap foot gesture based GUI item selection methods, e.g., the method illustrated in FIG. 29.

Tap foot gestures mentioned above include Left/Right Foot Type I Tap (LFTapI_n, RFTapI_n, LFTapIwT_n, RFTapIwT_n), and Left/Right Foot Type II Tap (LFTapII_n, RFTapII_n, LFTapIIwT_n, RFTapIIwT_n).

Swipe foot gestures mentioned include Left foot Swipe (i.e., $V_{LF\_}L$, $V_{LF\_}R$), Right foot Swipe ($V_{RF\_}L$, $V_{RF\_}R$), Single foot Type I Swipe Left (e.g., LFSwp_L+{B}, RFSwp_L+{D}), Single foot Type I Swipe Right (e.g., LFSwp_R+{B}, RFSwp_R+{D}), Single foot Type II Swipe Left (LFSwp_L+{A}, RFSwp_L+{C}), Single foot Type II Swipe Right (LFSwp_R+{A}, RFSwp_R+{C}). (See patent WO2018/053055 EN 2018 Mar. 22)

For GUI Exit, in many cases, a GUI mode is automatically switched out, i.e., GUI Exit is automatically performed, with an "Action confirmation" of a selected GUI item. In such cases, no separate "GUI (mode) Exit" method is needed. While, in some cases, a "GUI (mode) Exit" method is needed for a user to switch out a GUI mode, so that the user can confirm the program mode switch. For such cases, the GUI invocation methods using foot gesture information presented earlier, including the procedure shown in FIG. 31, can be used also for "GUI (mode) Exit".

In summary, GUI methods using foot gestures or foot gesture feature information are disclosed for "GUI invocation", "GUI item selection", "Action confirmation", and "GUI Exit". The implantation of these methods in an electronic device allows a user to use a foot gesture feature information acquisition device, e.g., the compass embedded footwear system, as a control device to perform various GUI operations in order to control and interact with software programs running on the electronic device.

Control Methods Using Heading (2D Pointing Direction in a Leveled Plane) and Tilt Angle Information from Foot Gesture Information Acquisition Device (e.g., Compass Embedded Footwear System) and Hand Operated Controller Heading angle (which is the equivalent of 2D foot pointing direction angle for foot gesture information acquisition devices) and tilt angle information of a user's foot from a foot gesture information acquisition device or from a hand operated controller can be used for various control purposes, which allow a user to instruct devices and applications to do various operations.

In general the disclosed methods of control using heading direction (angle) and/or tilt angle information for a device or applications involve the following steps: i) determine a reference heading and/or a reference tilt angle, ii) obtain current heading angle and/or tilt angle, iii) evaluate the difference(s) of the current heading and/or tilt angle(s) to the corresponding reference heading angle and/or reference tilt angle, iv) determine the action to take based on the updated difference of the heading angle to the reference heading angle, and/or the updated difference of the tilt angle to the reference tilt angle. Note that here heading angle corresponds to foot pointing (direction) angle for footwear.

Figure 32:
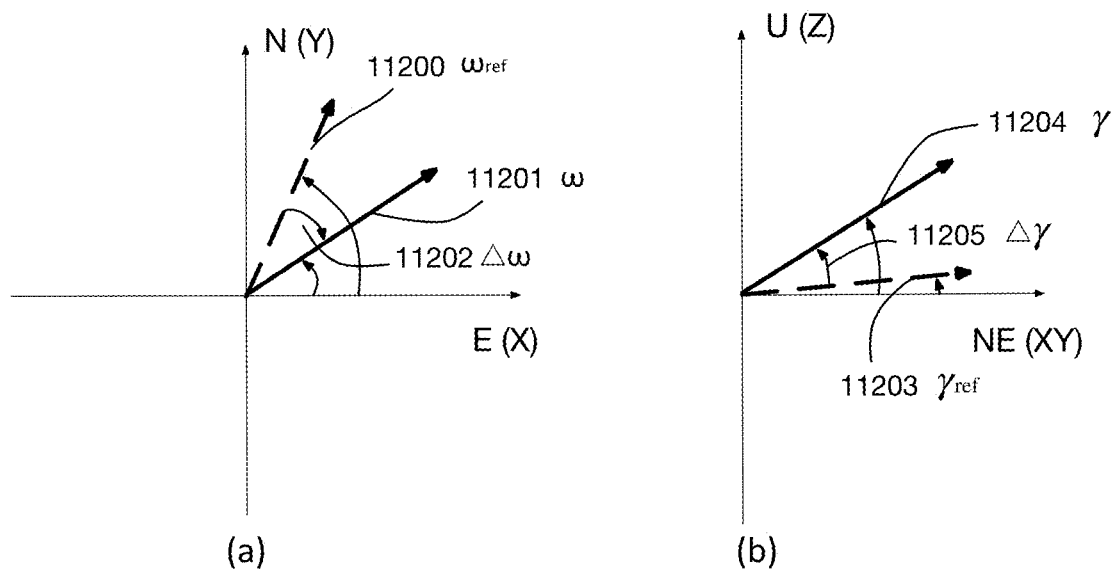
FIG. 32 illustrates the heading/tilt angle 11201 ω, and a pre-determined reference heading/tilt angle

FIG. 32(*a*) illustrates the heading angle/direction 11201 ω, and a pre-determined reference heading angle/direction 11200 $\omega_{ref}$ determined in step i), and the angle different between the heading angle/direction and the reference heading angle/direction Δω 11202. Note that in the figure, the heading angle/direction are interchangeably represented by a vector or a angle ω, which specifies a direction/angle in the 2D East-North or X-Y plane. It can be seen that the range for Δω 11202 may be −180 deg to 180 deg with a 360 degree range.

FIG. 32(*b*) illustrates the tilt angle 11204 γ, and a pre-determined reference tilt angle $\gamma_{ref}$ 11203 determined in step i), and the difference between the tilt angle and the reference tilt angle Δγ 11205. Note that the tilt angle is illustrated/evaluated in a plane formed by the local Up (Z) axis, and the projected direction in E-N(X-Y) plane of the footwear or controller's 3D pointing direction. See also FIG. 11. It can be seen that the range for tilt angle γ 11204 may be −90 deg to 90 deg with a 180 degree range.

For different applications and desired user control experiences, methods for the determination of reference heading angle and/or reference tilt angle in step i) are different; the device from where the heading angle information and the tilt angle information are obtained in step ii) are different; and the mapping from updated heading angle difference Δω 11202 and tilt angle difference Δγ 11205 in step iv) to device/application actions/operations are different.

Application 1: Movement Control with Foot Pointing Directions, i.e., Heading and/or Tilt Angles In many applications, games, a user need to have control of character movement in a direction, e.g., forward, backward, left, right, forward right, etc. With foot pointing directions available from a foot gesture information acquisition device such as the compass embedded footwear system, an application can determine user intended character movement. (Note that the proposed method also can be used with the disclosed hand operated controller)

Step i: determination of the reference heading direction/ angle and/or reference tilt angle.

Prompt to instruct the user to point his/her foot in a desired reference direction and measures the corresponding foot heading (pointing direction) and/or tilt angle; set the measured heading and or tilt angle as the reference direction.

For most cases, when tilt angle is used, the reference tilt angel for movement control can be simply determined as 0 degree.

Step ii and iii: obtain updated heading direction and tilt angle from the controller device (footwear or hand operated controller) and evaluate the angle difference $\Delta\omega$ and $\Delta\gamma$.

Step iv: Determine which direction to move based on heading angle difference $\Delta\omega$. In general, the moving direction is a function of $\Delta\omega$.

For example, when $\Delta\omega$ belongs to a first region e.g., −10 deg<$\Delta\omega$<10 deg, use forward (up) as moving direction; when $\Delta\omega$ belongs to a second region, e.g., 10 deg<$\Delta\omega$<50 deg use right forward (up right) as moving direction, when $\Delta\omega$ belongs to a third region, e.g., 50 deg<$\Delta\omega$<90 deg use right as moving direction, when $\Delta\omega$ belongs to a fourth region, e.g., −90 deg<$\Delta\omega$<−50 deg, use left as moving direction, etc.

The mapping form $\Delta\omega$ to moving direction can be designed to achieve desired control experiences.

Determine the speed of movement in the direction based on $\Delta\gamma$.

The $\Delta\gamma$ value can be used to determine the speed of movement in a direction determined by $\Delta\omega$. In general, the move speed can be a function of $\Delta\gamma$.

For example, when $\Delta\gamma$>10 deg move in the moving direction determined by $\Delta\omega$ with a certain speed; when $\Delta\gamma$<−10 deg move towards the opposite direction of the direction determined by $\Delta\omega$ with a certain speed; When the absolute value of $\Delta\gamma$ is below a threshold, e.g., −10 deg<$\Delta\gamma$<10 deg, movement speed is zero, such that movement are made only when the absolute value of the tilt angle difference is larger than a threshold, e.g., 10 deg.

Application 2: Acceleration/Brake Control for Driving Games Using User Foot Pointing Direction (Heading) and Foot Tilt Angle In order to simulate the foot actions/controls of a driver for pressing gas and brake, the following control method can be used. The method involves the determination of a driver's foot position, i.e., on gas or on brake based on user's foot heading (2D foot pointing direction), and the level of pressing on brake and gas pedal using foot tilt angle.

Step i) determination of the reference for foot pointing direction (heading) and tilt angle Use a previous foot pointing direction (heading) at a short time period, e.g. 0.5 second before the current time, as the reference direction for heading $\omega_{ref}$ 11200. (or the application may instruct a user to set a fixed reference direction for foot heading $\omega_{ref}$ 11200)

Use tilt angle zero as the reference tilt angle $\gamma_{ref}$ 11203 (or the application may instruct a user to set a reference direction for foot tilt angle $\gamma_{ref}$ 11203)

Step ii) and iii) obtain the current foot pointing direction (heading) $\omega$ and tilt angle $\gamma$ from a foot gesture feature information acquisition device, such as the compass embedded footwear system; Evaluate the difference $\Delta\omega$ 11202 to the reference heading direction and tilt angle difference $\Delta\gamma$ 11205.

Step iv) if $\Delta\omega$ is beyond a threshold e.g., 30 deg<$\Delta\omega$, determines that a user's foot is on gas If $\Delta\omega$ is beyond another threshold, e.g., $\Delta\omega$<−30 deg, determines that a user's foot is on brake Otherwise, there is no change of a user's foot position.

Use $\Delta\gamma$ evaluated in step iii) to determine the pressing level on gas pedal or brake pedal. In general the pressing level is a function of $\Delta\gamma$. An example of such a mapping is, when $\Delta\gamma$ is smaller than a threshold, e.g., 2 deg, full pressing level on gas or brake pedal are applied, which results in maximum acceleration or brake; when $\Delta\gamma$ is greater than e.g., 20 deg, zero pressing level will be applied to gas or brake resulting no acceleration or brake; when $\Delta\gamma$ is in between the two thresholds, e.g., 2 deg and 20 deg, a pressing level that is in between the maximum pressing level and zero pressing level can be determined based on $\Delta\gamma$.

The proposed method using foot heading and tilt for driving game brake/acceleration control provides a driving control experience that is similar to real life car driving experience.

Application 3: Achieve Mouse Functions Using a Foot Gesture Feature Information Acquisition Device, e.g., the Compass Embedded Footwear System, as a Foot Operated Controller Mouse functions including cursor movement control and mouse button clicks are important to computer controls, which is commonly achieved using a mouse or touch pad. A foot gesture feature information acquisition device, e.g., the compass embedded footwear, can be used to perform functions of mouse using foot pointing direction, tilt angle and touch states.

Figure 33:
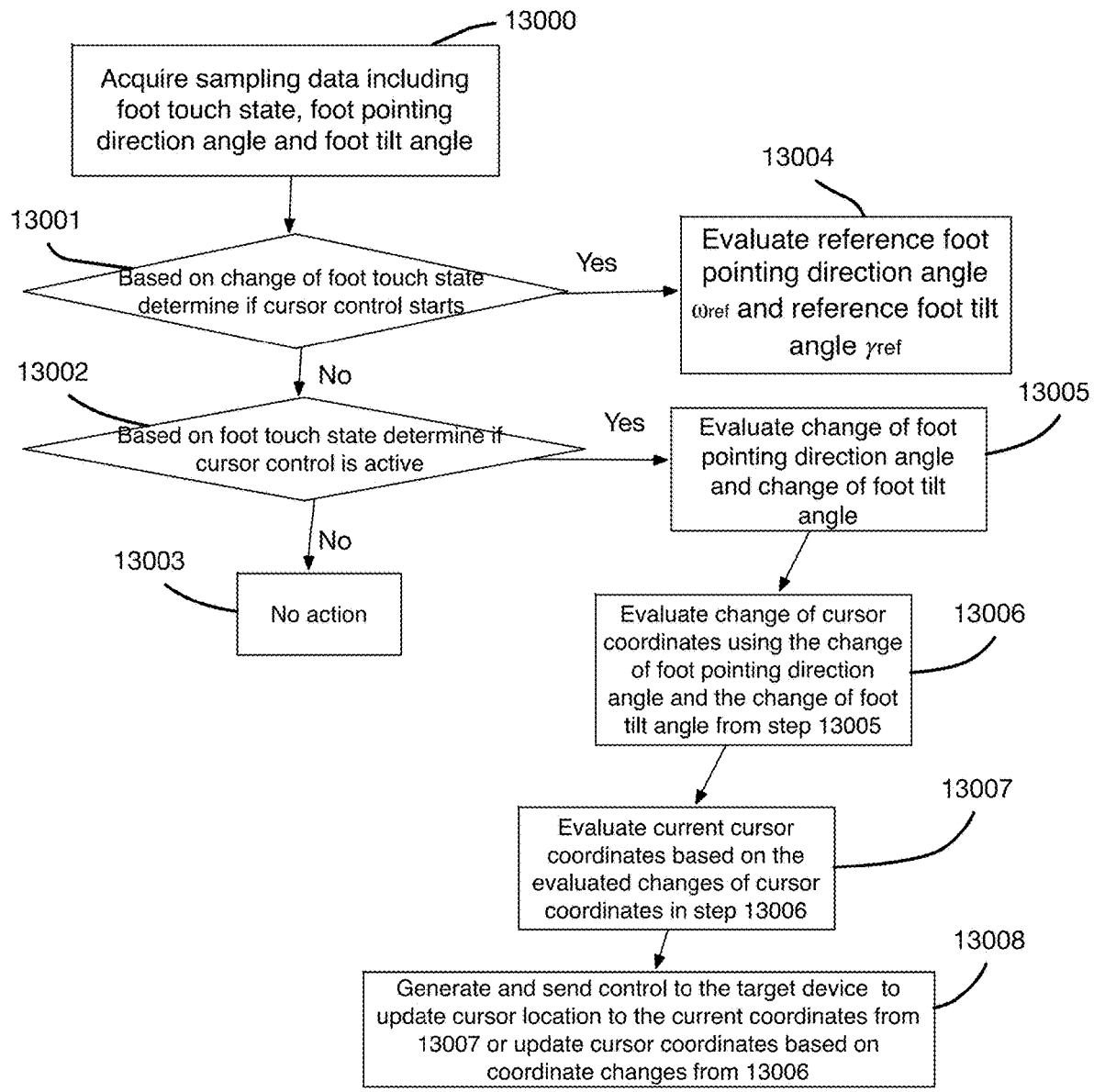
FIG. 33 shows the processing flow at a data sampling time for cursor movement control.

FIG. 33 shows the processing flow at a data sampling time for cursor movement control. The processing flow can be executed by a foot gesture feature information acquisition device, e.g., a compass embedded footwear, as a foot operated controller device, or by a targeting device, e.g., a computer, for cursor control.

At a sampling time, in step 13000, data are acquired for foot touch state, foot pointing direction (angle) $\omega_L/\omega_R$ and foot tilt angle $\gamma_L/\gamma_R$.

Step 13001 detects the start of cursor control. The start of cursor control by the foot operated controller can be indicated by a change of touch state. Here, without loss of generality, assume a right footwear is used to perform mouse functions including cursor control. Start of cursor control by the foot operated controller can be indicated by right foot touch state change, for example, from { } to {D} or {C}. This is equivalent to the detection of foot gesture { }->{D} or { }->{C}. If the start of cursor control is detected in step 13001, step 13004 initializes the cursor control by recording foot pointing direction/angle $\omega_R$ 708 and user the foot tilt angle $\gamma_R$ 1002 as reference angles $\omega_{ref}$ and $\gamma_{ref}$.

For right foot, a foot touch state {D} or {C} (for left foot {A} or {B}) is used to indicates that the cursor control is active. For example, when { }->{D} is used to start cursor control, foot touch state {D} indicates the cursor control is active. In this case, when right foot touch state is {D}, the foot operated controller will issue command to control device cursor movements. In this case, when foot touch state is not {D} but other touch state { }, {CD}, or {C} cursor control is inactive. Step 13002 determines if cursor control is active by checking the current foot touch state. If cursor control is determined to be inactive, no further action needs to be done.

When step 13002 determines cursor control is active, step 13005 evaluates the changes in foot pointing direction, e.g., $\omega_R$ 708 and foot tilt angle e.g., $\gamma_R$ 1002 compared to the reference angles angles $\omega_{ref}$ and $\gamma_{ref}$. The changes/angle differences can be obtained as $\Delta\omega=\omega_R-\omega_{ref}$ and $\Delta\gamma=\gamma_R-\gamma_{ref}$.

Note that for the evaluation of changes in foot pointing direction and foot tilt angle, the reference angles $\omega_{ref}$ and $\gamma_{ref}$ can be assumed to be zero, $\Delta w$ and $\Delta\gamma$ may be directly obtained using sensor measurements, e.g., gyro sensor measurements without the evaluation of actual foot pointing direction angle, e.g., $\omega_R$ and foot tilt angle, e.g., $\gamma_R$.

In step 13006, use angle differences $\Delta w$ and $\Delta y$ to determine the cursor's coordinate differences (e.g., in number of pixels in x and y directions) compared to the cursor's coordinates at the time when $\omega_{ref}$ and $\gamma_{ref}$ were determined (denoted as $x_{ref}$ and $y_{ref}$). The coordinate differences are denoted as $\Delta x_{ref}$ and $\Delta y_{ref}$. Note that $x_{ref}$ and $y_{ref}$ can be obtained at the time of foot touch state change that started the cursor control process in step 13004.

Different ways can be used to achieve the mapping from angle differences $\Delta w$ and $\Delta\gamma$ to cursor coordinate changes. For example, naturally, $\Delta w$ is used to determine cursor coordinate change $\Delta x_{ref}$ in x direction, e.g., $\Delta x_{ref}$ is a function of $\Delta\omega$, and $\Delta\gamma$ is used to determine cursor coordinate difference $\Delta y_{ref}$ in y direction, e.g., $\Delta y_{ref}$ is a function of $\Delta\gamma$. The mapping functions for $\Delta x_{ref}$ and $\Delta y_{ref}$ can be linear or nonlinear.

Step 13007 is optional, which evaluates current cursor coordinates using the coordinate changes $\Delta x_{ref}$ and $\Delta y_{ref}$.

Step 13008 generates and send control message to a targeting device to update cursor position to the current cursor coordinates from step 13007 or update cursor position based on coordinate changes $\Delta x_{ref}$ and $\Delta y_{ref}$ from step 13006.

Alternatively, for step 13006, angle differences $\Delta\omega$ and $\Delta\gamma$ are used to determine the current moving speed of the cursor in x and y coordinates denoted as $v_x$, and $v_y$. For example, $\Delta\omega$ is used to determine cursor move speed in x direction, and $\Delta\gamma$ is used to determine cursor coordinate move speed in y direction since the previous sampling time. Here $v_x$ can be linear or nonlinear function of $\Delta\omega$; $v_y$ can be a linear or nonlinear function of $\Delta\gamma$.

In this case, changes of cursor coordinates compared to the cursor coordinates at the previous sampling time, denoted as $\Delta x$ and $\Delta y$, can be obtained using $v_x$, $v_y$ and the time difference between the previous and current sampling time.

In step 13007, current cursor coordinates can be evaluated using the evaluated changes $\Delta x$, $\Delta y$ from step 13006, and the cursor coordinates at the pervious sampling time.

Step 13008 generate controls based on results from step 13006 or 13007 and send the control to the targeting device for cursor control.

The processing flow 13000 and 13008 can also be performed at the targeting device, which receive data from a foot operated controller. In such cases, step 13008 only needs to generate controls for cursor coordinate update.

Besides cursor movement control, other functions of a mouse include various types of click operations, e.g., left single click, left double click, right click, etc. With a foot gesture feature acquisition device, e.g., the compass embedded footwear system as a controller, various foot gestures can be used to activate/control mouse clicks. For example right foot gestures { }->{C}, { }->{D}, or {C}->{CD}, {D}->{CD} can all be used to activate mouse clicks. However, it is desired that the foot gestures used to activate mouse click actions will not cause any cursor movement. This feature can be satisfied by the selection of a right set of foot gestures for mouse clicks according to the cursor control process, such that cursor control is inactive when foot gestures used for mouse clicks are performed. To achieve this, the touch state that activates/enables cursor control, e.g., {D}, should not be a foot gesture state of foot gestures that are used for triggering button clicks.

For example, assuming a right footwear is used to perform mouse function, when touch state {D} is the foot touch state that activates cursor control, the foot gestures including { }->{C}, {C}->{ }->{C} can be used to trigger/activate mouse click actions. For example when foot gesture { }->{C} is detected, send control to target device to perform a mouse left click action. When foot gesture { }->{C}->{ }->{C} is detected, send control to target device to perform a mouse double left click action. When foot touch state remains as {C} for more than a predefined time threshold, e.g., 1 second, send control to target device to perform a mouse right click action. When any of these foot gestures for mouse click actions are detected, cursor control is inactive, thus no cursor movement will be made as mouse click actions are being performed.

Application 4 Command/Operation Selection Using User Foot Pointing Direction Method 1

When using a computer application, a common function is to allow user to select one of multiple action/command/operation options. Examples include the selection of operations from a menu list. Using 2D foot pointing direction (heading) and/or tilt angle information from a foot gesture information acquisition device, such as the compass embedded footwear system, such operation/command selection can be accomplished using the following steps.

Step i) determination of the reference for pointing direction (heading) for the footwear controller:

A reference footwear heading direction (angle) and/or a reference tilt angle can be set in advance by a user. In such a case, an application/operating system can instruct the user to place his/her foot in a desired pointing direction and set it with the program/operation system (by performing a foot gesture, pressing a button, etc.) as the reference heading (and reference tilt) angle(s).

Step ii) and iii) obtain the current footwear controller heading $\omega$ (and tilt angle $\gamma$ when needed) and evaluate the corresponding heading difference $\Delta\omega$ 11202 (and tilt difference $\Delta\gamma$ 11205 when needed).

Step iv) based on the evaluated $\Delta\omega$ (and $\Delta\gamma$ when needed) determine which control/operation/command option is currently selected using a mapping from $\Delta\omega$ (and $\Delta\gamma$ when needed) to an option. In general each value of $\Delta\omega$ (and $\Delta\gamma$ when needed) may correspond a command/operation/control option for selection. For example, when the value of $\Delta\omega$ is in a first range, a first control/operation/command option is selected; when the value of $\Delta\omega$ is in a ith range, a ith control/operation/command option is selected, etc.

For example, in cases of a mapping when $\Delta\gamma$ is also used, when value of $\Delta\omega$ is in a first range and value of $\Delta\gamma$ is in a first range, a control/operation/command option corresponding to a 2D index (1,1) should be selected; when value of $\Delta\omega$ is in a ith range and value of $\Delta\gamma$ is in a jth range, a control/operation/command option corresponding to a 2D index (i,j) should be selected;

Inform a user the currently selected control/operation/command option by, for example, displaying a message to user about the currently selected control/operation/command option on screen, highlighting the currently selected control/operation/command option on screen, etc. Examples of control/operation/command options include menu items, buttons, keys on a virtual keyboard, etc. Note that the selection is not confirmed yet.

A user may confirm the selection and the execution of the command/action/operation by performing a foot gesture required by the operating system or application program. Such a foot gesture for selection confirmation may be single Tap, double Tap, increasing foot tilt angle above a threshold, decreasing foot tilt angle below a negative threshold, etc.

Or a user may turn foot pointing direction (and tilt angle when needed) to change the selected control/operation/command.

Application 5 Command/Operation Selection Using User Foot Pointing Direction Method 2

When using a computer application, a common function is to allow a user to select one from multiple action/command/operation options. Examples include the selection of operations from a menu list. Using 2D foot pointing direction (heading) and/or tilt angle information from a foot gesture information acquisition device, such as the compass embedded footwear system, such operation/command selection can be accomplished using the following steps. Different from method 1, method 2 uses heading difference $\Delta\omega$ 11202 (and tilt difference $\Delta\gamma$ when needed) to determine if the selected option should be changed, and how to change the selected command/operation/action option.

Step i) determination of the reference for pointing direction (heading) for the footwear controller:

A reference footwear heading direction (angle) and/or a reference tilt angle can be set in advance by a user. In such a case, an application/operating system can instruct the user to place his/her foot in a desired pointing direction and set it with the program/operation system (by performing a foot gesture, pressing a button, etc.) as the reference heading (and reference tilt) angle(s).

Step ii) and iii) obtain the current footwear controller heading $\omega$ (and tilt angle $\gamma$ when needed) and evaluate the corresponding heading difference $\Delta\omega$ 11202 (and tilt difference $\Delta\gamma$ 11205 as needed).

Step iv) based on the evaluated $\Delta\omega$ (and $\Delta\gamma$ as needed) determine when the selected control/operation/command option should be changed and how to change the selected option. In general each value of $\Delta\omega$ (and $\Delta\gamma$ when needed) may determine a time threshold below which the selected option should remain unchanged, and the next option to selected when the current option has been selected for a time period that is longer than the time threshold.

For example, when $\Delta\omega$ is in a first range, e.g., the absolute value of $\Delta\omega$ is below 10 deg, the time threshold for the selected command/operation/control option to remain unchanged may be set as infinite, such that the selected option will not change. When the value of $\Delta\omega$ is in a second range, e.g., 10 deg<$\Delta\omega$<20 deg, the time threshold can be set as, e.g., 2 seconds, such that the option selected will remain unchanged for 2 seconds and switch to a next option after 2 seconds. When the value of $\Delta\omega$ is in a third range, e.g., 20 deg<$\Delta\omega$, the time threshold can be set as, e.g., 1 second, such that the option selected will remain unchanged for 1 second and switch to a next option after 1 second. When the value of $\Delta\omega$ is in a fourth range, e.g., −20 deg<$\Delta\omega$<−10 deg, the time threshold can be set as, e.g., 2 seconds, such that the option selected will remain unchanged for 2 seconds and switch to a previous option after the 2 seconds. When the value of $\Delta\omega$ is in a fifth range, e.g., $\Delta\omega$<−20 deg, the time threshold can be set as, e.g., 1 second, such that the option selected will remain unchanged for 1 second and switch to a previous option after 1 second. Note that when tilt angle is also used, $\Delta\gamma$ can be similarly added to the mapping.

Inform a user the currently selected control/operation/command option by, for example, displaying a prompt to user for the currently selected control/operation/command option on screen, highlighting the currently selected control/operation/command option on screen, etc. Examples of control/operation/command options include menu items, buttons, keys on a virtual keyboard, etc. Note that the selection is not confirmed yet.

A user may confirm the selection and the execution of the command/action/operation by performing a foot gesture required by the operating system or application program. Such a foot gesture for selection confirmation may be single Tap, double Tap, increasing foot tilt angle above a threshold, decreasing foot tilt angle below a negative threshold, etc.

Hand Operated Controller Design Derived from the Footwear Controller

The pointing direction, tilt angle and touch state for foot gesture detections can be directly applied to hand operated controllers, such that the proposed methods for foot gesture detections can be used for hand operated controllers.

Figure 34:
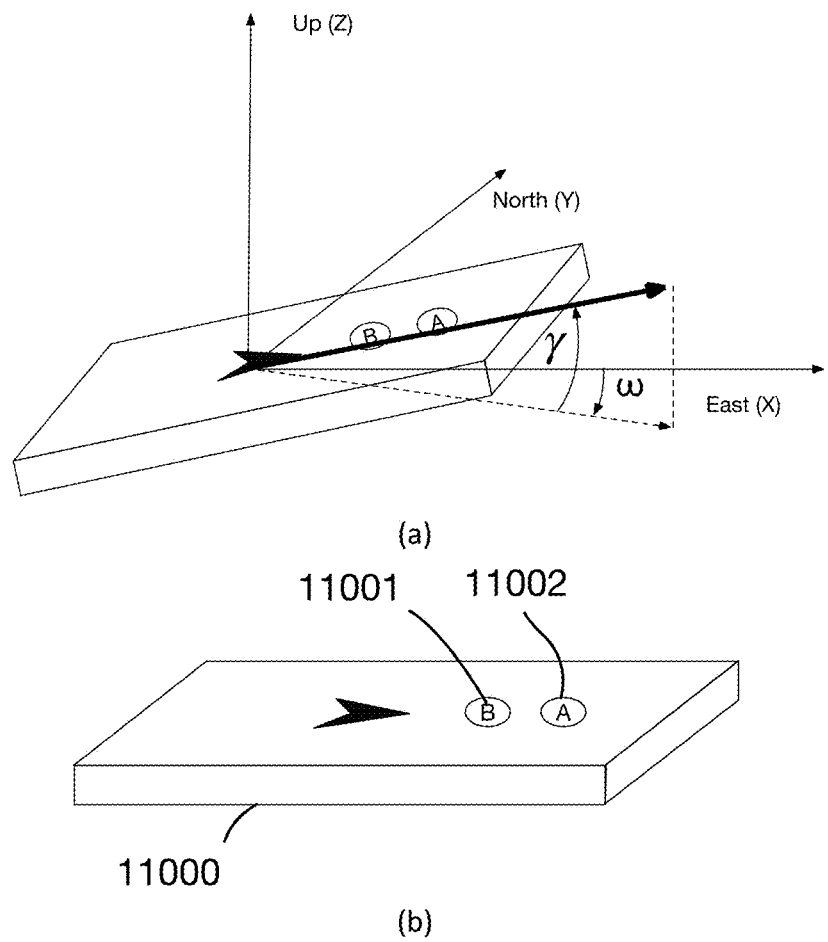
FIG. 34 shows a proposed hand controller design derived from the compass embedded footwear system

FIG. 34 shows a proposed hand controller design derived from the compass embedded footwear system. Like the compass embedded footwear system, the hand operated controller consists of a 3-axis compass, a 3-axis accelerometer, a 3-axis gyro sensor, and controller, communication unit as needed. With the sensors, the hand controller's heading $\omega$ (2-D pointing direction) and tilt angle $\gamma$ in a fixed 3D coordinate system, e.g., the user's local north-east-up coordinate system can be obtained. As shown in FIG. 34, the controller also has two buttons A (11001) and B (11002) which allows the controller to have four touch states that are the same as a single left (or right) footwear, e.g., {A}, {B}, {AB}, and { }. With the heading (2D pointing direction in a level plane), touch states and tilt information, the proposed foot gesture detection methods can be directly used for gesture detections with the hand operated controller.

Figure 35:
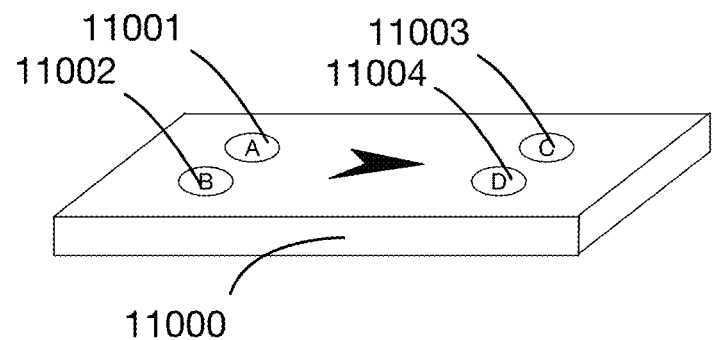
FIG. 35 shows another hand operated controller design with four buttons to produce Bi-foot touch states

In another hand operated controller design shown in FIG. 35, the hand operated controller may have four buttons marked as A (11001), B (11002), C (11003) and D (11004). The four buttons allow the controller to reproduce all 16 Bi-foot touch states of a left footwear and a right footwear. Similarly to the design in FIG. 34 the controller has sensors to provide controller heading $\omega$ and tilt angle $\gamma$ measurements. With the heading (2D pointing direction in a level plane), tilt information and 16 touch states, the gesture detection approach proposed for the footwear system can be directly used for gesture detections for the proposed hand operated controller.

Figure 36:
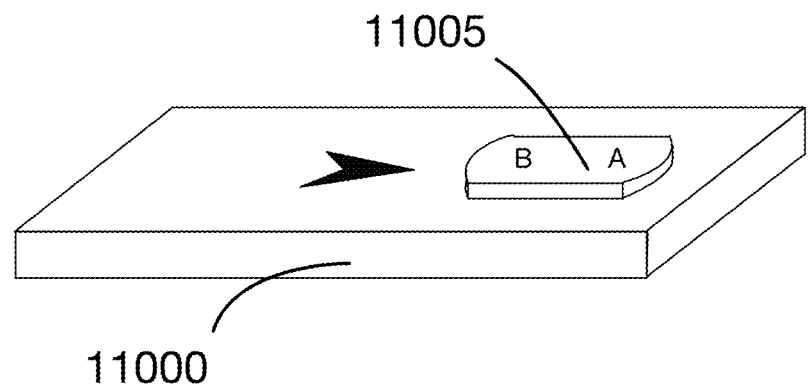
FIG. 36 shows a design that evolved from the controller design in FIG. 34, where the two buttons A and B are bridged

Note that when buttons A and B (C and D) are separate buttons, it is more difficult for user to produce the touch state with both button down, i.e., touch state {AB} and {CD}. FIG. 36 shows a design that evolved from the controller design in FIG. 34, where the two buttons A and B are bridged as 11005.

Figure 37:
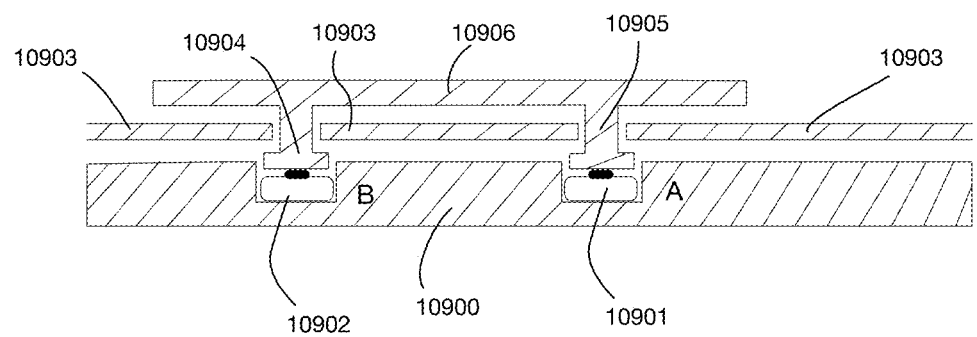
FIG. 37 shows the design of the bridged button with a cross section view.

FIG. 37 shows the design of the bridged button with a cross section view. Part 10900 is the base of the controller that hold the two buttons, e.g., A and B (or C and D). Part 10901 and Part 10902 are the two buttons A (or C) and B (or D). Part 10903 is the top cap of the controller. Part 10906 is a two-legged button presser/pusher that bridges the two buttons A and B (or C and D). One leg of the presser/pusher, i.e. 10901 sits right above button A (or C) and the other leg 10904 sits right above button B (or D). The two legs are held in between controller base 10900 and controller top cap 10903.

Figure 38:
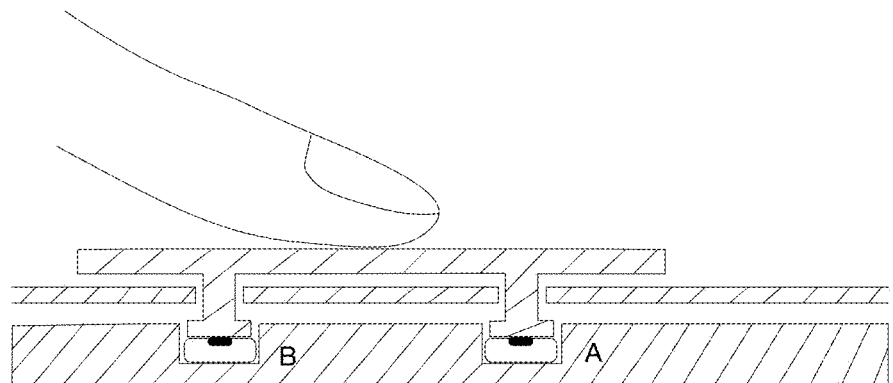
FIG. 38 illustrates the case when a user's one finger press down the middle section of the two-legged button presser.

FIG. 38 illustrates the case when a user's one finger press down the middle section of the two-legged button presser 10906. Both legs are lowered under the finger pressure and both buttons A (or C) and B (or D) are pressed down, which produces touch state {AB} (or CD)

Figure 39:
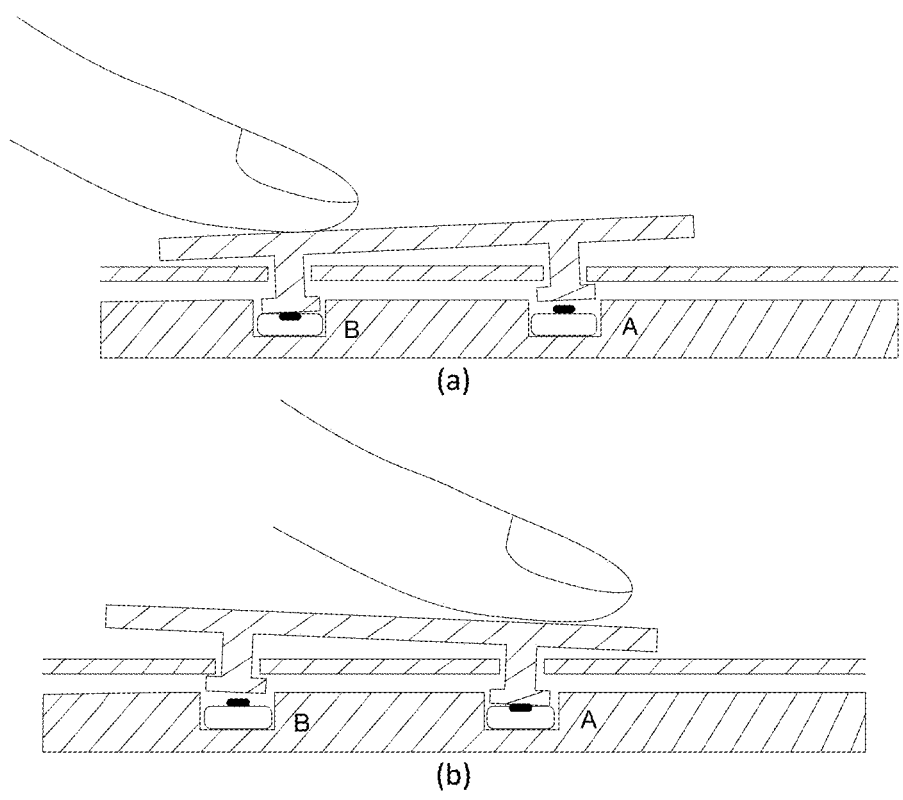
FIG. 39 illustrates the cases when a user's one finger press one end of the two-legged button pressure.

FIG. 39 illustrates the cases when a user's one finger press one end of the two-legged button pressure 10906. In this case, only one button A (C) or B (D) will be pressed, which produce touch state {A} (or {C}) as in FIG. 39(a) or {B} (or {D}) as in FIG. 39(b).

Figure 40:
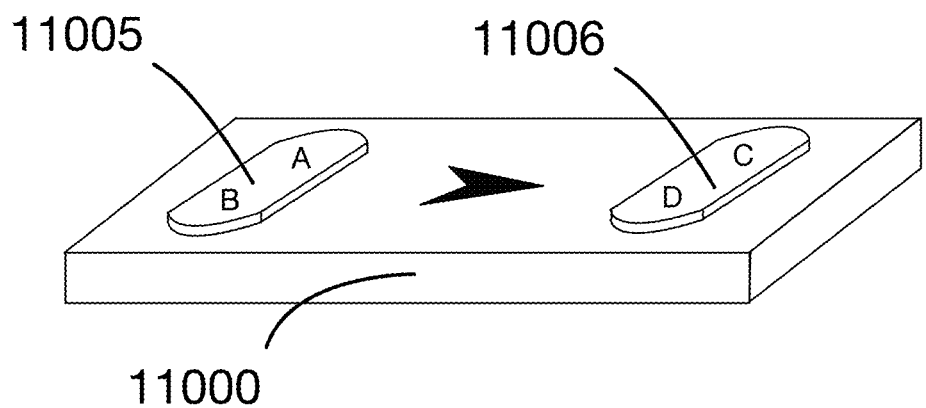
FIG. 40 shows a hand operated controller design further evolved from the design in FIG. 35 by using the bridged button design

The application of the bridged button design in the controller as in FIG. 40 allows a user to easily imitate all four touch states of a single left/right footwear with the hand operated controller use one finger.

FIG. 40 shows a hand operated controller design further evolved from the design in FIG. 35 by using the bridged button design in FIG. 37 for buttons A and B, and buttons C and D. A user may hold the controller using both hands, and use left hand thumb to control the bridged button AB to imitate left foot touch states, and use right hand thumb to control the bridged button CD to imitate right foot touch states.

With device touch states, device heading, and device tilt information available, methods proposed for foot gesture detections can be applied for the hand operated controllers disclosed above.

Hand Operated Controller Example Application 1: Cursor Movement Control Using Heading and Tilt Information from the Hand Operated Controller Method 1

Cursor movement control is important to computer operation, which is commonly achieved using a mouse or touch pad. Using the proposed device heading and tilt angle information from the proposed hand operated controller cursor movement control can be achieved.

The proposed control method allows a user to push down a controller button (A, B, C or D), to move a cursor or any cursor's equivalent by changing controller's heading and tilt angles while pushing down the button.

When user release the button, cursor control stops, and the cursor position is not controlled by the controller, which also prevent unintended cursor movements.

The method consists of the following key steps.

Step i) determination of the reference for pointing direction (heading) for the controller:

When a user pushes down the button (indicating the start of a cursor movement control), obtain the controller heading and tilt angles as the reference heading $\omega_{ref}$ 11200 and reference tilt angle $\gamma_{ref}$ 11203.

Also obtain and record the cursor's 2D screen coordinates x and y at the same time, denoted as reference coordinates $x_{ref}$ and $y_{ref}$.

Steps ii) and iii) While a user is pressing the button down, obtain the current controller heading $\omega$ and tilt angle $\gamma$ and evaluate the corresponding heading difference $\Delta\omega$ 11202 and tilt difference $\Delta_y$ 11205.

Step iv) Use $\Delta\omega$ 11202 and $\Delta\gamma$ 11205 obtained in step iii) to determine the offsets of the cursor's x and y coordinates to the reference coordinates $x_{ref}$ and $y_{ref}$. Denoted as $\Delta x$ and $\Delta y$, the offsets are in general a function of $\Delta\omega$ 11202 and $\Delta\gamma$ 11205. Naturally, $\Delta x$ is a function of $\Delta\omega$, and $\Delta y$ is a function of $\Delta\gamma$. When $\Delta\omega$ ($\Delta\gamma$) is in different regions, the mapping to $\Delta x$ ($\Delta y$) may be different to achieve different balance between sensitivity and accuracy in cursor movement.

For example $\Delta x = c0*\Delta\omega$, $|\Delta\omega|<\tau 0$; $\Delta x = c1*\Delta\omega$, $\tau 0|\Delta\omega|<\tau 1$; ... where $|\Delta\omega|$ is the absolute value of $\Delta\omega$, c0, c1 are mapping ratios for the respective $\Delta\omega$ region. The mapping form $\Delta\gamma$ to $\Delta y$ can be similarly designed.

Update the cursor position as with coordinates $x_{ref}+\Delta X$, $y_{ref}+\Delta y$.

Hand Operated Controller Example Application 2: Cursor Movement Control Using Heading and Tilt Information Method 2

The second method for cursor movement control is different from method 1 disclosed above in that the heading difference $\Delta\omega$ and tilt difference $\Delta\gamma$ are used to control cursor movement speed in x coordinate and y coordinates instead of determining a cursor's coordinates directly.

When a user pushes a controller button, e.g., A or B (C or D) cursor moves with speeds in x and y coordinates based on controller directions in heading and tilt.

Step i) determination of the reference for pointing direction (heading) for the controller (e.g., a hand operated controller or a foot gesture information acquisition device):

When a user pushes down the button (indicating the start of a cursor movement control), obtain the controller heading and tilt angles as the reference heading $\omega_{ref}$ 11200 and reference tilt angle $\gamma_{ref}$ 11203.

Steps ii) and iii): While a user is pressing the button down, obtain the current controller heading $\omega$ and tilt angle $\gamma$ and evaluate the corresponding heading difference $\Delta\omega$ 11202 and tilt difference $\Delta\gamma$ 11205.

Step iv) Use $\Delta\omega$ 11202 and $\Delta\gamma$ 11205 obtained in step iii) to determine the moving speed of the cursor in x and y coordinates denoted as vx and vy. In general vx and vy are determined by functions of $\Delta\omega$ 11202 and $\Delta\gamma$ 11205. Naturally, vx is a function of $\Delta\omega$, and vy is a function of $\Delta\gamma$. When $\Delta\omega$ ($\Delta\gamma$) is in different regions, vx (vy) may be different, which changes cursor moving speed.

For example when absolute value of $\Delta\omega$ is smaller than a threshold, vx=0, i.e., vx=0,$|\Delta\omega|<\tau 0x$;

When the absolute value of $\Delta\omega$ is above a threshold, cursor move in x coordinate with a speed determined by $\Delta\omega$. For example $\tau 0x<|\Delta\omega|$, vx=sign($\Delta\omega$)*15 (pixel/second).

When absolute value of $\Delta\gamma$ is below a threshold, vy=0, i.e., vy=0, $|\Delta\gamma|<\tau 0y$;

When the absolute value of $\Delta\gamma$ is above a threshold, cursor move in x coordinate with a speed determined by $\Delta\gamma$. For example $\tau 0y<|\Delta\gamma|$, vy=sign($\Delta\gamma$)*10 (pixel/second).

Then the cursor is moved in x and y coordinates based on the speed previously determined in step iv).

Compared to the first cursor control approach using the controller to control moving speed of cursor allows a user to accurately move a cursor to arbitrary coordinates on the screen, which may be difficult when resolution of the heading or tilt angle measurements from the controller is limited. Method 2 is suitable also to use with a foot operated controller, e.g., the disclosed compass embedded footwear system for cursor movement control by a user's foot.

In embodiments of the proposed hand operated controller, both cursor control methods 1 and 2 are supported, i.e., dual-mode cursor movement control. With the pressing down of one button e.g., Button A, the cursor moves with control mode one (according to method 1) to offer more responsive cursor movement control. With the pressing down of another button, e.g., button B, a second cursor movement control mode according to method 2 is used to achieve accurate cursor placement.

Various embodiments further provide a non-transitory computer readable storage medium, storing computer-executable instructions for, when being executed, one or more processors to perform the disclosed methods.

What is claimed:

1. A button pad device for effective detection of a user foot touch state, the device comprising:
 a supporting base;
 a button on the supporting base for press detections;
 an enclosure cap, including a protrusion capable of button pressing; and
 a supporting wall structure, aligned around the button to stop the enclosure cap and the protrusion from excessive move toward the button under pressure,
 wherein the enclosure cap further includes an edge support structure disposed at a side of the supporting wall structure away from the button, which makes the enclosure cap a flexible structure to restrain the enclosure cap and the protrusion moving in a vertical direction and further into the supporting wall structure to press the button.

2. The device according to claim 1, wherein:
 the enclosure cap has an enlarged pressing surface, the enlarged pressing surface covering the button, the supporting wall structure, and the edge support structure, an entire surface of the enlarged pressing surface being responsive to a pressure applied thereon for pressing the protrusion to move vertically within the supporting wall structure.

3. The device according to claim 1, wherein:
 the supporting base has one or more outer wall structures at an edge thereof, wherein the one or more outer wall structures are used to hold the enclosure cap in place.

4. The device according to claim 1, wherein:
 the supporting wall structure is a part of the supporting base.

5. The device according to claim 1, wherein:
 the supporting wall structure is a part of the enclosure cap.

6. The device according to claim 1, wherein:
 the supporting wall structure is used to hold the button in place.

7. The device according to claim 1, further including:
 a plurality of buttons, corresponding supporting wall structures, and corresponding protrusions.

8. The device according to claim 1, wherein:
 positions of the button and the protrusion is switchable.

9. A method for cursor control comprising:
 determining a start of a cursor control based on a change of a user foot touch state;
  determining a reference foot pointing direction angle when the cursor control starts;
 determining a reference foot tilt angle when the cursor control starts;
 determining if the cursor control is ongoing based on the user foot touch state;
 calculating a foot pointing direction angle difference as the difference between a current foot pointing direction angle and the reference foot pointing direction angle;
 calculating a foot tilt angle difference as a difference between a current foot tilt angle and the reference foot tilt angle;
 determining changes of cursor's coordinates based on the foot pointing direction angle difference and the foot tilt angle difference; and
 generating cursor controls based on the changes of cursor's coordinates.

10. A non-transitory computer readable storage medium, storing computer-executable instructions for, when being executed, one or more processors to perform the method according to claim 9.

11. A computer for cursor control comprising:
 a memory configured for storing computer-executable instructions, and a processor, coupled with the memory and, when executing the computer-executable instructions, configured for performing the method according to claim 9.

12. A foot operated controller device for cursor control comprising:
 a processor configured to:
  determine a start of a cursor control based on a change of a user foot touch state;
  determine a reference foot pointing direction angle when the cursor control starts;
  determine a reference foot tilt angle when the cursor control starts;
  determine if the cursor control is ongoing based on the user foot touch state;
  calculate a foot pointing direction angle difference as the difference between a current foot pointing direction angle and the reference foot pointing direction angle;
  calculate a foot tilt angle difference as a difference between a current foot tilt angle and the reference foot tilt angle;
  determine changes of cursor's coordinates based on the foot pointing direction angle difference and the foot tilt angle difference; and
  generate cursor controls based on the changes of cursor's coordinates.

* * * * *